(12) United States Patent
Masters et al.

(10) Patent No.: US 8,985,529 B2
(45) Date of Patent: Mar. 24, 2015

(54) APPARATUS AND METHODS FOR SUPPORTING AN ELONGATED MEMBER

(75) Inventors: Rodney H. Masters, Houston, TX (US); Blake R. Masters, Houston, TX (US); Billy L. Griffith, Spring, TX (US)

(73) Assignee: Aims International, Inc., Houston, TX (US)

( * ) Notice: Subject to any disclaimer, the term of this patent is extended or adjusted under 35 U.S.C. 154(b) by 569 days.

(21) Appl. No.: 13/132,851

(22) PCT Filed: Dec. 3, 2009

(86) PCT No.: PCT/US2009/066629
§ 371 (c)(1),
(2), (4) Date: Aug. 22, 2011

(87) PCT Pub. No.: WO2010/065767
PCT Pub. Date: Jun. 10, 2010

(65) Prior Publication Data
US 2011/0290952 A1    Dec. 1, 2011

Related U.S. Application Data

(60) Provisional application No. 61/119,657, filed on Dec. 3, 2008.

(51) Int. Cl.
| | |
|---|---|
| *F16L 3/08* | (2006.01) |
| *F16L 3/10* | (2006.01) |
| *F16L 3/22* | (2006.01) |
| *F16L 3/223* | (2006.01) |

(52) U.S. Cl.
CPC .............. *F16L 3/223* (2013.01); *F16L 3/1066* (2013.01); *F16L 3/222* (2013.01); *Y10T 29/49826* (2015.01)

USPC .... 248/65; 248/68.1; 248/176.1; 248/346.01; 248/349.5

(58) Field of Classification Search
USPC .............. 211/74, 85, 189, 194, 59.4; 248/65, 248/68.1, 74, 73, 74.2
See application file for complete search history.

(56) References Cited

U.S. PATENT DOCUMENTS

| | | | |
|---|---|---|---|
| 1,801,451 A | 4/1931 | Parker | |
| 3,437,297 A | 4/1969 | Jirka et al. | |
| 4,033,465 A | 7/1977 | Stine | |
| 4,093,076 A * | 6/1978 | Newton | 211/74 |
| 4,270,662 A * | 6/1981 | Gonzalez | 211/74 |

(Continued)

FOREIGN PATENT DOCUMENTS

| | | |
|---|---|---|
| JP | 56-966 U | 1/1981 |
| JP | 2001108150 | 4/2001 |

OTHER PUBLICATIONS

International Search Report and Written Opinion Issued in Application No. PCT/US09/66629, dated Feb. 1, 2010 (10 pages).

(Continued)

*Primary Examiner* — Amy J Sterling
(74) *Attorney, Agent, or Firm* — Edmonds & Nolte, P.C.

(57) ABSTRACT

Apparatus and methods for supporting one or more elongated members are provided. A support member for supporting one or more elongated members can include a body; at least four support arms extending from the body, and at least one curved surface disposed between the support arms. Each curved surface can be concave relative to a centerline of the body. At least one curved surface can have a length that is at least twice as long as at least one other curved surface.

15 Claims, 26 Drawing Sheets

(56) References Cited

U.S. PATENT DOCUMENTS

| | | |
|---|---|---|
| 4,306,697 A | 12/1981 | Mathews |
| 4,618,114 A | 10/1986 | McFarland |
| 5,123,547 A | 6/1992 | Koch |
| 5,513,761 A * | 5/1996 | Kobayashi et al. .......... 215/12.1 |
| 5,645,369 A * | 7/1997 | Geiger ............................ 404/34 |
| 5,735,412 A * | 4/1998 | Sheckells ..................... 211/59.4 |
| 5,773,508 A * | 6/1998 | Tendo et al. .................. 524/549 |
| 6,408,492 B1 | 6/2002 | Sparks et al. |
| 6,450,459 B2 | 9/2002 | Nakanishi |
| 6,474,613 B2 | 11/2002 | O'Malley |
| 6,648,281 B1 | 11/2003 | Lake |
| 6,902,138 B2 | 6/2005 | Vantouroux |
| 6,997,330 B2 | 2/2006 | Pachao-Morbitzer et al. |
| 7,628,285 B2 * | 12/2009 | Salvia ........................... 215/384 |
| 2004/0056156 A1 | 3/2004 | Dodson |
| 2005/0173597 A1 | 8/2005 | Farrell et al. |
| 2005/0247828 A1 | 11/2005 | Tzur et al. |

OTHER PUBLICATIONS

International Preliminary Report on Patentability Issued in Application No. PCT/US09/066629, dated Jun. 16, 2011 (10 pages).

* cited by examiner

— 1 —

APPARATUS AND METHODS FOR SUPPORTING AN ELONGATED MEMBER

CROSS REFERENCE TO RELATED APPLICATION

This application claims the benefit of U.S. Provisional Patent Application having Ser. No. 61/119,657, filed on Dec. 3, 2008, which is incorporated by reference herein.

BACKGROUND OF THE INVENTION

1. Field of the Invention

Embodiments of the present invention generally relate to apparatus and methods for supporting one or more elongated members.

2. Description of the Related Art

Natural gas is predominantly transported in gaseous form via pipeline from the point of production to a point of distribution. Stranded or remote natural gas deposits not located in close proximity to a pipeline cannot be feasibly transported over a pipeline; therefore, the gas must be transported by other means, such as in liquid form. Liquid forms of natural gas include liquefied natural gas ("LNG") and compressed natural gas ("CNG"). LNG and CNG require extreme temperature and/or pressure conditions to remain in liquid form.

Economical transport of LNG and CNG via tanker ships requires large quantities of high-pressure and cryogenically stable shipboard storage, which is expensive and labor and maintenance intensive. There is a need, therefore, for new apparatus and methods for transporting natural gas in liquid form.

SUMMARY

Apparatus and methods for supporting one or more elongated members for transporting natural gas in liquid form are provided. In at least one specific embodiment, a support member can include a body, at least four support arms extending from the body, and at least one curved surface disposed between the support arms. Each curved surface can be concave relative to a centerline of the body. At least one curved surface can have a length that is at least twice as long as at least one other curved surface.

In at least one other specific embodiment, the support system can include at least four support members. Each support member can include a body, at least four support arms extending from the body, and at least one curved surface disposed between the support arms. Each support arm can include a contact surface disposed at a distal end thereof, and each curved surface can be concave relative to a centerline of the body. At least one curved surface can have a length that is at least twice as long as at least one other curved surface. The support members can be arranged with respect to one another such that an opening is formed between the support members.

In at least one specific embodiment, the method for supporting one or more elongated members can include arranging at least four support members about one another. Each support member can include a body, at least four support arms extending from the body, and at least one curved surface disposed between the support arms. Each support arm can include a contact surface disposed at a distal end thereof, and each curved surface can be concave relative to a centerline of the body. At least one curved surface can have a length that is at least twice as long as at least one other curved surface. The support members can be arranged with respect to one another such that an opening is formed between the bodies, and an elongated member can be disposed within the opening.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Figure 1:
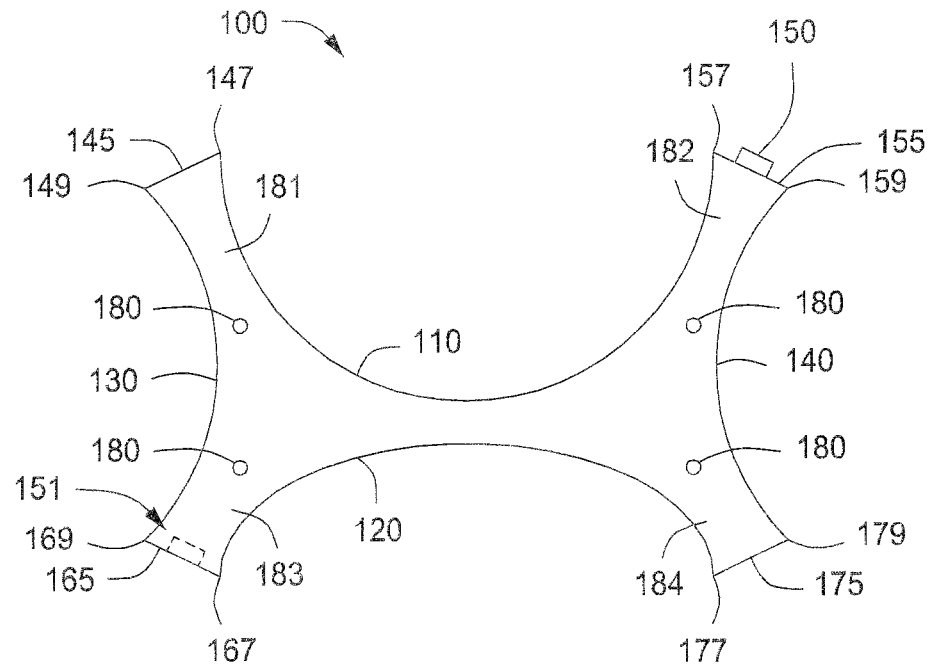
FIG. 1 depicts a side view of an illustrative support body, according to one or more embodiments described.
Figure 2:
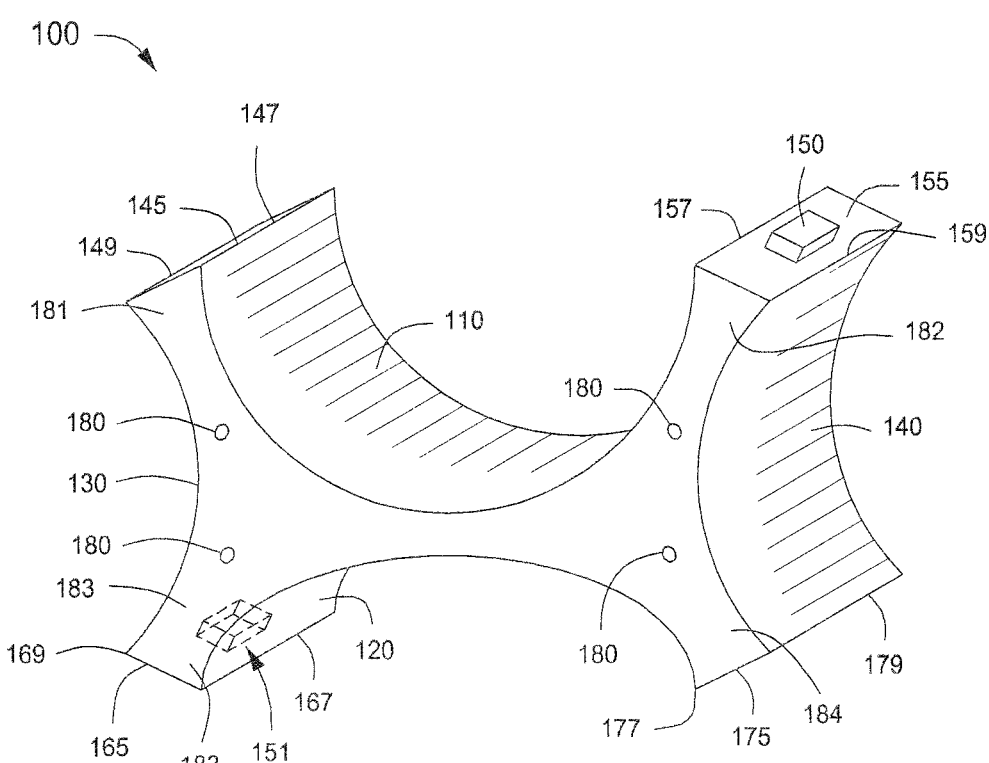
FIG. 2 depicts an isometric view of the illustrative support body depicted in FIG. 1.

FIG. 1 depicts a side view of an illustrative support body 100 and FIG. 2 depicts an isometric view of the illustrative support body 100 depicted in FIG. 1, according to one or more embodiments. Referring to both FIGS. 1 and 2, the body 100 can be a monolithic structure having outer surfaces or sides, e.g. a first surface 110, a second surface 120, a third surface 130, and a fourth surface 140. In one or more embodiments, the body 100 can be formed from two or more structures or components to provide a body having the outer surfaces or sides 110, 120, 130, 140. The first surface 110 and the second surface 120 can be disposed on opposing ends of the body 100 and the third surface 130 and fourth surface 140 can be disposed on opposing ends of the body 100.

The body 100 can further include one or more contact surfaces (four are shown 145, 155, 165, 175) between the surfaces 110, 120, 130, 140. A first contact surface 145 can be located between the first surface 110 and the third surface 130. A second contact surface 155 can be located between the first surface 110 and the fourth surface 140. A third contact surface 165 can be located between the second surface 120 and the third surface 130. A fourth contact surface 175 can be located between the second surface 120 and the fourth surface 140. As such, the first surface 110, the first contact surface 145, the third surface 130, the third contact surface 165, the second surface 120, the fourth contact surface 175, the fourth surface 140, and the second contact surface 155 can provide the perimeter of the body 100.

In one or more embodiments, the first surface 110, the second surface 120, or both can be curved. For example, the first surface 110, the second surface 120, or both can curve toward a longitudinal axis therebetween or first centerline of the body 100. In one or more embodiments, the first surface 110, the second surface 120, or both can be an inverse or concave arc or ellipse, for example. The first surface 110, the second surface 120, or both can curve toward a longitudinal axis therebetween having any suitable curvature or combination of curvatures. Illustrative curvatures can include, but are not limited to, radial curves, circular curves, elliptical curves, catenary curves, parabolic curves, simple curves, or any combination thereof. The first surface 110 can include a first curve and the second surface 120 can include a second curve that is different from the first curve. For example the first surface 110 can include a radial curve and the second surface 120 can include an elliptical curve. In one or more embodiments, the third surface 130, the fourth surface 140, or both can be curved. For example, the third surface 130, the fourth surface 140, or both can curve toward a latitudinal axis therebetween or second centerline of the body 100. The third surface 130 can have a third radius of curvature and the fourth surface 140 can have a fourth radius of curvature. Similar to the first surface 110 and the second surface 120, the third surface 130 and the fourth surface 140 can include any type of curve, for example a radial curve, a circular curve, an elliptical curve, a catenary curve, a parabolic curve, or any combination thereof. In one or more embodiments, the third surface 130, the fourth surface 140, or both can be an inverse or concave arc and/or ellipse, for example.

In one or more embodiments, the first surface 110 can have a variably curved profile that can extend from the first contact surface 145 to the second contact surface 155. In one or more embodiments, the second surface 120 can have a variably curved profile that can extend from the third contact surface 165 to the fourth contact surface 175. In one or more embodiments, the third surface 130 can have a variably curved profile that can extend from the first contact surface 145 to the third contact surface 165. In one or more embodiments, the fourth surface 140 can have a variably curved profile that can extend from the second contact surface 155 to the fourth contact surface 175. In one or more embodiments, any one or more of the first contact surface 145, second contact surface 155, third contact surface 165, and/or the fourth contact surface 175 can have a variably curved profile. For clarity and ease of description the varying configurations or varying side profiles of the second surface 120 will be discussed; however, any one or more of the other surfaces, i.e. the first surface 110, third surface 130, fourth surface 140, first contact surface 145, second contact surface 155, third contact surface 165, and fourth contact surface 175 can include a variably curved profile similar to the curved profile discussed and described with reference to the second surface 120. Furthermore, the variably curved profiles of the first surface 110, the second surface 120, the third surface 130, the fourth surface 140, the first contact surface 145, the second contact surface 155, the third contact surface 165, and the fourth contact surface 175 can be the same or different with respect to one or more of the other surfaces.

In one or more embodiments, the second surface 120 can be divided into three sections, e.g. a left section, a center section, and a right section. As used herein, the terms "left" and "right," "top" and "bottom," "front" and "rear" and other like terms are merely used for convenience to depict spatial orientations or spatial relationships relative to one another in respect to the body 100. The left section, center section, and right section can be of equal or different lengths. In one or more embodiments, the left and right sections can have the same curvature and the center section can have a different curvature. For example, the left and right sections can have a radius of curvature and the center section can have an elliptical curvature. In another example, the left and right sections can have an elliptical curvature and the center section can have a radius of curvature. In yet another example, the left and right sections can have a first radius of curvature and the center section can have a second radius of curvature that is different than the first radius of curvature. In still another example, the left and right section can have a first elliptical curvature and the center section can have a second elliptical curvature that is different from the first elliptical curvature. The second surface 120 can have any type of curve and any combination of curves disposed along the left section, the center section, and the right section.

For clarity and ease of description, the curvature of the first surface 110, the second surface 120, the third surface 130, and the fourth surface 140 will be further described herein as having a radius of curvature, which can include, for example, a circular curve or circular curvature. However, the first surface 110, the second surface 120, the third surface 130, and the fourth surface 140, as discussed above, can include any suitable curvature or combination of curvatures, such as radial, circular, elliptical, parabolic, or any combination thereof.

The first surface 110 can have a first radius of curvature and the second surface 120 can have a second radius of curvature. The first radius of curvature and the second radius of curvature can be the same or different. The first radius of curvature can be greater than the second radius of curvature. The second radius of curvature can be greater than the first radius of curvature. The first radius of curvature and the second radius of curvature can be aligned on a latitudinal axis of the body 100. The first radius of curvature and the second radius of curvature can be aligned on the latitudinal center axis of the body 100. The first radius of curvature and the second radius of curvature can be aligned on a latitudinal axis of the body 100 that can be closer to the third surface 130 than it is to the fourth surface 140. The first radius of curvature and the second radius of curvature can be aligned on a latitudinal axis of the body 100 that can be closer to the fourth surface 140 than the latitudinal axis is to the third surface 130.

The first radius of curvature can range from a low of about 2 cm, about 5 cm, about 10 cm, about 15 cm, about 20 cm, or about 25 cm to a high of about 60 cm, about 70 cm, about 80 cm, about 90 cm, about 100 cm, or more. The second radius of curvature can range from a low of about 2 cm, about 5 cm, about 10 cm, about 15 cm, about 20 cm, or about 25 cm to a high of about 60 cm, about 70 cm, about 80 cm, about 90 cm, about 100 cm, or more. The first radius of curvature and/or the second radius of curvature can be constant for a portion extending from a latitudinal axis toward the third surface 130 and the fourth surface 140 and the first and/or second radius of curvature can then smoothly or non-smoothly increase to a larger radius of curvature or a smaller radius of curvature. The first radius of curvature and/or the second radius of curvature can be aligned on the central latitudinal axis of the body 100 and the first or second radius of curvature can be constant for a portion extending from the latitudinal center axis toward the third surface 130 and the fourth surface 140 and the first and/or second radius of curvature can then smoothly or non-smoothly increase to a larger radius of curvature or a smaller radius of curvature.

The third surface 130 can have a third radius of curvature and the fourth surface 140 can have a fourth radius of curvature. The third radius of curvature and the fourth radius of curvature can be the same or different. The third radius of curvature can be greater than the fourth radius of curvature. The fourth radius of curvature can be greater than the third radius of curvature. The third radius of curvature and the fourth radius of curvature can be aligned on a longitudinal axis of the body 100. The third radius of curvature and the fourth radius of curvature can be aligned on the longitudinal center axis of the body 100. The third radius of curvature and the fourth radius of curvature can be aligned on a longitudinal axis of the body 100 that can be closer to the second surface 120 than it is to the first surface 110 or closer to the first surface 110 than it is to the second surface 120.

The third radius of curvature can range from a low of about 2 cm, about 5 cm, about 10 cm, about 15 cm, about 20 cm, or about 25 cm to a high of about 60 cm, about 70 cm, about 80 cm, about 90 cm, about 100 cm, or more. The fourth radius of curvature can range from a low of about 5 cm, about 10 cm, about 15 cm, about 20 cm, or about 25 cm to a high of about 60 cm, about 70 cm, about 80 cm, about 90 cm, about 100 cm, or more. The third radius of curvature and/or the fourth radius of curvature can be constant for a portion extending from a longitudinal axis toward the first surface 110 and the second surface 120 and the third and/or fourth radius of curvature can then smoothly or non-smoothly increase to a larger radius of curvature or a smaller radius of curvature. The third radius of curvature and/or the fourth radius of curvature can be aligned on the longitudinal center axis and the third radius of curvature and/or the fourth radius of curvature can extend for a portion from the longitudinal center axis toward the first surface 110 and the second surface 120 and the third radius of curvature and/or the fourth radius of curvature can then smoothly or non-smoothly increase to a larger radius of curvature or a smaller radius of curvature.

The third radius of curvature, the fourth radius of curvature, and/or the first radius of curvature can be the same or different. The first radius of curvature and the third radius of curvature can be the same and the fourth radius of curvature can be different. The first radius of curvature and the fourth radius of curvature can be the same and the third radius of curvature can be different. The first radius of curvature, the third radius of curvature, and the fourth radius of curvature can be greater than the second radius of curvature. The first radius of curvature, the third radius of curvature, and the fourth radius of curvature can be less than the second radius of curvature. The first radius of curvature, the second radius of curvature, the third radius of curvature, and/or the fourth radius of curvature can be the same or different. The first radius of curvature, the second radius of curvature, the third radius of curvature, and the fourth radius of curvature can be the same or different with respect to any radius of curvature. For example, the first radius of curvature can be the same or different as the second radius of curvature, the third radius of curvature, and the fourth radius of curvature.

The first contact surface 145 and the first surface 110 can converge or otherwise connect at an edge 147. The second contact surface 155 and the first surface 110 can converge or otherwise connect at an edge 157. The first contact surface 145 and the third surface 130 can converge or otherwise connect at an edge 149. The second contact surface 155 and the fourth surface 140 can converge or otherwise connect at an edge 159. The third contact surface 165 and the second surface 120 can converge or otherwise connect at an edge 167. The fourth contact surface 175 and the second surface 120 can converge or otherwise connect at an edge 177. The third contact surface 165 and the third surface 130 can converge or otherwise connect at an edge 169. The fourth contact surface 175 and the fourth surface 140 can converge or otherwise connect at an edge 179. The edges 147, 149, 157, 159, 167, 169, 177, and/or 179 can be straight, beveled, rounded, chamfered, and the like.

The body 100 can be described as having four support arms or "legs" 181, 182, 183, 184, with the first support arm 181 disposed between the first surface 110 and the third surface 130, the second support arm 182 disposed between the first surface 110 and the fourth surface 140, the third support arm 184 disposed between the second surface 120 and the third surface 130, and the fourth support arm 184 disposed between the second surface 120 and the fourth surface 140. Each support arm 181, 182, 183, 184 can be the same or different. For example, each support arm 181, 182, 183, 184 can have the same length or differing lengths, where the length is in reference to a distance from the longitudinal center axis of the body 100 to the contact surface of a support aim. More particularly, the length of a given support arm, for example the second support arm 182, can be the length of the support arm 182 along a line that perpendicularly intersects the contact surface 155 of the second support arm 182 intermediate the edges 157, 159 to the location where the line intersects a central longitudinal axis disposed through the body 100, i.e. the longitudinal axis that is disposed intermediate the first surface 110 and the second surface 120.

The lengths of any two support arms to the lengths of any two other support arms can have any desired ratio. For example, the ratio between the length of the first and second support arms 181, 182 to the length of the third and fourth support arms 183, 184 can have any desired ratio. In another example, the ratio between the length of the first and third support arms 181, 183 to the length of the second and fourth support arms 182, 184 can have any desired ratio.

In one or more embodiments, the ratio of the length of support arms 181 and 182 to the length of support arms 183 and 184 can range from a low of about 1:100 to a high of about 100:1. For example, the ratio of the length of support arms 181 and 182 to the length of support arms 183 and 184 can be about 1:50, about 1:25, about 1:10, about 1:8, about 1:6, about 1:3, about 1:2, about 1:1, about 2:1, about 3:1, about 6:1, about 8:1, about 10:1, about 25:1, or about 50:1. In one or more embodiments, the ratio of the length of support arms 181 and 183 to the length of support arms 182, 184 can range from a low of about 1:100 to a high of about 100:1. For example, the ratio of the length of the support arms 181, 183 to the length of the support arms 182, 184 can be about 1:50, about 1:25, about 1:10, about 1:8, about 1:6, about 1:3, about 1:2, about 1:1, about 2:1, about 3:1, about 6:1, about 8:1, about 10:1, about 25:1, or about 50:1.

In one or more embodiments, the lines used to determine the lengths of two adjacent support arms, for example, the second and fourth support arms 182, 184, can intersect one another along the central longitudinal axis thereby forming angle directed toward the fourth surface 140 that could range from a low of about 10° to high of about 170°. For example, the angle formed between the lines used to determine the lengths of two adjacent support arms, e.g. support arms 182, 184, and oriented toward the fourth surface 140, can range from a low of about 50°, about 60°, about 70°, about 80°, or about 85° to a high of about 95°, about 100°, about 110°, about 120°, or about 130°.

In one or more embodiments, the length of at least one surface 110, 120, 130, or 140 can be at least twice as long as the length of at least one other surface. For example, the length of the first surface 110 can be at least twice as long as at least one of the second surface 120, the third surface 130, and the fourth surface 140. In one or more embodiments, the length of at least one surface 110, 120, 130, or 140 can be at least twice as long as the length of at least two other surfaces. For example, the length of the first surface 110 can be at least twice as long as at least two of the second surface 120, the third surface 130, and the fourth surface 140. In one or more embodiments, the length of at least one surface 110, 120, 130, or 140 can be at least twice as long as the length of at least three other surfaces. For example, the length of the first surface 110 can be at least twice as longus the second surface 120, the third surface 130, and the fourth surface 140.

In one or more embodiments, the length of at least one surface 110, 120, 130, or 140 can be at least three times as long as the length of at least one other surface. For example, the length of the first surface 110 can be at least three times as long as at least one of the second surface 120, the third surface 130, and the fourth surface 140. In one or more embodiments, the length of at least one surface 110, 120, 130, or 140 can be at least three times as long as the length of at least two other surface. For example, the length of the first surface 110 can be at least three times as long as at least two of the second surface 120, the third surface 130, and the fourth surface 140. In one or more embodiments, the length of at least one surface 110, 120, 130, or 140 can be at least three times as long as the length of at least three other surfaces. For example, the length of the first surface 110 can be at least three times as long as the second surface 120, the third surface 130, and the fourth surface 140. In one or more embodiments, at least two surfaces 110, 120, 130, and/or 140 can have substantially the same length. For example, the first surface 110 and the second surface 120 can have substantially the same length.

In one or more embodiments, the length of at least one surface 110, 120, 130, or 140 can be about 1.1, about 1.3, about 1.5, about 1.7, about 2, about 2.1 about 2.2, about 2.3, about 2.4, about 2.5, about 2.6, about 2.7, about 2.8, about 2.9, about 3, about 3.1, about 3.2, about 3.3, about 3.4, or about 3.5 times as long as the length of at least one other surface. In one or more embodiments, the length of at least one surface 110, 120, 130, or 140 can be about 1.1, about 1.3, about 1.5, about 1.7, about 2, about 2.1 about 2.2, about 2.3, about 2.4, about 2.5, about 2.6, about 2.7, about 2.8, about 2.9, about 3, about 3.1, about 3.2, about 3.3, about 3.4, or about 3.5 times as long as the length of at least two other surfaces. In one or more embodiments, the length of at least one surface 110, 120, 130, or 140 can be about 1.1, about 1.3, about 1.5, about 1.7, about 2, about 2.1 about 2.2, about 2.3, about 2.4, about 2.5, about 2.6, about 2.7, about 2.8, about 2.9, about 3, about 3.1, about 3.2, about 3.3, about 3.4, or about 3.5 times as long as the length of at least three other surfaces.

In one or more embodiments, a ratio of the distance or length between the narrowest portion or point of closest approach between any two surfaces bounding a given support arm to the narrowest portion or point of closest approach between the first surface 110 and the second surface 120 can be the same or different. The distance or length between the point of closest approach between any two surfaces that bound a given support arm can be referred to as a "minimum support arm thickness." The distance or length between the point of closest approach between the first surface 110 and the second surface 120 can be referred to as a "minimum saddle thickness." A ratio between the minimum saddle thickness and any given support arm's minimum support arm thickness can range from a low of about 1:10, about 1:5, or about 1:2 to a high of about 2:1, about 5:1, or about 10:1. For example, the ratio between the minimum saddle thickness and any given support arm's minimum support arm thickness can be about 1:1, about 1:1.25, about 1:1.5, about 1:1.75, about 1:2, about 1:2.25, about 1:2.5, about 1:2.75, or about 1:3. The ratio between the minimum saddle thickness and any two support arm's minimum support arm thickness can be the same or different from one another.

The contact surfaces 145, 144, 165, 175 can be disposed on a distal end of the support arms 181, 182, 183, 184, respectively. In one or more embodiments, the contact surfaces 145, 155, 165, 175 can be flat or substantially flat. The contact surfaces 145, 155, 165, 175 can have a surface roughness or surface variation of less than about 2 mm, less than about 1 mm, less than about 0.5 mm, or less than about 0.1 mm or less. Each contact surface 145, 155, 165, 175 can include one or more surface modifications disposed thereon to facilitate or improve contact therebetween when two or more bodies 100 are positioned or otherwise located proximate one another. Illustrative surface modifications can include, but are not limited to, one or more dimples, protrusions, projections, protuberances, ridges, pins, rods, depressions, grooves, holes, notches, recesses, or any other surface variation or modification, either alone or in any combination. For purposes of illustration only, a protrusion 150 and a recess 151 are depicted in FIGS. 1 and 2; however, any surface modification or combination of surface modifications can be disposed about a portion or all of at least one of the one or more contact surfaces 145, 155, 165, 175.

Complementary surface modifications can be disposed on corresponding contact surfaces 145, 155, 165, 175. For example, one or more surface receiving modifications can be disposed on the third contact surface 165 and the fourth contact surface 175 that can receive a surface modification disposed on the second contact surface 155 and the first contact surface 145, respectively. For example a pin, rod, or other projection can be disposed on and extend from the first contact surface 145 and a surface receiving modification, such as a hole, can be disposed on and extend into fourth contact surface 175 for receiving the pin, rod, or other projection.

One can recognize that at least two similar bodies 100 would be required in order to dispose a projection extending from the first contact surface 145 within a complimentary receiving modification disposed on the fourth contact surface 175. Two bodies 100, similarly constructed, having a projection disposed on the first contact surface 145, and a receiving hole within the fourth contact surface 175, can be arranged such that the projection extending from the first contact surface 145 of a first body 100 can be disposed within the receiving hole disposed within the fourth contact surface 175 of a second body 100. In another embodiment, two bodies 100, similarly constructed, having holes disposed on the first contact surface 145 and the fourth contact surface 175, can be arranged such that a rod, dowel, or other suitable member can be disposed within the hole on the first contact surface 145 of a first body 100 and within the hole disposed on the fourth contact surface 175 of a second body 100.

Another surface modification can include a convex surface alteration, for example a ridge, disposed on the first contact surface 145 and the third contact surface 165. A complementary concave surface alteration, for example a groove, can be disposed on the second contact surface 155 and the fourth contact surface 175. The ridge can correspond or otherwise closely match the groove such that the ridge can be disposed within the groove. For example, two bodies 100 similarly constructed can be arranged such that a ridge disposed on the second contact surface 155 of a first body 100 can be disposed within a corresponding receiving groove disposed on the third contact surface 165 of a second body 100. The surface modifications can at least partially align and/or secure the first and second bodies 100 when properly positioned and connected together.

One or more holes, apertures, or other openings 180 can be disposed through the body 100. As depicted in FIGS. 1 and 2, a first hole 180 is disposed toward the first contact surface 145 between the first surface 110 and the third surface 130, a second hole 180 is disposed toward the second contact surface 155 between the first surface 110 and the fourth surface 140, a third hole 180 is disposed toward the third contact surface 165 between the third surface 130 and the second surface 120, and a fourth hole 180 is disposed toward the fourth contact surface 175 between the fourth surface 140 and the second surface 120.

The first, second, third, and/or fourth holes 180 can be smooth, having a diameter or cross-sectional area greater than a fastener that can be disposed therethrough. Suitable fasteners can include, but are not limited to bolts and nuts, rivets, cotter pins, male/female connecting devices, threaded rods, and the like. One or more of the holes 180 can include suitable surface modifications about at least a portion of the inner wall of the hole(s) capable of receiving a fastener. For example, at least a portion of the inner walls of the holes 180 can be threaded to receive a threaded fastener, such as a bolt or screw.

The one or more holes 180 can have any suitable geometrical shape. For example, the one or more holes 180 can be circular, triangular, square, rectangular, oval, elliptical, or any other shape. One or more of the one or more holes 180 can have a constant or variable internal cross-sectional area. In at least one specific embodiment, the one or more holes 180 can be a circular aperture having a constant cross-sectional area. In at least one specific embodiment, the one or more holes 180 can be a triangular hole having a constant cross-sectional area. In at least one other specific embodiment, the one or more holes 180 can be a triangular hole having rounded corners.

The body 100 can be made of any suitable material. The body 100 can be made of a metal, metal alloy, non-metallic materials, or combinations thereof. Suitable metals and metal alloys can include, but are not limited to, steel, carbon steel, steel alloys, stainless steel, stainless steel alloys, aluminum, aluminum alloys, nickel, nickel based alloys, bronze, brass, non-ferrous metals, non-ferrous metal alloys, or combinations thereof. The body 100 can be made using a non-metallic material or combination of non-metallic materials. Suitable non-metallic materials can include, but are not limited to carbon fiber, epoxies, fiberglass, polypropylene, polyethylene, urethane, ethylene propylene diene monomer ("EPDM"), polyurethane, blends thereof, reinforced polymers, or other polymeric materials with suitable mechanical properties. The body 100 can be formed using one or more molding processes including, but not limited to, pultrusion, vacuum assisted resin transfer molding ("VARTM"), vacuum infusion molding, random glass cast and/or compression molding, or any combination thereof.

The body 100 can include one or more non-metallic materials disposed at any location on or about the body 100. A body 100 made from one or more metals, metal alloys, and/or non-metallic materials can include one or more non-metallic materials disposed on or about the contact surfaces 145, 155, 165, and/or 175. One or more non-metallic materials can be disposed on the first surface 110, the second surface 120, the third surface 130, and/or the fourth surface 140. One or more non-metallic materials can be disposed on the first contact surface 145, the second contact surface 155, the third contact surface 165, and/or the fourth contact surface 175.

The body 100 can be at least partially coated with one or more non-metallic materials. For example, a body 100 made from one or more metals, metal alloys, and/or non-metallic materials can include one or more non-metallic coatings disposed on or about any portion of the body 100. The non-metallic coating can be disposed on the first contact surface 145, the second contact surface 155, the third contact surface 165, and/or the fourth contact surface 175. The non-metallic coating can be disposed on the first surface 110, the second surface 120, the third surface 130, and/or the fourth surface 140. The non-metallic coating can be disposed on a front or first side of the body and/or a back or second side of the body 100.

The body 100 can have any suitable thickness. The body 100 can have a thickness, measured from a first or front side to a second or rear side ranging from a low of about 0.5 cm, about 1 cm, about 2 cm, or about 3 cm to a high of about 10 cm, about 20 cm, about 30 cm, about 35 cm, or about 40 cm or more. In at least one specific embodiment, the body 100 can have a thickness of about 2.5 cm, about 7.5 cm, about 15 cm, about 30 cm, or about 38 cm or more. In one or more embodiments, the thickness of the body 100 can vary. For example, the body 100 can taper from a first end (e.g. contact surfaces 165, 175) to a second end (e.g. contact surfaces 145, 155) to provide a thicker body 100 having a thicker first end than the second end. The front side and/or the rear side can include one or more similar surface modifications as discussed and described above in regard to the contact surfaces.

The body 100 can include one or more inserts (not shown). Each insert can be metal, non-metallic, or a combination thereof. Each insert can also be metallic and partially or completely coated in a non-metallic material. Suitable methods for applying a coating can include, but are not limited to, dip coating, injection molding, random glass cast and/or compression molding, transfer molding, insert molding, flow coating, dip-spin coating, curtain coating, air knife coating, spraying, fluidized bed dip coating, and any combinations thereof. In one or more embodiments, similar to the one or more inserts that can be partially or completely coated in a non-metallic material, the body 100 can be at least partially encapsulated in a non-metallic material. For example, the contact surfaces 145, 155, 165, 175 and/or the surfaces 110, 120, 130, 140 can be at least partially coated with a non-metallic coating.

Coating an insert with a non-metallic material and/or the body 100 can provide a body 100 that can be rigid and also resistant to environmental effects, such as rust and corrosion. The coating can include one or more antifouling agents, which can reduce or prevent biological growth on the body 100. The coating can also include one or more agents to reduce or prevent galvanic corrosion between two metal or metal-containing bodies 100 in contact with one another. The coating can provide desirable electrostatic properties, such as an increase or decrease in conductivity. The coating can provide a surface or spacer capable of at least partially absorbing or otherwise accommodating dimensional tolerance differences, e.g. size variations of one or more elongated members supported via one or more bodies 100, as discussed and described below. In one or more embodiments, coating the body 100, and in particular the contact surfaces 145, 155, 165, 175 can improve the contact or connection between two bodies 100. For example, the tendency for two bodies 100 connected or otherwise positioned together to slip or move can be reduced by applying a coating having pliable, slip resistant, and/or adhesive properties. In another example, two bodies 100 that may be connected or otherwise positioned together could have dimensional variations, such as height, width, and/or thickness, which can be accounted for by one or more coatings. In one or more embodiments, the coating can be or include an adhesive. As such, bodies 100 having an adhesive coating disposed at least partially thereon can be attached together to provide a plurality of connected bodies 100. In one or more embodiments, the insert and/or the body 100 can be rigid and exhibit any one or more of the properties or characteristics that can be provided by one or more coatings.

In one or more embodiments, a conductive member, e.g. a conductive disc, film, plate, insert, or foil, can be disposed on or about any surface of the body 100. In addition to being conductive, the conductive member can be corrosion resistant, resistant to biological growth, account for dimensional changes between two bodies 100 that may be connected or otherwise positioned together, or the like. For example, a conductive member can be disposed on or about a front side and/or a rear side of the body 100. In another example, a conductive member can be disposed on or about the first surface 110, the second surface 120, the third surface 130, the fourth surface 140, the first contact surface 145, the second contact surface 155, the third contact surface 165, and/or the fourth contact surface 175. In at least one embodiment, any one or more surfaces or sides of the body 100 can include an electrical connector or connection to ground.

Figure 3:
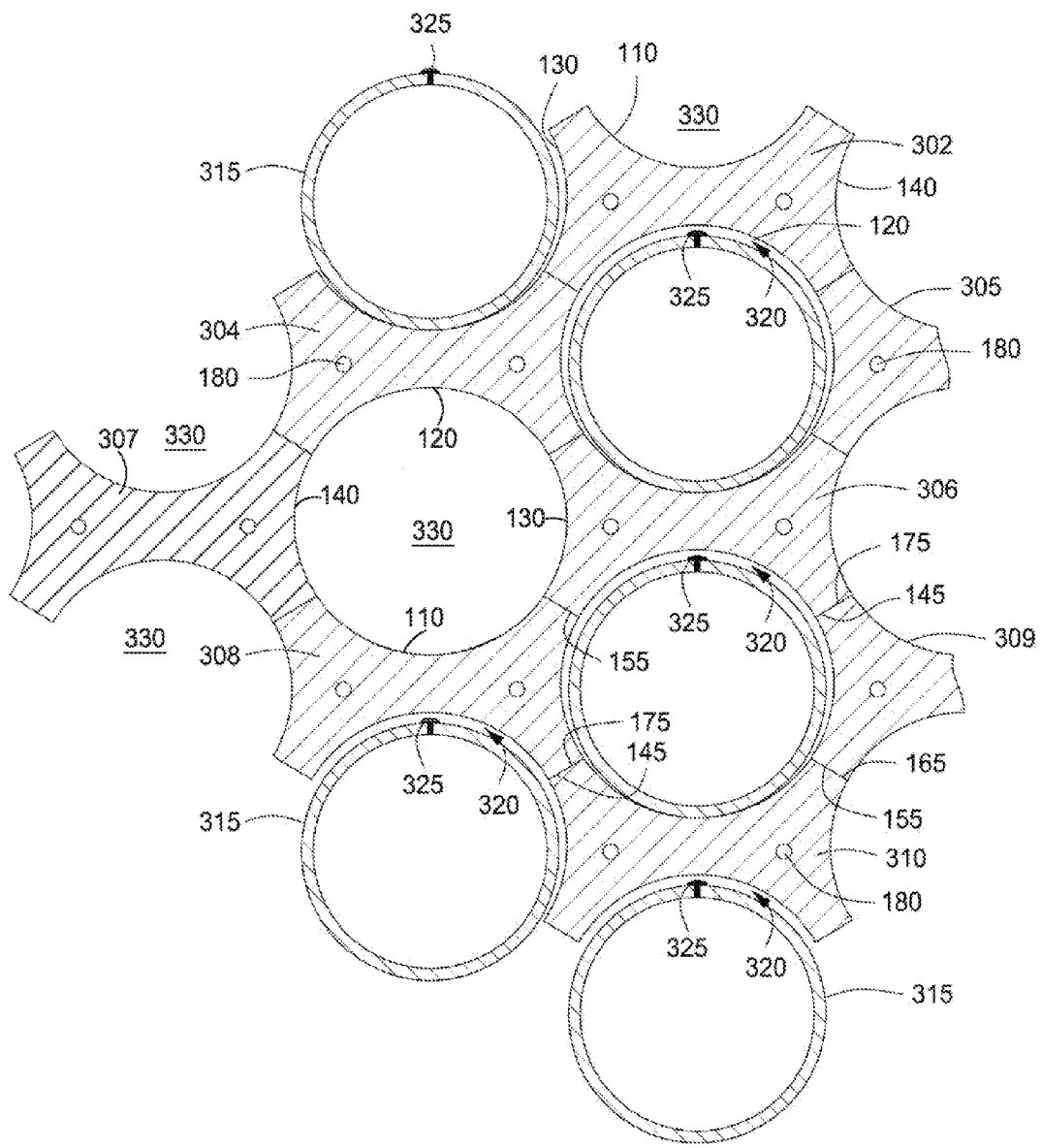
FIG. 3 depicts a partial schematic view of a plurality of illustrative support bodies supporting a plurality of elongated members within a plurality of openings, according to one or more embodiments described.

FIG. 3 depicts a partial schematic view of a plurality of illustrative bodies 302, 304, 305, 306, 307, 308, 309, 310 supporting a plurality of elongated members 315 within a plurality of openings 330, according to one or more embodiments. Illustrative elongated members 315 can include, but are not limited to, tubular members, pipes, pipelines, conduits, cables, communication lines, electrical lines, open channels, ducts, poles, cylinders, rods, or the like. One or more bodies (eight are shown, 302, 304, 305, 306, 307, 308, 309, 310) can be disposed about a plurality of elongated members 315. The bodies 302, 304, 305, 306, 307, 308, 309, 310 can be similar to the body 100, discussed and described above with reference to FIGS. 1 and 2, and/or the body 1300, discussed and described below with reference to FIGS. 13 and 14.

The bodies 302, 304, 305, 306, 307, 308, 309, 310 can provide a network or support system of bodies for supporting a plurality of elongated members 315. The bodies 302, 304, 305, 306, 307, 308, 309, 310 can be arranged, stacked, located, oriented, or otherwise positioned with respect to one another such that one or more openings 330 are formed between and/or about the support bodies. In one or more embodiments, at least four bodies or support members can be arranged or located with respect to one another such that an opening can be formed therebetween. For example, bodies 304, 306, 307, and 308 can be arranged or located with respect to one another such that an opening 330 is formed therebetween. The opening 330 can be formed or bounded by the first side 110 of body 308, the second side 120 of body 304, the third side of body 306, and the fourth side 140 of body 307.

The bodies 302, 304, 305, 306, 307, 308, 309, 310 can provide support for the plurality of elongated members 315 with the first surface 110 adapted to contact and support an adjacent elongated member 315 and the second surface 120, the third surface 130, and/or the fourth surface 140 adapted to contact an adjacent elongated member 315, not contact an adjacent elongated member 315, or both contact and not contact an adjacent elongated member along a portion of the surfaces thereof. The second contact surface 155 and/or the third contact surface 165 and/or the fourth contact surface 175 (see FIGS. 1 and 2) can contact adjacent bodies, thereby forming a gap 320 between the second surface 120 and the elongated member 315. In one or more embodiments, the gap 320 can extend from a point where the elongated member 315 contacts the first surface 110 all the way around the elongated member 315. As such, the elongated member can contact a body only at a single point or position on the first surface 110.

An elongated member 315 can contact and be supported by the first surface 110 about a center position of the first surface 110 as measured from the edge 147 to the edge 157. The elongated member 315 can contact and be supported by the first surface 110 only about the center position of the first surface 110. The elongated member 315 can contact and be supported by the first surface 110 ranging from the center position of the first surface 110 for any distance or length, which can be the same or different, toward the edge 147 and edge 157.

The second surface 120 of a body can be disposed about an elongated member 315, such that neither the second surface 120 nor the third contact surface 165 and fourth contact surface 175 contact the elongated member 315, as illustrated. The second surface 120 of a body can have a radius of curvature, elliptical curvature, parabolic curvature, or any other curvature that is greater than the elongated member 315, thereby forming the gap 320 between the second surface 120 and the elongated member 315. The gap 320 can provide sufficient clearance to accommodate a weld seam or weld bead 325 of the elongated member 315. The gap 320 between the second surface 120 and the elongated member 315 can prevent the transfer of at least a portion of any vertical and/or lateral forces and/or loads exerted on body 306 from body 304, body 305, and/or the elongated member 315 above body 306 from being directed on or to the elongated member 315 disposed beneath the gap 320 below body 306. The body 302 can accommodate flexing of the body 302 and at the same time maintain the gap 320.

Although not shown, the second surface 120 of bodies 302, 304, 305, 306, 307, 308, 309, 310 can include a notch, recess, groove, or other indentation about the center of the second surface 120 as measured from edge 167 to edge 177 (see FIGS. 1 and 2). The indentation about the center of the second surface 120 can extend a sufficient distance from the center of the second surface 120 toward edge 167 and edge 177 to account for variations in the position of the weld seam 325. A second surface 120 that includes an indentation about a center portion of the second surface 120 can permit the second surface 120 to have the same radius of curvature as the elongated member 315 disposed therein, but can also provide a space for the weld bead 325. Any or all of the surfaces, i.e. the first surface 110, the second surface 120, the third surface 130, and/or the fourth surface 140 can include a notch, recess, groove, or other indentation disposed thereon.

In one or more embodiments, at least four bodies can be arranged adjacent one another such that an opening 330 is formed therebetween and one or more elongated members 315 can be disposed within the opening. For example, a first body 306, a second body 308, a third body 309, and a fourth body 310 can be arranged with respect to one another such that an opening is formed therebetween and a first elongated member 315 can be disposed within the opening. The third contact surface 165 of body 306 and the second contact surface 155 of body 308 can be in contact with one another. The fourth contact surface 175 of body 306 and the first contact surface 145 of body 309 can be in contact with one another. The fourth contact surface 175 of body 308 and the first contact surface 145 of body 310 can be in contact with one another. The third contact surface 165 of body 309 and the second contact surface 155 of body 310 can be in contact with one another. The bodies 306, 308, 309, 310, arranged in this manner, can provide an opening that can be bounded by the second surface 120 of the first body 306, the first surface 110 of the fourth body 310, the third surface 130 of the third body 309, and the fourth surface 140 of the second body 308. In one or more embodiments, an elongated member of first elongated member 315 can be disposed within the opening formed by the arranged or located bodies 306, 308, 309, 310. The first elongated member 315 can be supported by the bodies 306, 308, 309, and/or 310. Also, with the bodies 306, 308, 309, 310 arranged in this manner, at least a portion of any vertical and/or lateral forces and/or loads exerted on the first body 306 can be transferred to the second body 308 and the third body 309. At least a portion of any vertical and/or lateral forces and/or loads exerted on bodies 308 and 309 can be transferred to the fourth body 310. This transfer of vertical and/or lateral forces and/or loads can continue to be transferred to adjacently disposed bodies (not shown) thereby distributing the weight and other forces exerted from the elongated members 315 and/or the environment throughout the bodies.

In one or more embodiments, at least three other bodies or support members can be arranged or located about the at least four bodies 306, 308, 309, 310 such that a second opening is formed between the at least three other bodies. For example, a fifth body 304, a sixth body 305, and a seventh body 302 can be arranged or located with respect to the other four bodies 306, 308, 309, 310 to provide the second opening. The fourth contact surface 175 of the fifth body 304 and the first contact surface 145 of the first body 306 can be in contact with one another. The fourth contact surface 175 of the sixth body 305 and the second contact surface 155 of the first body 306 can be in contact with one another. The third contact surface of the seventh body 302 and the second contact surface of the fifth body 304 can be in contact with one another. The fourth contact surface 175 of the seventh body 302 and the first contact surface of the sixth body 305 can be in contact with one another. The bodies 304, 305, 302, arranged in this manner with respect to the first four bodies 306, 308, 309, 310, can provide a second opening that can be bounded by the second surface 120 of the seventh body 302, the first surface 110 of the first body 306, the third surface 130 of the sixth body 305, and the fourth surface 140 of the fifth body 304. In one or more embodiments, an elongated member or second elongated member 315 can be disposed within the second opening formed by the arranged or located bodies 302, 304, 305, 306. The second elongated member 315 can be supported by the bodies 302, 304, 305, 306, 308, 309, and/or 310. Also, with the bodies 302, 304, 305, 306, 307, 308, 309, 310 arranged in this manner, at least a portion of any vertical and/or lateral forces and/or loads exerted on the bodies 302, 304, 305, 306, 308, 309, 310 can be transferred through the bodies to other bodies (not shown).

As shown, the first and second elongated members 315 can be vertically supported with respect to one another. The second elongated member 315 can be disposed or located above the first elongated member 315. As such, the weight of the second elongated member 315 and the bodies 302, 304, and 304 that can also disposed above the first elongated member 315 can be transferred through the other bodies 306, 308, 309, 310. Transferring the weight of the second elongated member 315 and the bodies 302, 304, 306 to the other bodies 306, 308, 309, 310 can reduce or avoid any weight or other forces being transferred to the first elongated member 315. As such, the weight and other forces that can be exerted by the second elongated member 315 and bodies 302, 304, 305 that can be above the first elongated member 315 can be transferred to the bodes 306, 308, 309, 310 and not to the first elongated member.

The plurality of bodies 306, 308, 309, 310 disposed about the elongated member 315 can completely encircle the outer circumference or perimeter of the elongated member 315. In one or more embodiments, a portion of the plurality of bodies 302, 304, 305, 306, 307, 308, 309, 310 disposed about the elongated members 315 can completely encircle, partially encircle, or a combination of completely encircling the outer circumference or perimeter of some elongated members 315 and partially encircling the outer circumference or perimeter of other elongated members 315. In one or more embodiments, the first surface 110 of the body 310 can traverse about 20% to about 40% of the circumference of the elongated member 315. In one or more embodiments, the third surface 130 of the body 309 can traverse about 10% to about 20% of the circumference of the elongated member 315. In one or more embodiments, the fourth surface 140 of the body 308 can traverse about 10% to about 20% of the circumference of the elongated member 315. In one or more embodiments, the second surface of the body 306 can traverse about 20% to about 40% of the circumference of the elongated member 315.

In the event the elongated members 315, for example tubular members, have dimensional variations, those dimensional variations of the elongated members 315 can be accommodated by the bodies 302, 304, 305, 306, 307, 308, 309, 310. Since elongated members 315 such as tubular members can typically be rolled from sheets and welded, the resulting tubular members typically have inconsistencies in one or more dimensions. Common inconsistencies can include out of roundness ("OOR"), outer diameter variance ("ODV"), and weld height ("WH"). An additional variance that can be accounted for can be flexing of the body when an elongated member 315 is disposed on one or more bodies. As such, a flex allowance ("FA") can be accounted for in designing the bodies. Another variation that can be accounted for in the bodies can be a radial expansion/contraction of the one or more elongated members 315 supported by one or more bodies. Another variation that can be accounted for can be the thickness of one or more coatings that may be applied to a body, for example about the first surface 110, the second surface 120, the third surface 130, and/or the fourth surface 140. Yet another variation that can be accounted for can be dimensional changes, e.g. expansion and/or contraction, of the body due to temperature and pressure, for example.

As used herein, the terms "out of roundness," and "OOR" refer to an elongated member, for example a pipe, that is not perfectly round, i.e. not perfectly circular. The OOR can range from a low of about +/−0.1%, +/−0.2%, or about +/−0.3% to a high of about +/−0.5%, about +/−1%, about +/−2% or more of the outer diameter of the elongated member. As used herein, the terms "outer diameter variance," and "ODV" refer to the potential variation in diameter of the elongated member. The ODV can range from a low of about +/−0.001%, about +/−0.005%, about +/−0.01%, or about +/− about 0.05% to a high of about +/−0.2%, about +/−0.3%, about +/−0.4%, or about +/−0.5% of the outer diameter of the elongated member. For example, variation in diameter or ODV of an elongated member that has a nominal outer diameter of about 106.7 cm can vary from about −2.4 mm to about 1.6 mm (about −0.2% to about +0.15%).

As used herein, the terms "weld height," and "WH" refer to the distance the weld seam or weld bead 325 can extend from the outer wall of the elongated member 315. The height of the weld bead 325 can range from a low of about 0 mm, about 1 mm, or about 2 mm to a high of a about 3 mm, about 4 mm, about 5 mm, or more. For example, an elongated member 315 having a nominal outer diameter of about 106.7 cm formed by welding a rolled square or rectangular sheet of metal along a seam provided where the two ends of the sheet meet can extend from the surface of the outer wall by about 3.2 mm or more.

As shown, each body can include two holes 180 disposed along the longitudinal center axis. In one or more embodiments, each body can include any number of holes 180. For example, each body can include one hole 180, two holes 180, three holes 180, four holes 180, five holes 180, six holes 180, or more. The holes 180 can be disposed through the bodies to provide a passage therethrough that can accommodate a connecting rod, as will be discussed and described below with reference to FIGS. 8A and 8B. In at least one embodiment, the bodies 302, 304, 305, 306, 307, 308, 309, 310 can include no holes 180. In at least one other embodiment, the bodies 302, 304, 305, 306, 307, 308, 309, 310 can be glued together using an adhesive.

In one or more embodiments, a conductive disc, film, plate, insert, foil, or the like, can be disposed between any one or more sets to contact surfaces. For example, a conductive disc can be disposed between the third contact surface 165 of body 306 and the second contact surface 155 of body 308, the fourth contact surface 175 of body 308 and the first contact surface 145 of body 310, or both. In one or more embodiments, every pair of contact surfaces, e.g. 165/155, 175/145 have a conductive disc, insert, plate, or the like disposed therebetween.

Figure 4:
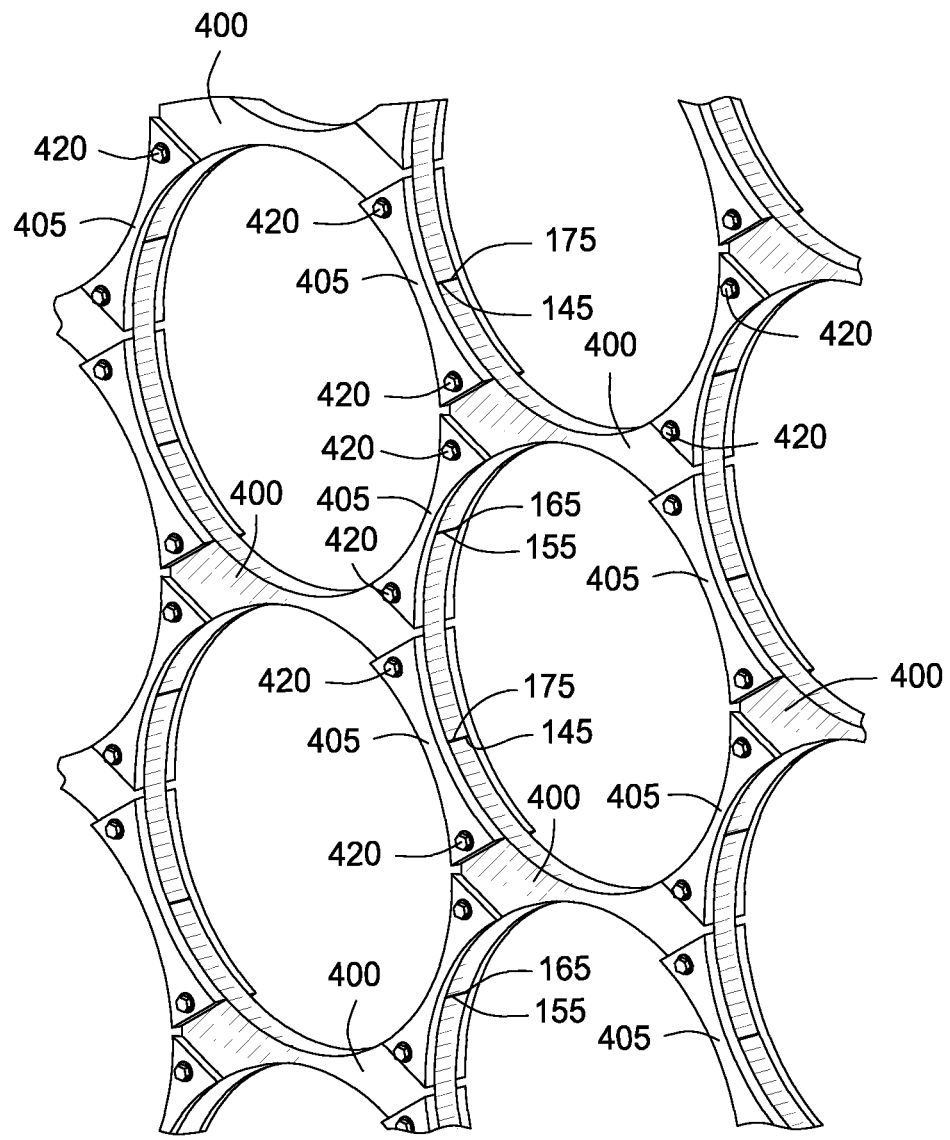
FIG. 4 depicts an isometric partial view of a plurality of illustrative support bodies positioned together using illustrative connecting members, according to one or more embodiments described.

FIG. 4 depicts an isometric partial view of a plurality of illustrative bodies 400 positioned together using illustrative connecting members 405, according to one or more embodiments. The bodies 400 can be similar to the bodies discussed and described above with reference to FIGS. 1 to 3. In one or more embodiments, two adjacent bodies 400 can be connected together using one or more connecting members 405. One or more connecting members 405 can be disposed about the connections or contact areas between the contact surfaces of a first body 400 and a second body 400. For example, a linking member 405 can be disposed about both sides of a first body 400 and a second body 400, such that the linking member 405 spans the contact area between the fourth contact surface 175 of the first body 400 and the first contact surface 145 of the second body 400. In another example a linking member 405 can be disposed about both sides of the second body 400 and a third body 400, such that the linking members 405 span the contact area between the third contact surface 165 of the second body and the second contact surface 155 of the third body 400.

In one or more embodiments, screws, bolts and nuts, rivets, pins, male/female connecting devices, and the like can be disposed through the holes in the connecting members and the bodies 400 thereby securing the connecting member 405 about a first body 400 and a second body 400. As shown, each connecting member 405 has two holes disposed therethrough that correspond to and at least partially aligned with the two holes disposed through two adjacent bodies 400, for example the fourth hole 180 (disposed toward the fourth contact surface 175 between the fourth surface 140 and the second surface 120) and the first hole 180 (disposed toward the first contact surface 145 between the first surface 110 and the third surface 130), see FIGS. 1 and 2. Disposed through the aligned holes of the connecting member 405 and the adjacent bodies 400 are bolts 420 that have a nut disposed on the other side (not shown) to provide a secured connecting member 405 about two adjacent bodies 400. Although not shown, a connecting member 405 can be permanently secured to two adjacent bodies 400 by welding, adhesives, or any other suitable securing means.

The connecting member 405 can be made of any suitable material. The connecting member 405 can be made of a metal, metal alloy, non-metallic materials, or combinations thereof. Suitable metals, metal alloys, and non-metallic materials can include or be similar to those discussed and described above with reference to body 100. The connecting member 405 can be made using a non-metallic material or combination of non-metallic materials. The connecting member 405 can be formed using one or more molding processes including, but not limited to, pultrusion, VARTM, vacuum infusion molding, random glass cast and/or compression molding, or any combination thereof.

The connecting member 405 can include one or more inserts, metal, non-metallic, or a combination thereof, partially or completely encapsulated in a non-metallic material such as those discussed herein. The coating that can be disposed at least partially about the connecting member 405 can be similar to the coating that can be disposed about the body 100 and/or inserts disposed within bodies 100, discussed and described above.

Figure 5:
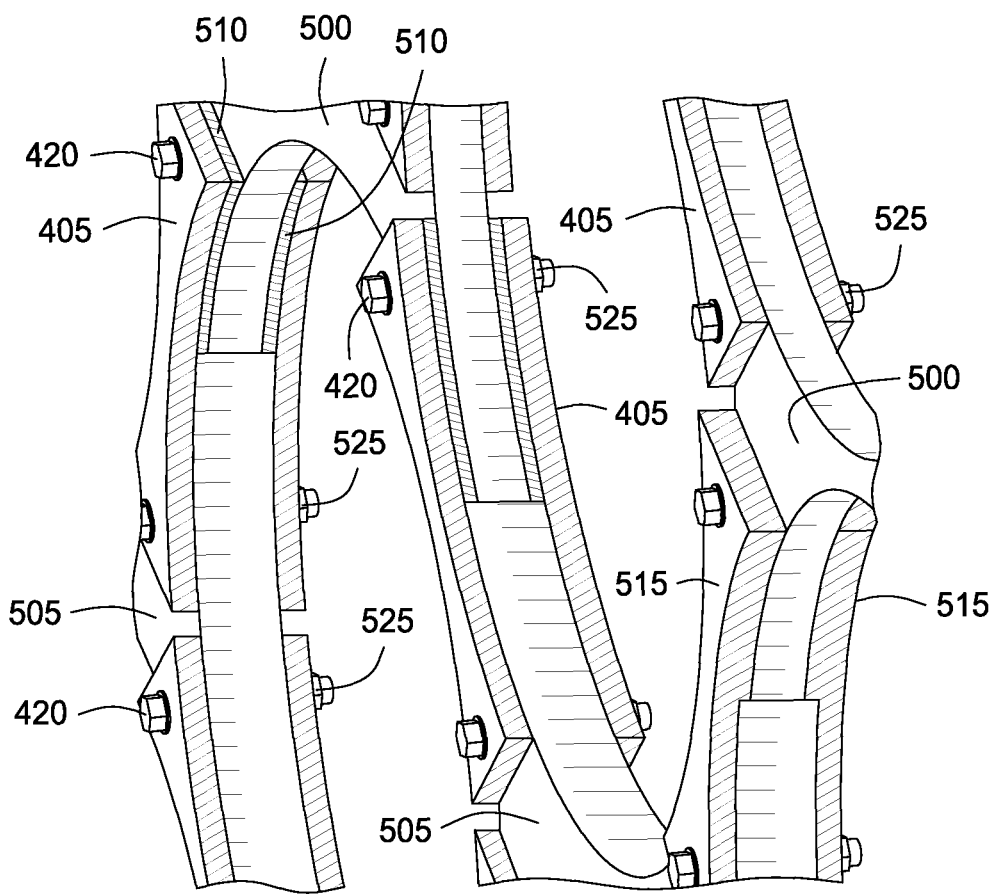
FIG. 5 depicts an isometric partial view of a plurality of illustrative support bodies positioned together using illustrative connecting members and/or spacers, according to one or more embodiments described.

FIG. 5 depicts an isometric partial view of a plurality of illustrative bodies positioned together using illustrative connecting members 405, 515, according to one or more embodiments. Bodies 500 and 505 can be similar to the bodies discussed and described above with reference to FIGS. 1-4. One or more bodies 500 having a first thickness can be positioned adjacent to one or more bodies 505 having a second thickness. The second thickness can be greater than the first thickness. A spacer 510 can be disposed between the connecting member 405 and the thinner body 500. The spacer 510 can occupy at least a portion of the gap between the connecting member 405 and the body 500.

The connecting member 405 and the spacer 510 can be integrated to provide an integrated connecting member 515 that includes the spacer 510 integrated therewith. This can reduce the number of parts required to secure the bodies 500, 505 together. The integrated connecting member 515 can also provide a more rigid and effective connection between the thinner body 500 and the thicker body 505. An integrated connecting member 515 can have a first thickness about a first portion and a second thickness about a second portion of the integrated connecting member 515. The first portion can be about half the length of the integrated connecting member 515 and the second portion can be the second half of the length of the integrated connecting member 515. The first portion can be a first thickness and the second portion can be a second thickness that includes the first thickness plus about one-half the difference in thickness between the thinner body 500 and the thicker body 505. In another example, the first portion can be a first thickness and the second portion can be a second thickness, that includes the first thickness plus about the thickness of the difference between the thinner body 500 and the thicker body 505.

The spacer 510 and/or connecting member 515 can be made of any suitable material. The spacer 510 and/or connecting member 515 can be made of a metal, metal alloy, and/or non-metallic materials. Suitable metals, metal alloys, and non-metallic materials can include or be similar to those discussed and described above with reference to body 100. The spacer 510 and/or connecting member 515 can be formed using one or more molding processes including, but not limited to pultrusion, VARTM, vacuum infusion molding; random glass cast and/or compression molding, or any combination thereof.

The spacer 510 and connecting member 515 can have any suitable thickness. For example, the spacer 510 and/or the connecting member 515 can have a thickness, measured from a first or front side to a second or rear side, ranging from a low of about 2 mm, about 3 mm, or about 5 mm to a high of about 10 mm, about 25 mm, about 50 mm, about 75 mm, about 100 mm, or more. In one or more embodiments, the connecting member 515 can be about 5%, about 20%, about 40%, about 50%, about 60%, about 80%, about 90%, about 95%, or about 100% as thick as the difference between the thickness of the two bodies 500, 505 that are being secured together.

The spacer 510 and connecting member 515 can have any suitable thickness. For example, the spacer 510 and/or the connecting member 515 can have a thickness, measured from a first or front side to a second or rear side, ranging from a low of about 2 mm, about 3 mm, or about 5 mm to a high of about 10 mm, about 25 mm, about 50 mm, about 75 mm, about 100 mm, or more. In an embodiment, the connecting member 515 can be about 5%, about 10%, about 15%, about 20%, about 25%, about 30%, about 35%, about 40%, about 45%, or about 50% as thick as the thicker body 505, of the two bodies 500, 505 being secured together. In another embodiment, the connecting member 515 can be about as thick as the thicker body 505, of the two bodies 500, 505 being secured together.

The spacer 510 and/or connecting member 515 can include one or more inserts, metal, non-metal, or a combination thereof, partially or completely encapsulated in a non-metallic material such as those discussed herein. The non-metallic material can be coated on the one or more inserts to provide the spacer 510 and/or connecting member and 515 using any suitable method. Suitable coating methods can be similar to those discussed herein.

Figure 6:
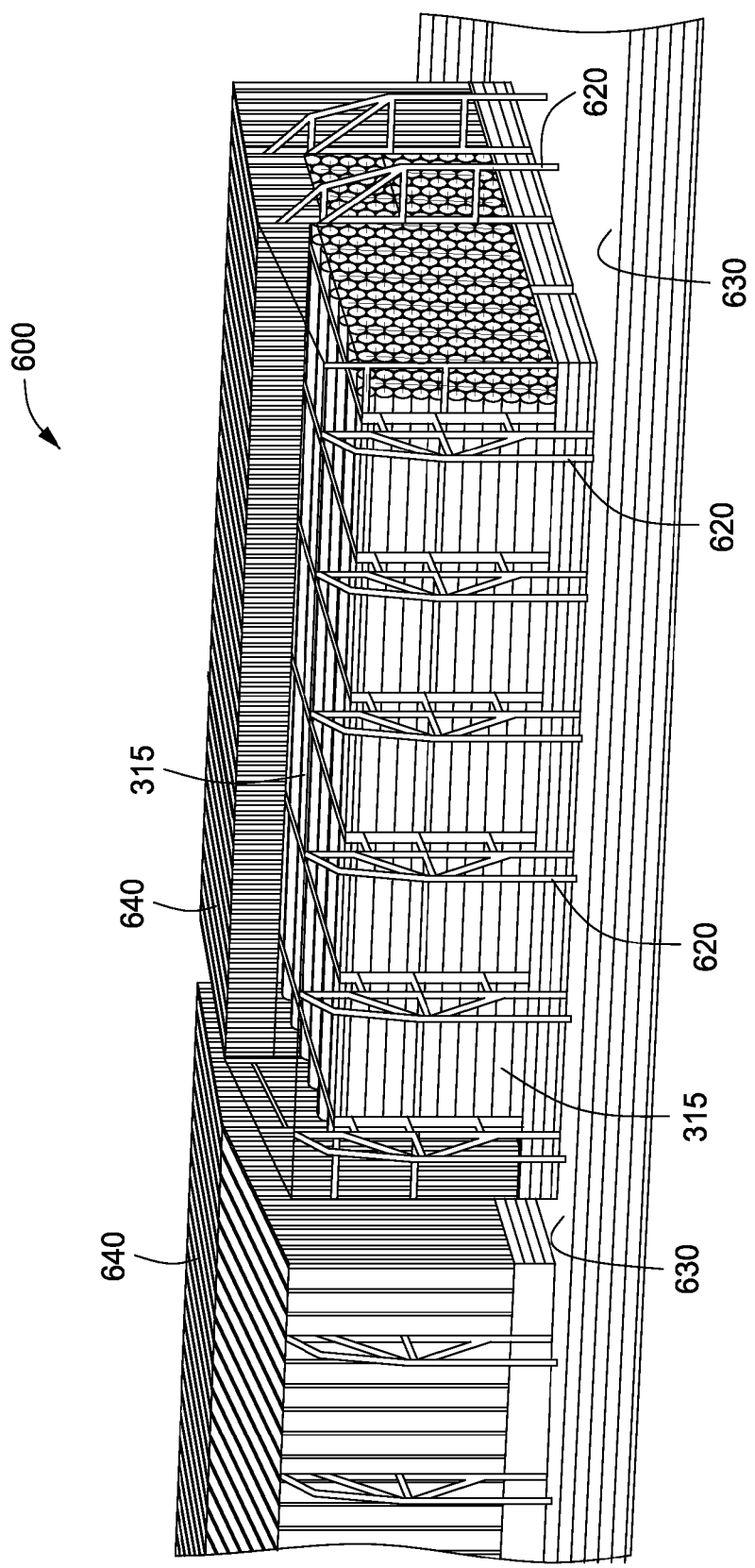
FIG. 6 depicts an isometric view of an illustrative shipboard pipe storage system using a plurality of support bodies, according to one or more embodiments described.

FIG. 6 depicts an isometric view of an illustrative shipboard pipe storage system 600 using a plurality of bodies 100, according to one or more embodiments. The one or more elongated members 315 can be one or more ferrous or non-ferrous pipe sections. The one or more elongated members 315 can be fabricated using one or more materials suitable for use in high pressure service, for example at a pressure of about 3.5 MPa or more, about 7 MPa, or more, about 14 MPa or more, about 20 MPa or more, or about 27 MPa or more. The one or more elongated members 315 can be fabricated using one or more materials suitable for use in low and/or high temperature service, for example at a temperature of about 300° C. or less, about 150° C. or less, about 100° or less, about 50° C. or less, about 0° C. or less, about −50° C. or less, about −75° C. or less, about −100° C. or less, about −130° C. or less, or about −150° C. or less. In one or more specific embodiments, the one or more elongated members 315 can be made from one or more materials suitable for use in cryogenic or near-cryogenic service, at temperatures of less than about −100° C. and at pressures greater than about 3.5 MPa.

In one or more embodiments, the one or more elongated members 315 can be circular and the outer diameter of the one or more elongated members 315 can range from a low of about 4 cm, about 10 cm, about 20 cm, about 30 cm, about 40 cm, or about 50 cm to a high of about 120 cm, about 140 cm, about 160 cm, about 180 cm, or more. The length of each elongated member 315 can range from a low of about 0.3 m, about 1 m, about 1.5 m, about 3 m, 6 m, or about 12 m to a high of about 20 m, about 40 m, about 80 m, about 120 m, about 160 m, about 200 m, or more.

A plurality of bodies 100 (e.g., FIGS. 1 and 2) can be disposed about at least a portion of the length of one or more elongated members 315 to provide a support system for the elongated members 315. One or more bodies 100 can be disposed about the length of the elongated members 315 in periodically spaced intervals, randomly spaced intervals, or a combination thereof. For example, one or more bodies 100 can be disposed about the length of two or more elongated members every 0.1 m, 1 m, every 2 m, every 5 m, every 8 m, every 10 m, or more. One or more bodies 100 can be disposed about the length of two or more elongated members 315 in an alternating pattern of spacing. For example, one or more bodies 100 can be disposed about the length of two or more elongated members 315, beginning at a first end of the elongated members 315 with one or more bodies 100 then disposed every 2 m, every 5 m, every 2 m, every 5 m, every 2 m, and so on until the second end of the two or more elongated members 315 is reached.

The vertical, lateral, and other forces and/or loads transferred to the bodies 100 can be transferred via one or more adjacent bodies 100, similar to the bodies discussed and described above with reference to FIG. 3, and eventually to the one or more structural frames 620. The one or more structural frames 620 can be an external structure adjacent or proximate to the elongated members 315 on one or more sides. The one or more structural frames 620 can be disposed about the elongated members 315 on two or more sides. As illustrated, the structural frame 620 includes three sides, with the deck 630 of the ship providing support to the fourth surface. The frame 620 can include four sides that completely surround the elongated members 315. All or a portion of an on-deck housing or siding 640 can be attached to the exterior surfaces of the one or more structural frames 620.

The one or more structural frames 620 can sit on and/or be secured to the deck 630 of a transport ship. The one or more structural frames 620 and the bodies 100 can be arranged to support or otherwise hold the elongated members 315 in a vertical orientation rather than horizontally along the deck 630. The elongated members 315 can be supported within a cargo storage area below a deck of a transport ship, for example. Two or more shipboard pipe storage systems 600 can be used. For example, two or more shipboard pipe storage systems 600 can be located about the deck 630, within the hull or cargo area of the ship below the deck 630, or a combination thereof.

Figure 7A:
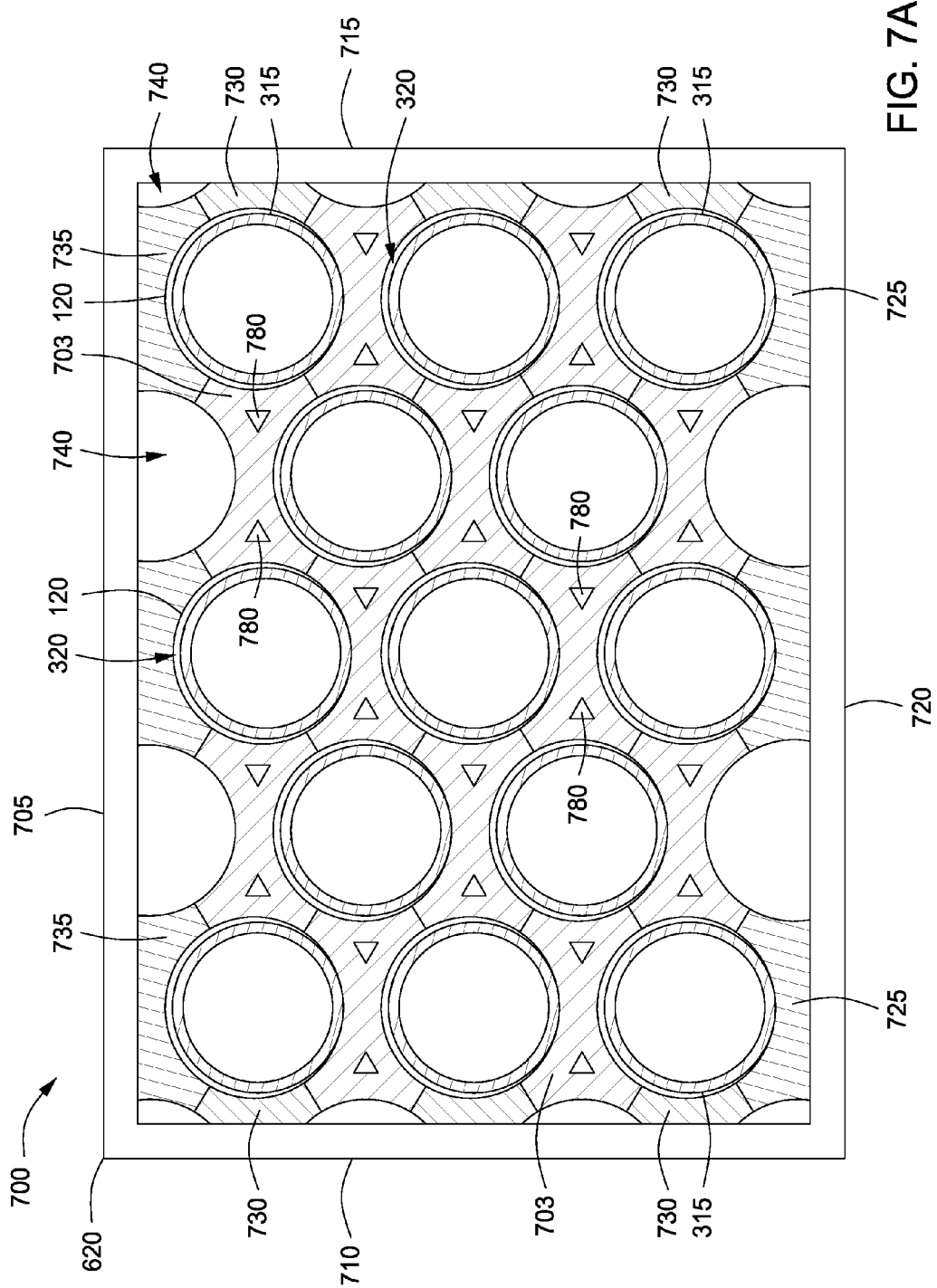
FIG. 7A depicts a cross-sectional view of an illustrative support system for supporting a plurality of elongated members using a plurality of support bodies, according to one or more embodiments described.

FIG. 7A depicts a cross-sectional view of an illustrative support system 700 for supporting a plurality of elongated members 315 using a plurality of bodies 703, according to one or more embodiments. The bodies 703 can be similar to the bodies discussed and described above with reference to FIGS. 1-6. The elongated members 315 can be disposed within a structural frame 620 surrounding the elongated members 315, as discussed and described above with reference to FIG. 6. The structural frame 620 can include a first side 705, a second side 710, a third side 715, and a fourth side 720, which can surround the elongated members 315 on four sides as depicted in FIG. 7A. The first side 705, second side 710, third side 715, and fourth side 720 can be joined together using any suitable fastening means, such as welding, bolts and nuts, rivets, and the like.

The elongated members 315 can be supported using bodies 703 disposed between adjacent elongated members 315. One or more first half supports 725 can be disposed between an elongated member 315 and the fourth surface of the frame 620. One or more second half supports 735 can be disposed between an elongated member 315 and the first side 705 of the frame 620. One or more lateral or side supports 730 can be disposed between an elongated member 315 and a side of the frame 620, for example the second side 710.

Referring to FIGS. 1 and 2, the first half support 725 and the second half support 735 can be a body 100 cut along a longitudinal axis. The first half support 725 can include the first surface 110, a portion of the third surface 130, and a portion of the fourth surface 140. The second half support 735 can include the second surface 120 and the remaining portion of the third surface 130 and the fourth surface 140. In one or more embodiments, the first half support 725 and/or the second half support 735 can be independently made, i.e. not cut from a body 1300.

A side support 730 can be a body 100 cut along a latitudinal axis to provide two independent lateral supports 730. A side support 730 can be a body 100 cut along two latitudinal axes to provide two side supports 730 and the portion of a body 100 disposed between the two latitudinal axes that can be discarded. The side support 730 can be a body 100 cut along the latitudinal center axis to provide two identical, independent, side supports 730. Using portions of a body 100 can leave holes or spaces 740 disposed along the inner perimeter of the frame 620.

The first half supports 725, the second half supports 735, and the side supports 730 can be made of any suitable material. The first half supports 725, the second half supports 735, and the side supports 730 can be made from the same or similar materials as the body 100, discussed and described above with reference to FIGS. 1 and 2.

The first half supports 725, the second half supports 735, and the side supports 730 can be any suitable thickness. The first half supports 725, the second half supports 735, and the side supports 730 can have a thickness, measured from a first or front side to a second or rear side, ranging from a low of about 1 cm, about 2 cm, or about 3 cm to a high of about 15 cm, about 25 cm, about 35 cm, about 40 cm, or about 45 cm or more. In at least one specific embodiment, the first half supports 725, the second half supports 730, and the side supports 730 can have a thickness of about 7.5 cm, about 15 cm, about 30 cm, about 38 cm, or more.

The one or more first half supports 725, second half supports 735, and lateral supports 730 can include one or more inserts, which can be metal or non-metallic, or a combination thereof, partially or completely disposed in a non-metallic material such as those discussed herein. The non-metallic material can be coated on the one or more inserts to provide a first half supports 725, a second half supports 735, and/or a side supports 730 using any suitable method. Suitable coating methods can be similar to those discussed herein.

The vertical and lateral forces imposed on each body 703 can be transmitted via the interfaces between the contact surfaces as discussed and described above with reference to FIGS. 3 and 6. Eventually, the forces transmitted through the bodies 703 can be transmitted or otherwise transferred from the first half supports 725, the second half supports 735, and/or the side supports 730. The first half supports 725, second half supports 735, and/or side supports 730 can transmit or otherwise transfer all or a portion of the forces to the one or more structural frames 620.

Figure 7B:
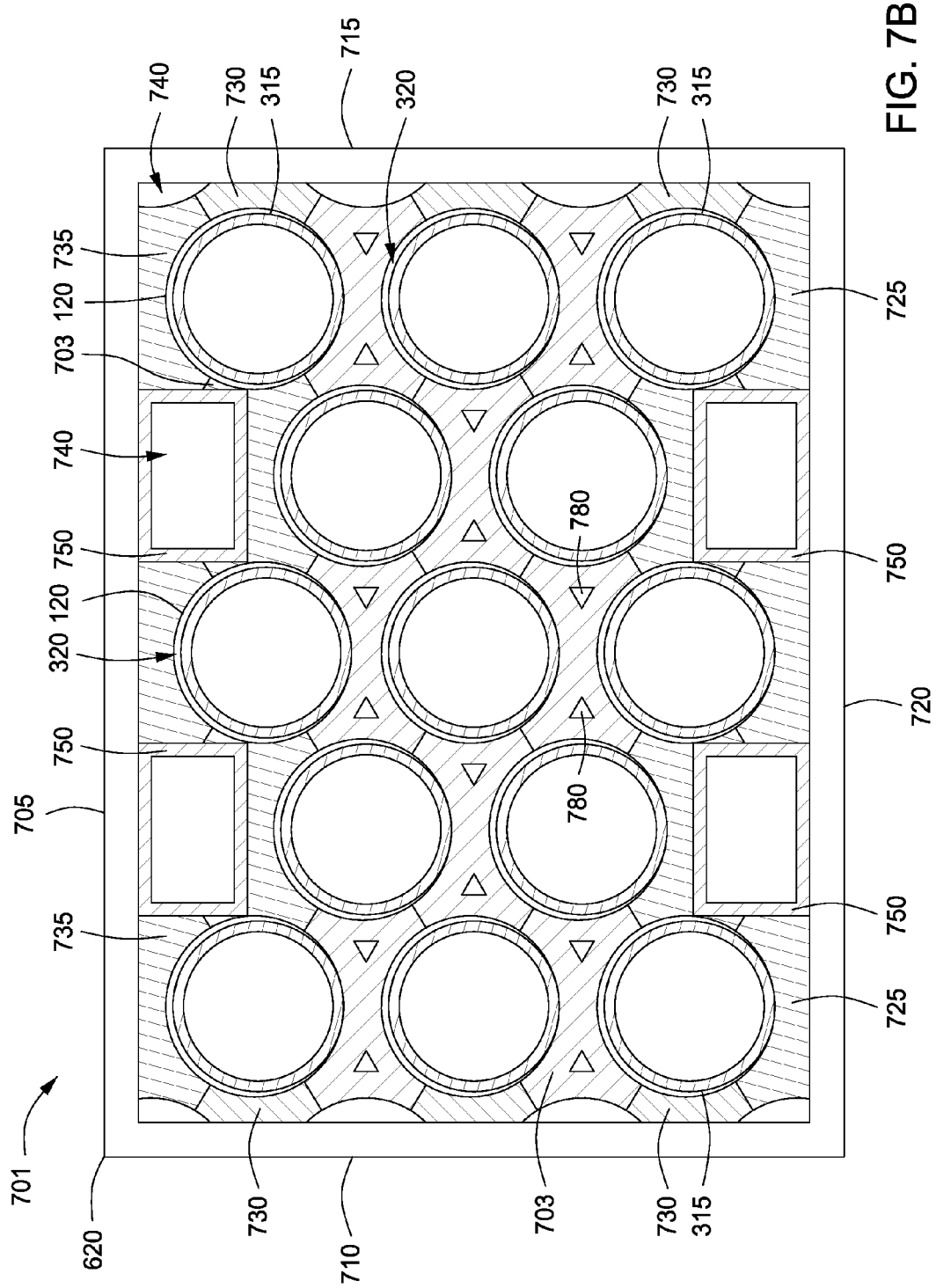
FIG. 7B depicts a cross-sectional view of another illustrative support system for supporting a plurality of elongated members using one or more support bodies, according to one or more embodiments described.

FIG. 7B depicts a cross-sectional view of another illustrative support system 701 for supporting a plurality of elongated members 315 using one or more bodies 703, according to one or more embodiments. The support system 701 can be similar to the support system 700, depicted in FIG. 7A. The support system 701 can include one or more structural support members 750. The structural support members 750 can be disposed between the first side 705 and/or the fourth side 720 of the frame 620 and the elongated members 315 that are below or above the upper and lower horizontal rows of aligned elongated members 315 (as oriented in FIG. 7B).

The structural support members 750 can be integral with the first side 705 and/or the fourth side 720 of the frame 620 or otherwise secured thereto. The structural support members 750 can be welded to the first side 705 and/or the fourth side 720. The structural support members 750 can be secured with bolts, bolts and nuts, rivets, screws, or any other suitable fastener. The structural support members 750 can "lower" the first side 705 and "raise" the fourth side 720 toward the elongated members 315, such that the first half-support 725 and/or the second half support 735 or a modified first half-support 725 and/or second half support 735, can be disposed between the elongated members 315 and the structural support members 750. Although not shown, a modification similar to the structural support member 750 that can be disposed on the first side 705 and the fourth side 720 of the frame 620 can be made along the second side 710 and the third side 715 of the frame 620.

As depicted in FIGS. 7A and 7B, the bodies 703 are oriented with their longitudinal axes parallel to the first side 705 and the fourth side 720 of the support frame 620 and the elongated members 315 are in straight vertical rows with the elongated members 315 staggered in the horizontal direction (relative to the first side 705 and the fourth side 720). Although not shown, the bodies 703 can be oriented with their longitudinal axes parallel to the second side 710 and third side 715 of the support frame 620. This orientation of the bodies 703 can provide elongated members 315 in straight horizontal rows that are staggered in the vertical direction (relative to the first side 705 and the fourth side 720). This orientation of the bodies 703 can require the radius of curvatures for the first surface 110, the second surface 120, the third surface 130 and/or the fourth surface 140 to be varied according to one or more embodiments discussed and described above with reference to FIGS. 1 and 2. Although not shown, the bodies 703 can be oriented with their longitudinal axes non-parallel to the first side 705 and the fourth side 720 of the support frame 620 and non-parallel to the second side 710 and the third side 715 of the support frame 620.

As depicted in FIGS. 7A and 7B, there are an odd number of elongated member 315 columns (5 as depicted). Also as illustrated, the first column of elongated members 315 includes an odd number of elongated members 315. There can be an even number of elongated member 315 columns and/or an even number of elongated members 315 in the first and last columns, and alternating columns therebetween of the elongated members 315. An even number of elongated member 315 columns can provide another shaped partial-body (not shown) that can be disposed in the corner between the first side 705 and the second side 710 and the first side 705 and the third side 715. An even number of elongated members 315 in the first and last columns of elongated members 315 can also provide another partial-body (not shown) that can be disposed in the corner between the fourth side 720 and the second side 710 and the fourth side 720 and the third side 715.

As shown in FIGS. 7A and 7B, the gap 320 between the first surface 110, the second surface 120, the third surface 130, and/or the fourth surface 140 of the bodies 703 and an elongated member 315 can extend about a majority of the elongated member 315. To provide this type of arrangement the first surface 110, the second surface 120, the third surface 130, and/or the fourth surface 140 can have a radius of curvature larger than the radius of the elongated member 315 about which the body 700 is disposed. A portion of the third surface 130 and a portion of the fourth surface 140 can have a radius of curvature that corresponds to the radius of the elongated member 315 and a portion of the third surface 130 and the fourth surface 140 can have a radius of curvature that is larger than the radius of the elongated member 315. As discussed above, the radius of curvature of the first surface 110, the second surface 120, the third surface 130, and the fourth surface 140 can be greater than the radius of the elongated members 315 to account for and to accommodate any dimensional variations.

Also shown in FIGS. 7A and 7B, are triangular holes 780 disposed through the bodies 700. Triangular or other polygonal holes 780 can provide a hole through the bodies 700 that can accept rod or other elongated members (not shown) similarly shaped. The polygonal shape of the holes 780 can prevent an elongated member disposed therethrough from rotating within the holes 780.

Figure 8A:
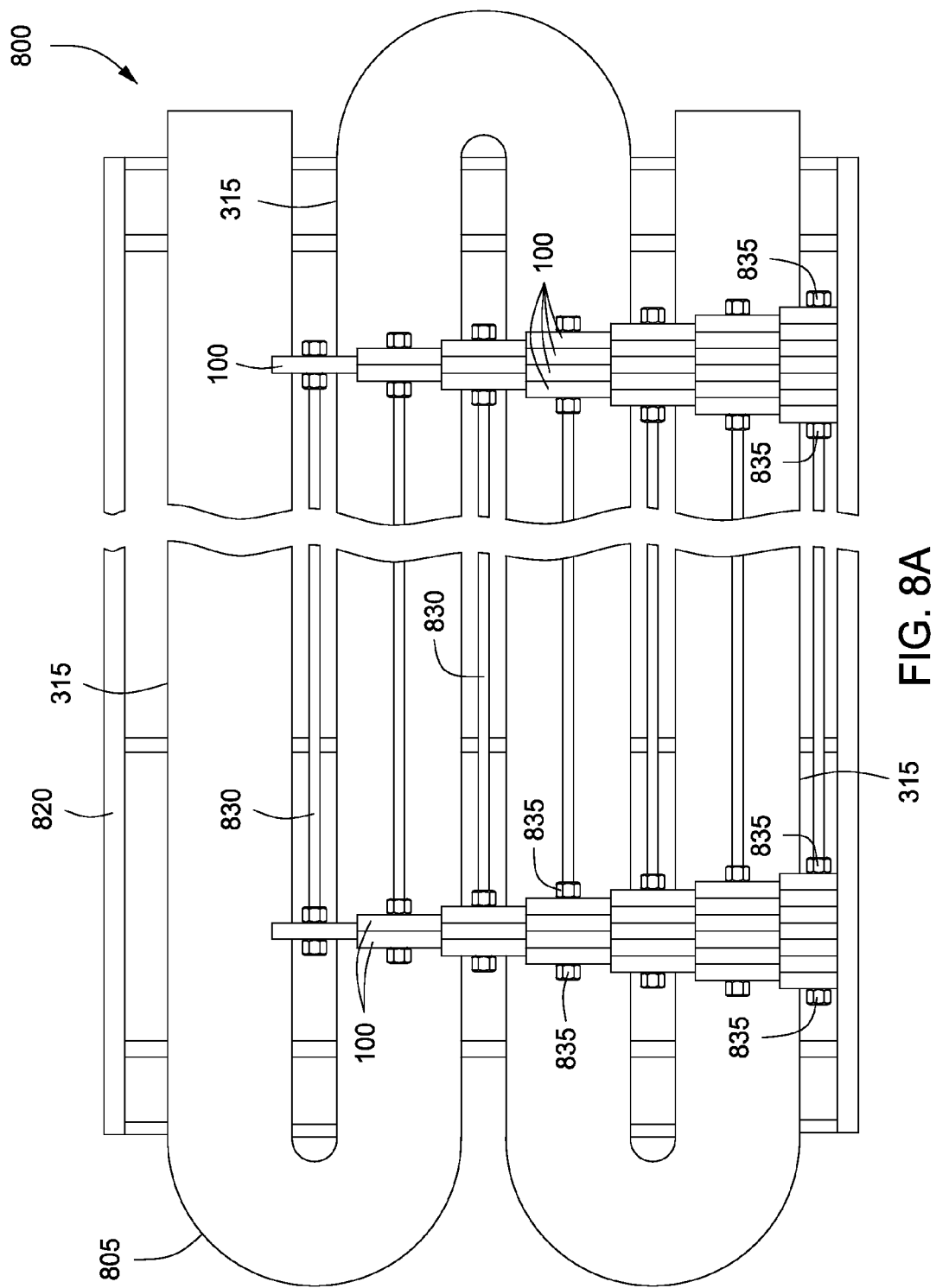
FIG. 8A depicts an elevation view of an illustrative serpentine pipeline support system, according to one or more embodiments described.
Figure 8B:
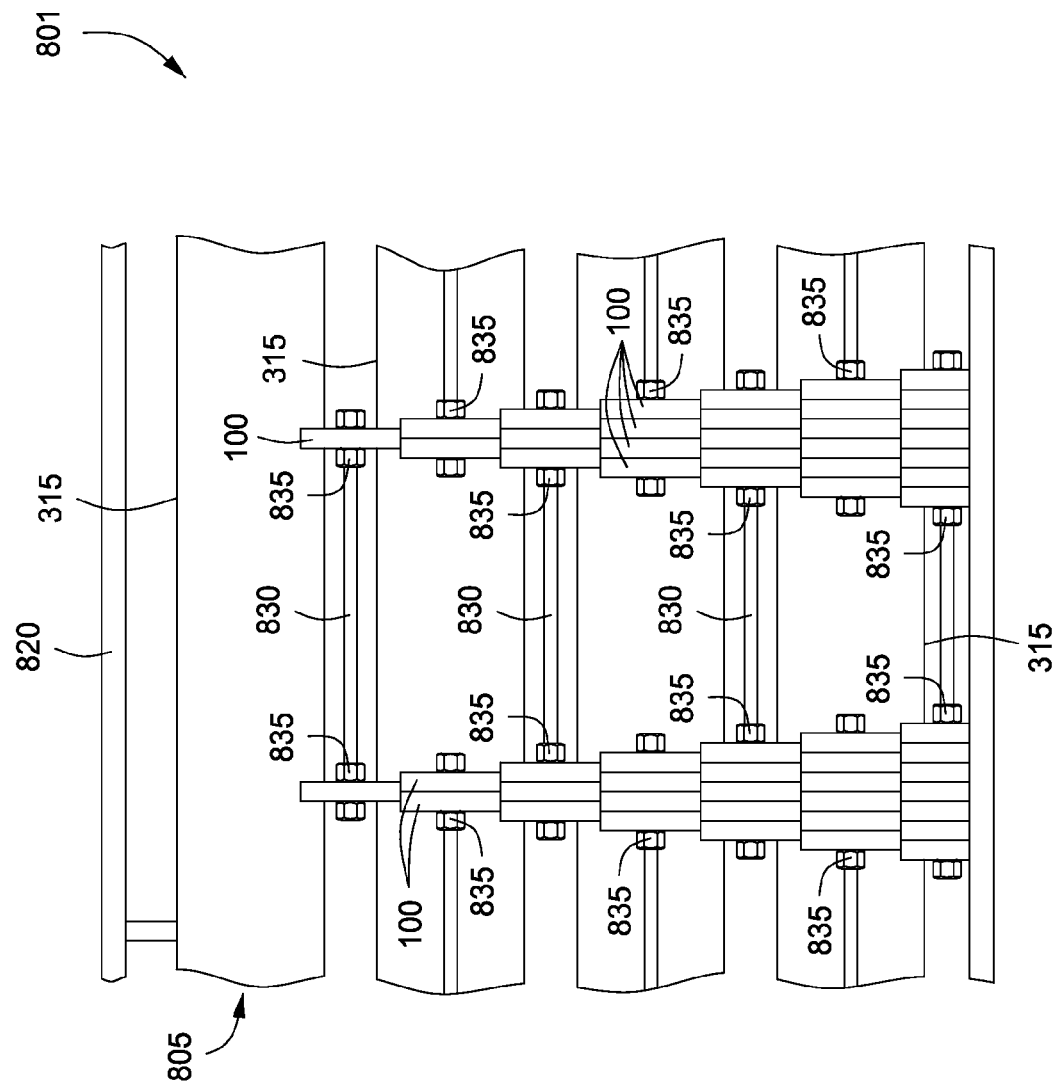
FIG. 8B depicts an elevation view of another illustrative serpentine pipeline support system, according to one or more embodiments described.

FIG. 8A depicts an elevation view of an illustrative serpentine pipeline support system 800, according to one or more embodiments. FIG. 8B depicts an elevation view of another illustrative serpentine pipeline support system 801, according to one or more embodiments. The support systems 800, 801 can include a structural support frame 820. The structural support frame 820 can be similar to the support frame 620 discussed and described above with reference to FIGS. 6 and 7. A serpentine pipeline 805 formed from a plurality of elongated members 315 can be supported by bodies 100.

Two or more elongated members 315, for example tubular members, can be sequentially connected to form a single, continuous, pipeline 805. The elongated members 315 can be connected using 180° bends, 90° elbows, to form a serpentine pipeline 805 as depicted in FIG. 8A. The serpentine pipeline 805 can include about 10 or more individual elongated members 315, about 20 or more individual elongated members 315, about 50 or more individual elongated members 315, about 100 or more individual elongated members 315, about 200 or more individual elongated members 315, about 300 or more individual elongated members 315, about 400 or more individual elongated members 315, or about 500 or more individual elongated members 315. One or more bodies 100 can be disposed between all or a portion of the elongated members 315 forming the serpentine pipeline 805.

Any number of bodies 100 can be disposed between adjacent elongated members 315. One or more tie-rods 830 and retaining nuts 835 can be used to secure the plurality of bodies 100 between the elongated members 315. The one or more tie-rods 830 can penetrate through the one or more bodies 100 via the one or more holes 780 disposed on each body 100 (see FIGS. 1, 2, 7A and 7B). The cross sectional area of the one or more tie-rods 830 can depend upon the horizontal span or length between the bodies 100, and the overall length of the elongated members 315. The one or more tie-rods 830 can have a circular cross section. The one or more tie-rods 830 can have a polygonal cross section. The one or more tie rods 830 can have a diameter ranging from a low of about 0.3 cm, about 0.6 cm, about 1 cm, or about 1.25 cm to a high of about 2 cm, about 3 cm, about 4 cm, about 5 cm, or more. The one or more tie-rods 830 can be made of a low temperature resistant material capable of withstanding cryogenic or near-cryogenic temperatures.

One or more nuts 835 or any other fastener can be secured about the ends of the tie-rods 830 proximate the outer side of a body 100. One or more nuts 835 or other fasteners can be secured about the tie-rods 830 proximate the inner side of a body 100. The nuts 835 or other fasteners can maintain the one or more bodies 100 disposed therebetween in a fixed position.

Any number of bodies 100 can be stacked side-to-side or otherwise grouped together. For example, two bodies 100 can be stacked side-to-side to provide a body having a thickness of about twice as much as a single body 100. In another example, three bodies 100 can be stacked side-to-side to provide a body having a thickness about three times as much as a single body 100. In similar fashion, any number of bodies 100 can be stacked side-to-side to provide a body having any desired thickness.

Any number of bodies 100 can be disposed between adjacent elongated members 315. A different or varying number of bodies 100 can also be disposed between adjacent elongated members 315. For example, a single body 100 can be disposed between the topmost elongated member 315 and the second topmost elongated member 315. The support level or layer formed by stacking three bodies 100 side-to-side can be disposed between the second topmost elongated member 315 and the third topmost elongated member 315. The body 100 disposed between the support level or layer having one body 100 and the support level or layer having three bodies 100 can have two bodies 100. Therefore, as multiple levels of elongated members 315 are supported by the bodies 100 a "stair-step" or "Christmas tree" arrangement containing more bodies 100 at each level can be provided. The "stair-step" or "Christmas tree" arrangement can increase in the number of bodies 100 at each level, every other level, every two levels, every three levels, every four levels, every five levels, or more. In other words, each support level does not require increasing the number of bodies 100. Two or more levels or rows of bodies 100 can include the same number of bodies 100. Although not shown, bodies 100 can be disposed between the uppermost elongated members 315 and can span the entire length between the top of the frame 820 to the bottom of the frame 820.

Figure 9:
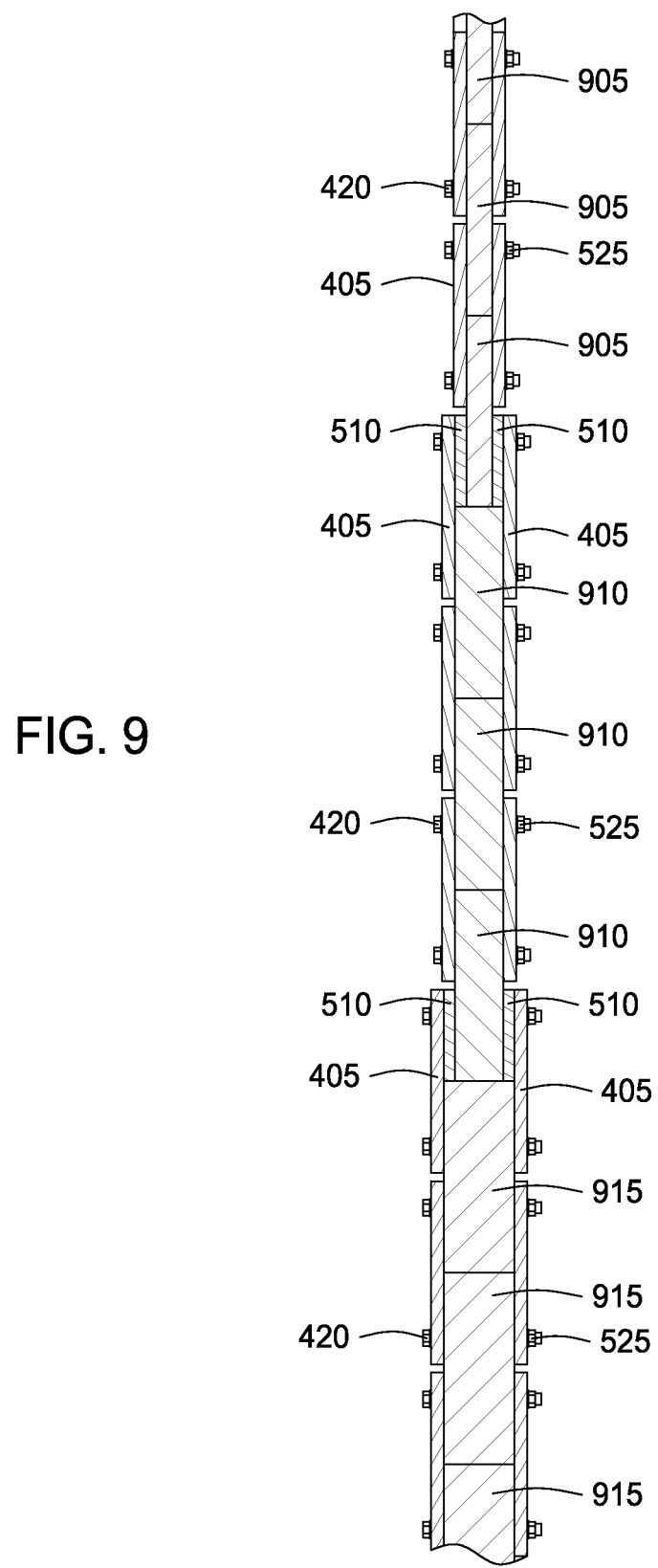
FIG. 9 depicts an elevation view of a plurality of illustrative support bodies positioned together using illustrative connecting members and/or spacers, according to one or more embodiments described.

FIG. 9 depicts an elevation view of a plurality of illustrative bodies positioned together using illustrative connecting members 405 and/or spacers 510, according to one or more embodiments. As discussed and described above with reference to FIG. 5, bodies 905, 910, and/or 915 of varying thickness can be secured together using connecting members 405 and spacers 510. Also, as mentioned above, the connecting members 405 and spaces 510 can be integrated into a single piece or member to provide an integrated connecting member 515. The bodies 905, 910, and 915 can be similar to the bodies discussed and described above with reference to FIGS. 1-8B.

The increase in thickness from the body 905 to the body 910 can provide an arrangement of bodies that are capable of supporting greater forces as additional weight is added to the bodies via additional elongated members 315 and other bodies (see FIGS. 3, 6, 7A and 7B, 8A and 8B above). For example, the increase in thickness from the body 910 to the body 915 can further provide an arrangement of bodies capable of supporting even greater forces. Any thickness of bodies 905, 910, and/or 915 can be used, which can depend, at least in part, on the size of the elongated members requiring support, the weight of the elongated members requiring support, transportation conditions, such as rocking encountered on a ship or bumps encountered on a road during transport are experienced, engineering factors, safety factors, the particular fluid contained within the elongated members, and the like.

Figure 10:
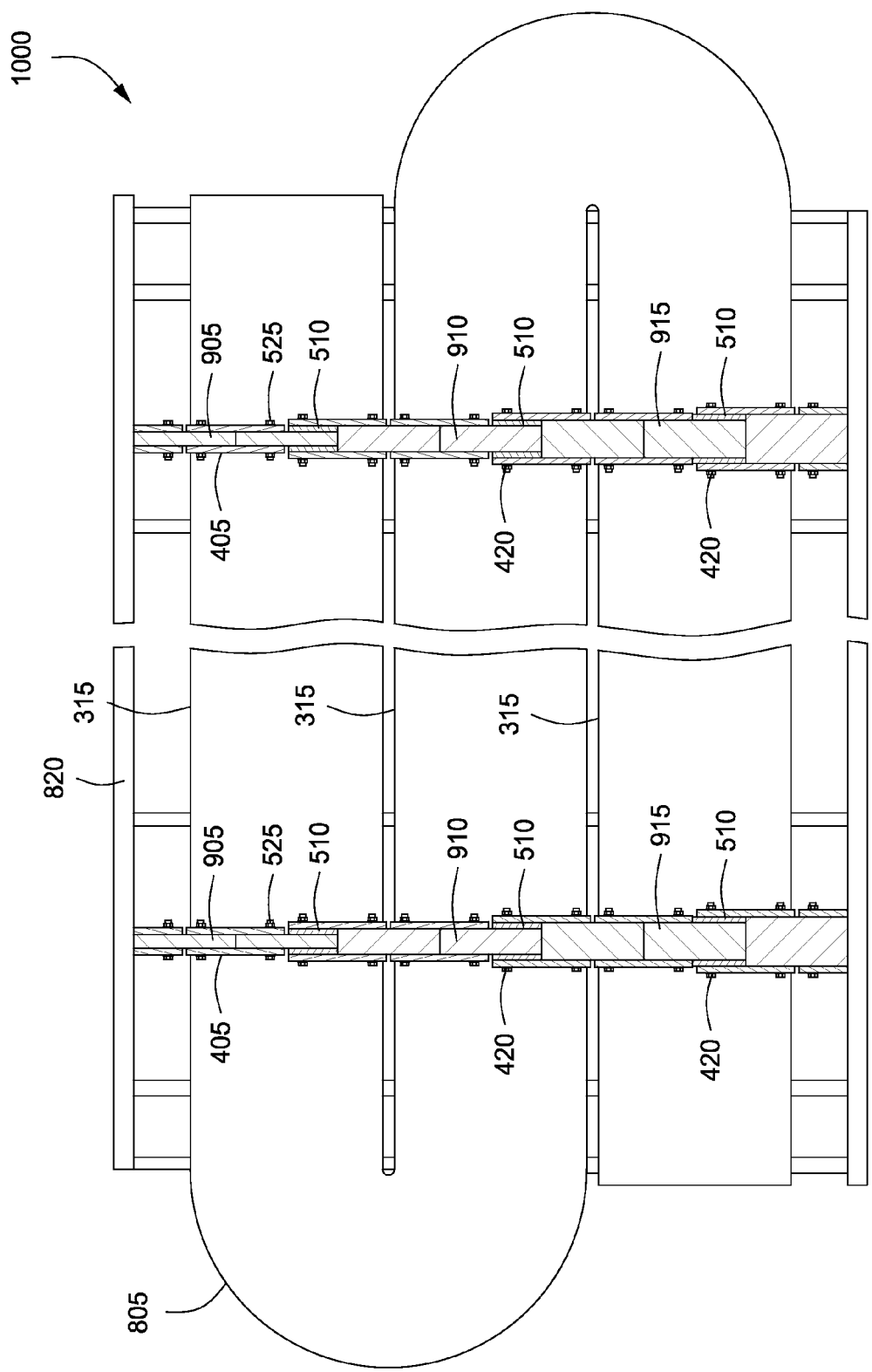
FIG. 10 depicts an elevation view of an illustrative serpentine pipeline support system, according to one or more embodiments described.

FIG. 10 depicts an elevation view of an illustrative serpentine pipeline support system 1000, according to one or more embodiments. The support system 1000 can include a structural support frame 820, which can be similar to the support frames 620, 820 discussed and described above with reference to FIGS. 6-8B. The support system 1000 can include a plurality of bodies 905, 910, 915, connecting members 405, fastening members (bolts 420 and nuts 525 as shown), and spacers 510. A serpentine pipeline 805 formed from a plurality of elongated members 315 can be supported by bodies 905, 910, and/or 915. As shown, body 905 is thinner than body 910, which is thinner than body 915.

The bodies 905, 910, and 915 can be used to support the serpentine pipeline 805. In order to support more weight as more elongated members 315 are supported, the thickness of the bodies 905, 910, 915 can increase as discussed and described above with reference to FIGS. 5 and 9. The connecting members 405 and the spacers 510 can be similar as discussed and described above with reference to FIGS. 4, 5, and 9. Although not shown, the connecting members 405 and the spacers 510 can be integrated together to provide an integrated connecting member 515 as depicted in FIG. 5.

The bodies 905, 910, 915 having differing thicknesses can be disposed between adjacent elongated members 315. In one or more embodiments, bodies 905, 910, and 915 can increase in thickness as the number of elongated members 315 above the bodies increases. In this manner, as multiple levels of elongated members 315 are supported by the bodies 905, 910, and/or 915, a "Christmas tree" arrangement containing additional, thicker bodies toward the bottom of the support system 1000 than toward the top of the support system 1000 can be provided. The "Christmas tree" arrangement can include a thicker body at each level, every other level, every two levels, every three levels, every four levels, every five levels, and or more. In other words, each support level does not require increasing the thickness of body. Two or more levels or rows of bodies can include the same number of bodies. In one or more embodiments, the bodies can be disposed between the uppermost elongated member(s) 315 and can span the at least a portion of the length between the top of the frame 820 to the bottom of the frame 820.

Figure 11:
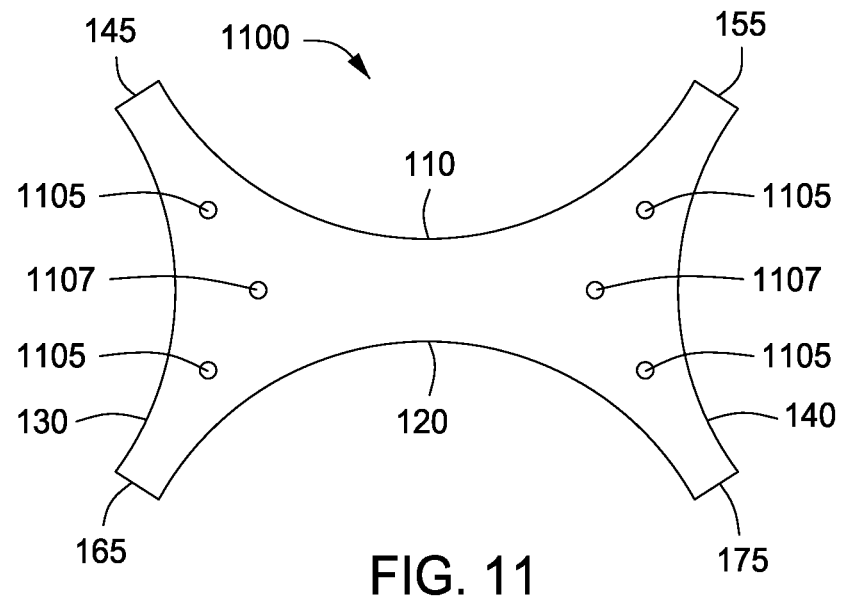
FIG. 11 depicts a side view of an illustrative support body, according to one or more embodiments described.

FIG. 11 depicts a side view of an illustrative body 100, according to one or more embodiments. The body 1100 can be similar to the bodies discussed and described above with reference to FIGS. 1-10. One or more holes, apertures, or other openings 1105 can be disposed through the body 1100. As depicted in FIG. 11, a first hole 1105 is disposed toward the first contact surface 145 disposed between the first surface 110 and the third surface 130, a second hole 1105 is disposed toward the second contact surface 155 between the first surface 110 and the fourth surface 140, a third hole 1105 is disposed toward the third contact surface 165 between the third surface 130 and the second surface 120, and a fourth hole 1105 is disposed toward the fourth contact surface 175 between the fourth surface 140 and the second surface 120. The holes 1105 can receive a fastener for securing connecting members thereto as discussed and described above with reference to FIGS. 4, 5, 9 and 10.

One or more holes, apertures, or other openings 1107 can be disposed through the body 1100. As depicted in FIG. 11, a first hole 1107 is disposed about the longitudinal center axis toward the third surface 130 and a second hole 1107 is disposed about the longitudinal center axis toward the fourth surface 140. The holes 1107 can receive the tie-rod 830 as discussed and described above with reference to FIGS. 8A and 8B.

Figure 12:
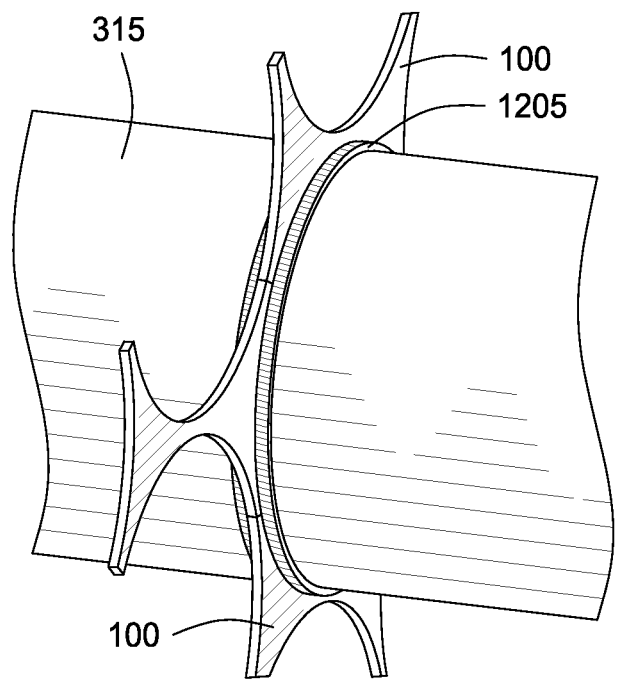
FIG. 12 depicts an isometric view of a plurality of illustrative support bodies disposed about a support band that can be disposed about an elongated member, according to one or more embodiments described.

FIG. 12 depicts an isometric view of a plurality of illustrative bodies 100 disposed about a support band 1205 that can be disposed about an elongated member 315, according to one or more embodiments. The support band 1205 can maintain or reduce the movement of the bodies 100 aligned around the elongated member 315. The support band 1205 can prevent or reduce the amount a body 100 can shift about the elongated member 315.

The support band 1205 can provide a non-slip surface for the bodies 100. The support band 1205 can have a channel or groove having a width of about the thickness of the bodies 100. The bodies 100, due to the weight of the elongated members 315 can press into or otherwise deform the support band 1205 to provide a groove about which the body 100 rests in.

The support band 1205 can be secured about at a least a portion of the outer diameter of the elongated member 315. The support band 1205 can be secured about the entire diameter of the elongated member 315. The support band 1205 can be secured about the elongated member 315 using a metal banding strap (not shown). The support band 1205 can be made from any suitable material, including one more thermoplastics, elastomers, rubbers, and/or urethanes.

The elongated member 315 can include a channel, groove, or other recess in which the bodies 100 can rest within. The channel, groove, or other recess about the elongated member 315 can be sufficient to reduce or prevent the bodies 315 from moving or otherwise becoming unaligned. Also not shown, the elongated member 315 can include a ridge, pin, weld bead, or other protrusion about each side of the bodies 100 to align the bodies 100 and reduce or prevent the bodies 100 from moving or otherwise becoming unaligned. In one or more embodiments, two support bands 1205 can be disposed about the elongated member 315, such that a gap is provided therebetween. The body 100 can rest within the gap provided between the two support bands 1205, which can help to reduce and or prevent movement of the bodies 100 about the longitudinal axis of the elongated members 315.

Figure 13:
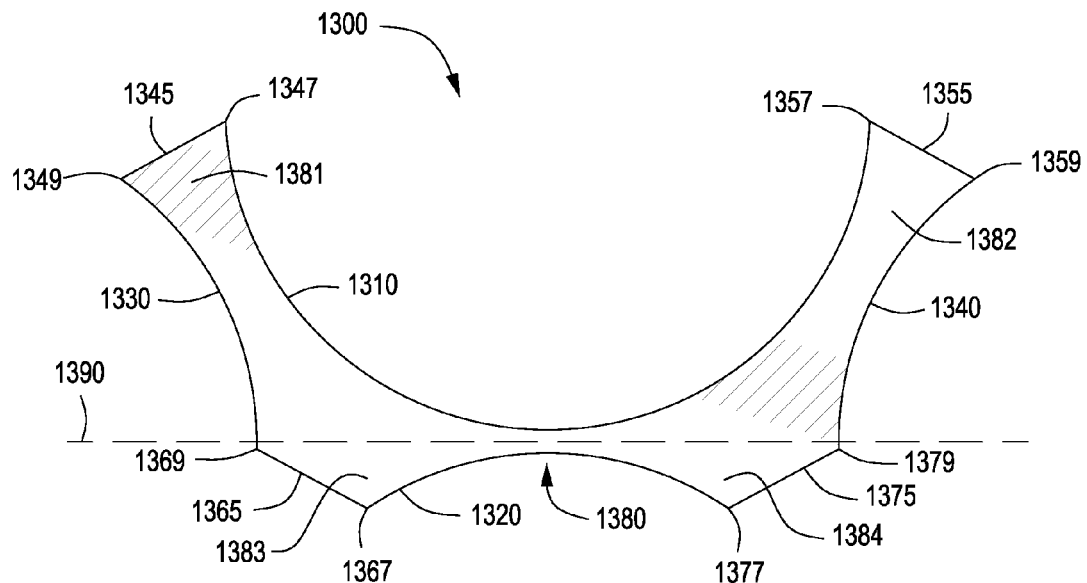
FIG. 13 depicts a side view of another illustrative support body, according to one or more embodiments described.
Figure 14:
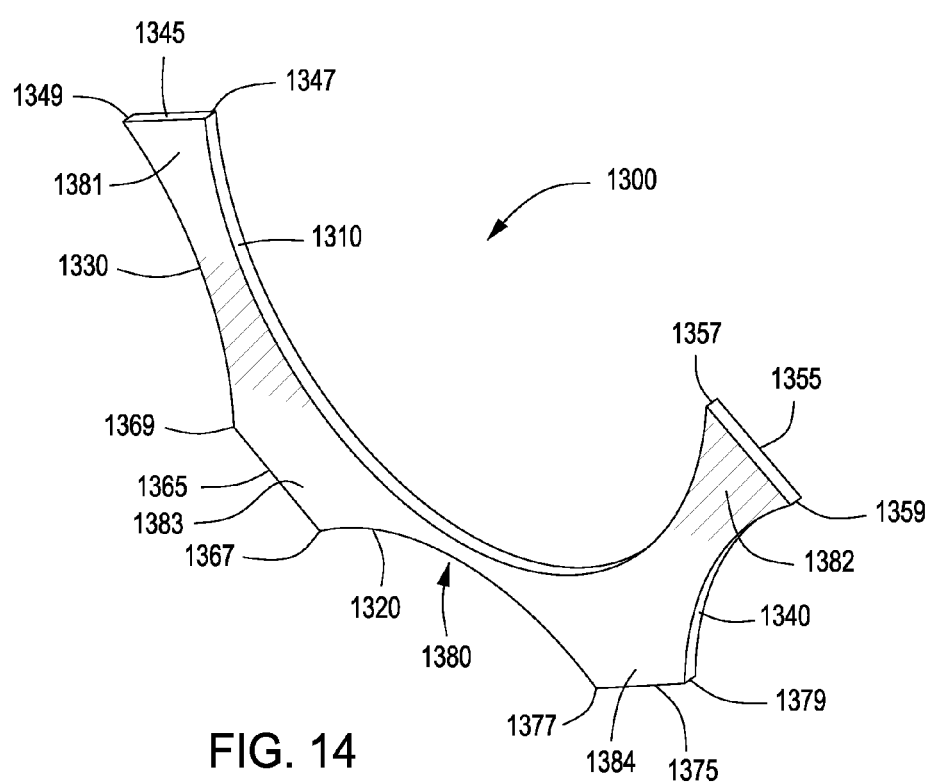
FIG. 14 depicts an isometric view of the illustrative support body depicted in FIG. 13.

FIG. 13 depicts a side view of another illustrative body 1300 and FIG. 14 depicts an isometric view of the illustrative body 1300 depicted in FIG. 13, according to one or more embodiments. Referring to FIGS. 13 and 14, each body 1300 can be a monolithic structure having outer surfaces or sides, e.g. a first surface 1310, a second surface 1320, a third surface 1330, and a fourth surface 1340. In one or more embodiments, each body 1300 can be formed from two or more structures or components to provide a body having the outer surfaces or sides 1310, 1320, 1330, 1340. The first surface 1310 and the second surface 1320 can be disposed on opposing ends of the body 1300 and the third surface 1330 and the fourth surface 1340 can be disposed on opposing ends of the body. Each body 1300 can further include one or more contact surfaces (four are shown 1345, 1355, 1365, 1375) disposed between the surfaces 1310, 1320, 1330, 1340.

The first surface 1310 and the third surface 1330 can be connected or otherwise joined together by the first contact surface 1345. The first surface 1310 and the fourth surface 1340 can be connected or otherwise joined together by the second contact surface 1355. The second surface 1320 and the third surface 1330 can be connected or otherwise joined together by the third contact surface 1365. The second surface 1320 and the fourth surface 1340 can be connected or otherwise joined together by the fourth contact surface 1375. In one or more embodiments, the first surface 1310, the first contact surface 1345, the third surface 1330, the third contact surface 1365, the second surface 1320, the fourth contact surface 1375, the fourth surface 1340, and the second contact surface 1355 can provide the perimeter of the body 1300.

The first surface 1310, the second surface 1320, the third surface 1330, the fourth surface 1340, or any combination thereof can be curved. The first surface 1310, the second surface 1320, the third surface 1330, and/or the fourth surface 1340 can be concave. For example, the first surface 1310, the second surface 1320, or both can curve toward a longitudinal axis therebetween or first centerline of the body 1300. The third surface 1330, the fourth surface 1340, or both can curve toward a latitudinal axis therebetween or second centerline of the body 1300. The first surface 1310, the second surface 1320, or both can curve toward a longitudinal axis therebetween having any suitable curvature or combination of curvatures.

Similar to the first surface 110 and the second surface 120, discussed and described above, the first surface 1310 and the second surface 1320 or both can have a variably curved profile that can extend from the first contact surface 1345 to the second contact surface 1355 and the third contact surface 1365 to the fourth contact surface 1375, respectively. Also, similar to the third surface 130 and the fourth surface 140, discussed and described above, the third surface 1330 and the fourth surface 1340 or both can have a variably curved profile that can extend from the first contact surface 1345 to the third contact surface 1365 and the second contact surface 1355 to the fourth contact surface 1375, respectively.

In one or more embodiments, the first surface 1310 can have a variably curved profile that can extend from the first contact surface 1345 to the second contact surface 1355. In one or more embodiments, the second surface 1320 can have a variably curved profile that can extend from the third contact surface 1365 to the fourth contact surface 1375. In one or more embodiments, the third surface 1330 can have a variably curved profile that can extend from the first contact surface 1345 to the third contact surface 1365. In one or more embodiments, the fourth surface 1340 can have a variably curved profile that can extend from the second contact surface 1355 to the fourth contact surface 1375. In one or more embodiments, any one or more of the first contact surface 1345, second contact surface 1355, third contact surface 1365, and/or the fourth contact surface 1375 can have a variably curved profile. For clarity and ease of description the varying configurations or varying side profiles of the second surface 1320 will be discussed; however, any one or more of the other surfaces, i.e. the first surface 1310, third surface 1330, fourth surface 1340, first contact surface 1345, second contact surface 1355, third contact surface 1365, and fourth contact surface 1375 can include a variably curved profile similar to the curved profile discussed and described with reference to the second surface 1320. Furthermore, the variably curved profiles of the first surface 1310, the second surface 1320, the third surface 1330, the fourth surface 1340, the first contact surface 1345, the second contact surface 1355, the third contact surface 1365, and the fourth contact surface 1375 can be the same or different with respect to one or more of the other surfaces.

In one or more embodiments, the second surface 1320 can be divided into three sections, e.g. a left section, a center section, and a right section. As used herein, the terms "left" and "right," "top" and "bottom," "front" and "rear" and other like terms are merely used for convenience to depict spatial orientations or spatial relationships relative to one another in respect to the body 1300. The left section, center section, and right section can be of equal or different lengths. In one or more embodiments, the left and right sections can have the same curvature and the center section can have a different curvature. For example, the left and right sections can have a radius of curvature and the center section can have an elliptical curvature. In another example, the left and right sections can have an elliptical curvature and the center section can have a radius of curvature. In yet another example, the left and right sections can have a first radius of curvature and the center section can have a second radius of curvature that is different than the first radius of curvature. In still another example, the left and right section can have a first elliptical curvature and the center section can have a second elliptical curvature that is different from the first elliptical curvature. The second surface 1320 can have any type of curve and any combination of curves disposed along the left section, the center section, and the right section.

For clarity and ease of description the curve or curvature of the first surface 1310, the second surface 1320, the third surface 1330, and the fourth surface 1340 will be further described herein as having a radius of curvature, which can include, for example a circular curve or circular curvature. However, the first surface 1310, the second surface 1320, the third surface 1330, and the four surface 1340, as discussed above, can include any suitable curvature or combination of curvatures, such as radial, circular, elliptical, parabolic, or any combination thereof.

The first surface 1310 can have a first radius of curvature and the second surface 1320 can have a second radius of curvature. The first radius of curvature and the second radius of curvature can be the same or different. The first radius of curvature can be greater than the second radius of curvature. The second radius of curvature can be greater than the first radius of curvature. The first radius of curvature and the second radius of curvature can be aligned on a latitudinal axis of the body 1300. The first radius of curvature and the second radius of curvature can be aligned on the latitudinal center axis of the body 1300. The first radius of curvature and the second radius of curvature can be aligned on a latitudinal axis of the body 1300 that can be closer to the third surface 1330 than it is to the fourth surface 1340. The first radius of curvature and the second radius of curvature can be aligned on a latitudinal axis of the body 1300 that can be closer to the fourth surface 1340 than it is to the third surface 1330.

The first radius of curvature can range from a low of about 1 cm, about 5 cm, about 10 cm, about 15 cm, about 20 cm, or about 25 cm to a high of about 60 cm, about 70 cm, about 80 cm, about 90 cm, about 100 cm, or more. The second radius of curvature can range from a low of about 1 cm, about 5 cm, about 10 cm, about 15 cm, about 20 cm, or about 25 cm to a high of about 60 cm, about 70 cm, about 80 cm, about 90 cm, about 100 cm, or more. The first radius of curvature and/or the second radius of curvature can be constant for a portion extending from a latitudinal axis toward the third surface 1330 and the fourth surface 1340 and the first radius of curvature and/or the second radius of curvature can then smoothly or non-smoothly increase to a larger radius of curvature or a smaller radius of curvature. The first radius of curvature and/or the second radius of curvature can be aligned on a latitudinal axis and the first radius of curvature and/or the second radius of curvature can be constant for a portion extending from the latitudinal axis toward the third surface 1330 and the fourth surface 1340 and the first radius of curvature and/or the second radius of curvature can then smoothly or non-smoothly increase to a larger radius or curvature or a smaller radius of curvature.

The third surface 1330 can have a third radius of curvature and the fourth surface 1340 can have a fourth radius of curvature. The third radius of curvature and the fourth radius of curvature can be the same or different. The third surface 1330, the fourth surface 1340, or both can be concave. For example, the third surface 1330, the fourth surface 1340, or both can curve toward a latitudinal axis therebetween. Similar to the first surface 1310 and the second surface 1320, the third surface 1330 and the fourth surface 1340 can include any type of curve, for example a radial curve, an elliptical curve, a parabolic curve, combinations of curves, and the like.

The third radius of curvature can be greater than the fourth radius of curvature. The fourth radius of curvature can be greater than the third radius of curvature. The third radius of curvature and the fourth radius of curvature can be aligned on a longitudinal axis of the body 1300. The third radius of curvature and the fourth radius of curvature can be aligned on a longitudinal axis of the body 1300 that is closer to the second surface than it is to the first surface 1310 or closer to the first surface 1310 than it is to the second surface 1320.

The third radius of curvature can range from a low of about 1 cm, about 5 cm, about 10 cm, about 15 cm, about 20 cm, or about 25 cm to a high of about 60 cm, about 70 cm, about 80 cm, about 90 cm, about 100 cm, or more. The fourth radius of curvature can range from a low of about 1 cm, about 5 cm, about 10 cm, about 15 cm, about 20 cm, or about 25 cm to a high of about 60 cm, about 70 cm, about 80 cm, about 90 cm, about 100 cm, or more. The third radius of curvature and/or the fourth radius of curvature can be constant for a portion extending from a longitudinal axis toward the first surface 1310 and the second surface 1320 and the third radius of curvature and/or the fourth radius of curvature can then smoothly or non-smoothly increase to a larger radius of curvature or a smaller radius of curvature.

The third radius of curvature and the first radius of curvature can be the same or different. The fourth radius of curvature and the first radius of curvature can be the same or different. The first radius of curvature, the third radius of curvature, and the fourth radius of curvature can be the same. The first radius of curvature, the third radius of curvature, and/or the fourth radius of curvature can be less than the second radius of curvature. The first radius of curvature, the third radius of curvature, and the fourth radius of curvature can be the same and can be less than the second radius of curvature. The first radius of curvature and the third radius of curvature can be the same and the fourth radius of curvature can be different. The first radius of curvature and the fourth radius of curvature can be the same and the third radius of curvature can be different. The first radius of curvature, the third radius of curvature, and the fourth radius of curvature can be greater than the second radius of curvature. The first radius of curvature, the third radius of curvature, and the fourth radius of curvature can be less than the second radius of curvature. The first radius of curvature, the second radius of curvature, the third radius of curvature, and the fourth radius of curvature can be the same. The first radius of curvature, the second radius of curvature, the third radius of curvature, and the fourth radius of curvature can be the same or different with respect to any radius of curvature, for example, the first radius of curvature can be the same as or different from the second radius of curvature, the third radius of curvature, and the fourth radius of curvature.

The first contact surface 1345 and the first surface 1310 can converge or otherwise connect at an edge 1347. The second contact surface 1355 and the first surface 1310 can converge or otherwise connect at an edge 1357. The first contact surface 1345 and the third surface 1330 can converge or otherwise connect at an edge 1349. The second contact surface 1355 and the fourth surface 1340 can converge or otherwise connect at an edge 1359. The third contact surface 1365 and the second surface 1320 can converge or otherwise connect at an edge 1367. The fourth contact surface 1375 and the second surface 1320 can converge or otherwise connect at an edge 1377. The third contact surface 1365 and the third surface 1330 can converge or otherwise connect at an edge 1369. The fourth contact surface 1375 and the fourth surface 1340 can converge or otherwise connect at an edge 1379. The edges 1347, 1349, 1357, 1359, 1367, 1369, 1377, and/or 1379 can be straight, beveled, rounded, chamfered, and the like.

The first surface 1310 can have a first length extending between the edges 1347 and 1357 and along the first surface. The second surface 1320 can have a second length extending between the edges 1367 and 1377 and along the second surface. The third surface 1330 can have a third length extending between the edges 1349 and 1369 and along the third surface. The fourth side can have a fourth length extending between the edges 1359 and 1379 and along the fourth surface. The length of the first surface 1310, second surface 1320, third surface 1330, and fourth surface 1340 can be the same or different with respect to one another. For example, the length of the first surface 1310 can be greater than the length of the second surface 1320, the third surface 1330, and the fourth surface 1340. In one or more embodiments, the length of the third surface 1330 and the fourth surface 1340 can be the same or substantially the same. In one or more embodiments, the length of the second surface 1320, third surface 1330, and the fourth surface 1340 can be the same or substantially the same. In one or more embodiments, the second surface 1320, the third surface 1330, and the fourth surface 1340 can have a length of within about 10% of one another. In one or more embodiments, the first surface 1310 can have a length equal to a length ranging from about 33% to about 150% of the combined length of the second surface 1320, third surface 1330, and the fourth surface 1340.

In one or more embodiments, the length of at least one surface 1310, 1320, 1330, and/or 1340 can be at least twice as long as the length of at least one other side. For example, the length of the first surface 1310 can be at least twice as long as at least one of the second surface 1320, the third surface 1330, and the fourth surface 1340. In one or more embodiments, the length of at least one surface 1310, 1320, 1330, or 1340 can be at least twice as long as the length of at least two other surfaces. For example, the length of the first surface 1310 can be at least twice as long as the length of at least two of the second surface 1320, the third surface 1330, and the fourth surface 1340. In one or more embodiments, the length of at least one surface 1310, 1320, 1330, or 1340 can be at least twice as long as the length of at least three other surfaces. For example, the length of the first surface 1310 can be at least twice as long as the length of the second surface 1320, the third surface 1330, and the fourth surface 1340.

In one or more embodiments, the length of at least one surface 1310, 1320, 1330, or 1340 can be at least three times as long as the length of at least one other side. For example, the length of the first surface 1310 can be at least three times as long as at least one of the second surface 1320, the third surface 1330, and the fourth surface 1340. In one or more embodiments, the length of at least one surface 1310, 1320, 1330, or 1340 can be at least three times as long as the length of at least two other surfaces. For example, the length of the first surface 1310 can be at least three times as long as the length of at least two of the second surface 1320, the third surface 1330, and the fourth surface 1340. In one or more embodiments, the length of at least one surface 1310, 1320, 1330, or 1340 can be at least three times as long as the length of at least three other surfaces. For example, the length of the first surface 1310 can be at least three times as long as the length of the second surface 1320, the third surface 1330, and the fourth surface 1340.

In one or more embodiments, the length of at least one surface 1310, 1320, 1330, or 1340 can be about 1.1, about 1.3, about 1.5, about 1.7, about 2, about 2.1 about 2.2, about 2.3, about 2.4, about 2.5, about 2.6, about 2.7, about 2.8, about 2.9, about 3, about 3.1, about 3.2, about 3.3, about 3.4, or about 3.5 times as long as the length of at least one other side. In one or more embodiments, the length of at least one surface 1310, 1320, 1330, or 1340 can be about 1.1, about 1.3, about 1.5, about 1.7, about 2, about 2.1 about 2.2, about 2.3, about 2.4, about 2.5, about 2.6, about 2.7, about 2.8, about 2.9, about 3, about 3.1, about 3.2, about 3.3, about 3.4, or about 3.5 times as long as the length of at least two other surfaces. In one or more embodiments, the length of at least one surface 1310, 1320, 1330, or 1340 can be about 1.1, about 1.3, about 1.5, about 1.7, about 2, about 2.1 about 2.2, about 2.3, about 2.4, about 2.5, about 2.6, about 2.7, about 2.8, about 2.9, about 3, about 3.1, about 3.2, about 3.3, about 3.4, or about 3.5 times as long as the length of at least three other surfaces.

The first radius of curvature and/or the second radius of curvature can be constant for a portion extending from a latitudinal axis toward both the third surface 1330 and the fourth surface 1340 and then the first radius of curvature and/or the second radius of curvature can smoothly or non-smoothly increase to a larger radius of curvature or decrease to a smaller radius of curvature. In other words, the first radius of curvature and/or the second radius of curvature can include a first radius of curvature ("first portion") and a second radius of curvature ("second portion"). The first radius of curvature and/or the second radius of curvature can be constant for a portion extending from the latitudinal center axis toward both the third surface 1330 and the fourth surface 1340 and then the first radius of curvature and/or the second radius of curvature can smoothly or non-smoothly increase to a larger radius of curvature or decrease to a smaller radius of curvature.

In at least one specific embodiment, the second radius of curvature can have a first radius of curvature or "first portion of curvature" at a top dead center position 1380 that extends toward the third surface 1330 (or edge 1367) and toward the fourth surface 1340 (or edge 1377) for a predetermined distance and the second radius of curvature can have a second radius of curvature or "second portion of curvature" that extends from the predetermined distance to the edges 1367 and 1377. The second radius of curvature can have a first portion of curvature that extends from the top dead center 1380 for a distance of about 7.5 cm or more and then the second radius of curvature can smoothly or non-smoothly transition to a second portion of curvature that is less than the first portion of curvature. The second radius of curvature can have a first portion of curvature that extends from the top dead center 1380 for a distance of about 7.5 cm or more and then the second radius of curvature can smoothly or non-smoothly transition to a second portion of curvature that is greater than the first portion of curvature.

The area disposed between the first surface 1310 and the third surface 1330 toward the first contact surface 1345 can be referred to as a first support arm 1381. In reference to the area disposed between the other surfaces and contact surfaces, a second support arm 1382 (toward contact surface 1355), a third support arm 1383 (toward contact surface 1365), and a fourth support arm 1384 (toward contact surface 1375) can be seen. As such, the body 1300 can be described as having four support aims or "legs" 1381, 1382, 1383, 1384, with the first support arm 1381 between the first surface 1310 and the third surface 1330; the second support aim 1382 between the first surface 1310 and the fourth surface 1340; the third support aim 1383 between the second surface 1320 and the third surface 1330; and the fourth support arm 1384 between the second surface 1320 and the fourth surface 1340. As such, each support arm 1381, 1382, 1383, 1384 can have a distal end having a contact surface 1345, 1355, 1365, and 1375, respectively, disposed thereon.

The support arms 1381, 1382, 1383, 1384 can have the same length or different lengths, where the length is in reference to a distance from the longitudinal center axis 1390 of the body 1300 to the contact surfaces of each support arm 1381, 1382, 1383, 1384, discussed and described above with reference to FIGS. 1 and 2. The lengths of any two support arms to the lengths of any two other support arms can have any desired ratio. In one or more embodiments, the ratio of the length of support arms 1381 and 1382 to the length of support arms 1383 and 1384 can range from a low of about 1:100 to a high of about 100:1. For example, the ratio of the length of support arms 1381 and 1382 to the length of support arms 1383 and 1384 can be about 1:50, about 1:25, about 1:10, about 1:8, about 1:6, about 1:3, about 1:2, about 1:1, about 2:1, about 3:1, about 6:1, about 8:1, about 10:1, about 25:1, or about 50:1. In one or more embodiments, the ratio of the length of support arms 1381 and 1383 to the length of support arms 1382, 1384 can range from a low of about 1:100 to a high of about 100:1. For example, the ratio of the length of the support arms 1381, 1383 to the length of the support arms 1382, 1384 can be about 1:50, about 1:25, about 1:10, about 1:8, about 1:6, about 1:3, about 1:2, about 1:1, about 2:1, about 3:1, about 6:1, about 8:1, about 10:1, about 25:1, or about 50:1.

In one or more embodiments, the lines used to determine the lengths of two adjacent support arms, for example, the second and fourth support arms 1382, 1384, can intersect one another along the central longitudinal axis 1390 thereby forming an angle directed toward the fourth surface 1340 that could range from a low of about 10° to high of about 170°. For example, the angle formed between the lines used to determine the lengths of two adjacent support arms, e.g. support arms 1382, 1384, and oriented toward the fourth surface 1340, can range from a low of about 50°, about 60°, about 70°, about 80°, or about 85° to a high of about 95°, about 100°, about 110°, about 120°, or about 130°.

The first and second support arms 1381, 1382 can extend further from the longitudinal axis 1390 than the third and fourth support arms 1383, 1384. The third and fourth support arms 1383, 1384 can extend further from the longitudinal axis 1390 than the first and second support arms 1381, 1382. The first and third support arms 1381, 1383 can extend further from the longitudinal axis 1390 than the second and fourth support arms 1382, 1384. The second and fourth support arms 1382, 1384 can extend further from the longitudinal axis 1390 than the first and third support arms 1381, 1383.

As discussed and described above with reference to FIGS. 1 and 2, the ratio between the minimum saddle thickness and any given support arm's minimum support arm thickness can have any desired ratio. For example, the ratio between the minimum saddle thickness and any given support arm's minimum support arm thickness can range from a low of about 1:10, about 1:5, or about 1:2 to a high of about 2:1, about 5:1, or about 10:1. In another example, the ratio between the minimum saddle thickness and any given support arm's minimum support arm thickness can be about 1:1, about 1:1.25, about 1:1.5, about 1:1.75, about 1:2, about 1:2.25, about 1:2.5, about 1:2.75, or about 1:3. The ratio between the minimum saddle thickness and two or more support arms 1381, 1382, 1383, 1384 can be the same or different from one another.

The contact surfaces 1345, 1355, 1365, 1375 can have symmetrically angled surfaces relative a latitudinal axis of the body 1300. The contact surfaces 1345, 1355, 1365, 1375 can also, or in the alternative, have symmetrically angled surfaces relative to a longitudinal axis. For instance, the first contact surface 1345 and the second contact surface 1355 can have symmetrically angled surfaces relative to a latitudinal axis of the body 1300. The third contact surface 1365 and the fourth contact surface 1375 can have symmetrically angled surfaces relative to a latitudinal axis of the body 1300. The first contact surface 1345 and the second contact surface 1355 can have symmetrically angled surfaces relative to the latitudinal center axis of the body 1300. The third contact surface 1365 and the fourth contact surface 1375 can have symmetrically angled surfaces relative to the latitudinal center axis of the body 1300.

The contact surfaces or sides 1345, 1355, 1365, 1375 can be flat or substantially flat. The contact surfaces 1345, 1355, 1365, 1375 can have a surface roughness or surface variation of less than about 2 mm, less than about 1 mm, less than about 0.5 mm, or less than about 0.1 mm or less. One or more surface modifications can be disposed on the contact surfaces 1345, 1355, 1365, and/or 1375. Illustrative surface modifications can include, but are not limited to one or more dimples, protrusions, projections, protuberances, ridges, pins, rods, depressions, grooves, holes, notches, recesses, or any other surface variation or modification. Any surface modification or combination of surface modifications can be disposed about a portion or all of at least one of the one or more contact surfaces 1345, 1355, 1365, and 1375.

In at least one specific embodiment, complementary surface modifications can be disposed on corresponding contact surfaces 1345, 1355, 1365, 1375. For example, one or more surface receiving modifications can be disposed on the third contact surface 1365 and the fourth contact surface 1375 that can receive a surface modification disposed on the second contact surface 1355 and the first contact surface 1345, respectively. For example a pin, rod, or other projection can be disposed on and extend from the first contact surface 1345 and a surface receiving modification, such as a hole, can be on and extend into the fourth contact surface 1375 for receiving the pin, rod, or other projection.

One can recognize that at least two similar bodies 1300 would be required in order to dispose a projection extending from the first contact surface 1345 within a complimentary receiving modification disposed on the fourth contact surface 1375. For example, two bodies 1300 similarly constructed having a projection disposed on the first contact surface 1345 and a receiving hole disposed within the fourth contact surface 1375 can be arranged such that the projection extending from the first contact surface 1345 of a first body 1300 can be disposed within the receiving hole disposed within the fourth contact surface 1375 of a second body 1300. In another embodiment, two bodies 1300 similarly constructed having holes disposed on the first contact surface 1345 and the fourth contact surface 1375 can be arranged such that a rod, dowel, or other suitable member can be disposed within the hole on the first contact surface 1345 of a first body 1300 and within the hole disposed on the fourth contact surface 1375 of a second body 1300.

Another surface modification can include a convex surface modification, for example a ridge, disposed on the first contact surface 1345 and the third contact surface 1365 and a complementary concave surface alteration, for example a groove, disposed on the second contact surface 1355 and the fourth contact surface 1375. The ridge can correspond or otherwise closely match the groove such that the ridge can be disposed within the groove. For example, two bodies 1300 similarly constructed can be arranged such that a ridge disposed on the second contact surface 1355 of a first body 1300 can be disposed within a corresponding receiving groove disposed on the third contact surface 1365 of a second body 1300. The surface modifications can at least partially align and/or secure the first body 1300 and the second body 1300 when properly positioned and connected together.

Although not shown, the first surface 1310, the second surface 1320, the third surface 1330, and/or the fourth surface 1340 can include one or more surface modifications. Although not shown, a first or front side and/or a second or rear side of the body 1300 can include one or more surface modifications. Although not shown, one or more holes, apertures, or other openings can be disposed through the body 1300. The one or more holes can be disposed through the body 1300 to reduce the overall weight of the body 1300. The one or more holes can receive any suitable fastener, such that when two or more bodies 1300 are stacked together the fasteners can secure the two or more bodies 1300 together. Illustrative fasteners can include, but are not limited to, bolts and nuts, rivets, cotter pins, male/female connecting devices, threaded rods, and the like. One or more of the holes can include suitable surface modifications about at least a portion of the inside wall of the hole(s) capable of receiving a retaining member. For example, at least a portion of the inner walls of the holes can be threaded to receive a threaded fastener, such as a bolt or screw.

The one or more holes can have any suitable geometric shape. For example, the one or more holes can be circular, triangular, square, rectangular, oval, elliptical, or any other shape. One or more of the one or more holes can have a constant or variable internal cross-sectional area. In at least one specific embodiment the one or more holes can be a triangular hole having a constant cross-sectional area. In at least one other specific embodiment, the one or more holes can be a triangular hole having rounded corners.

The body 1300 can be made of any suitable material. The body 1300 can be made of a metal, metal alloy, non-metallic materials, or combinations thereof. Suitable metals, metal alloys, and non-metallic materials can be similar to those discussed and described above with reference to body 100. The body 1300 can be made using a non-metallic material or combination of non-metallic materials such as those discussed herein. The body 1300 can be formed using one or more molding processes including, but not limited to, pultrusion, VARTM, vacuum infusion molding, random glass cast and/or compression molding, or any combination thereof.

The body 1300 can include one or more non-metallic materials disposed at any location on or about the body 1300. A body 1300 made from one or more metals, metal alloys, and/or non-metallic materials can include one or more non-metallic materials disposed on or about the contact surfaces 1345, 1355, 1365, and/or 1375. One or more non-metallic materials can be disposed on the first surface 1310, the second surface 1320, the third surface 1330, and/or the fourth surface 1340. One or more non-metallic materials can be disposed on the first contact surface 1345, the second contact surface 1355, the third contact surface 1365, and/or the fourth contact surface 1375.

The body 1300 can have any suitable thickness. The body 1300 can have a thickness ranging from about 1 cm to about 100 cm. The body 1300 can have a thickness, measured from a first or front side to a second or rear side ranging from a low of about 0.5, cm, about 1 cm, about 2 cm, or about 3 cm to a high of about 10 cm, about 20 cm, about 30 cm, about 35 cm, or about 40 cm or more. In at least one specific embodiment the body 1300 can have a thickness of about 2.5 cm, about 7.5 cm, about 15 cm, about 30 cm, or about 38 cm or more. In one or more embodiments, the thickness of the body 1300 can vary. For example, the body 1300 can taper from a first end (e.g. contact surfaces 1365, 1375) to a second end (e.g. contact surfaces 1345, 1355) to provide a thicker body 1300 having a thicker first end than the second end.

The body 1300 can be at least partially coated with one or more non-metallic materials. For example, a body 1300 made from one or more metals, metal alloys, and/or non-metallic materials can include one or more non-metallic coatings disposed on or about any portion of the body 1300. The non-metallic coating can be disposed on the first contact surface 1345, the second contact surface 1355, the third contact surface 1365, and/or the fourth contact surface 1375. The non-metallic coating can be disposed on the first surface 1310, the second surface 1320, the third surface 1330, and/or the fourth surface 1340. The non-metallic coating can be disposed on a front or first side of the body and/or a back or second side of the body.

The body 1300 can include one or more inserts (not shown). Each insert can be metal, non-metallic, or a combination thereof. Each insert can also be metallic and partially or completely disposed in a suitable non-metallic material. Suitable methods for applying a coating can include, but are not limited to, dip coating, injection molding, random glass cast and/or compression molding, transfer molding, insert molding, flow coating, dip-spin coating, curtain coating, air knife coating, spraying, fluidized bed dip coating, and any combinations thereof.

Coating an insert with a non-metallic material and/or the body 1300 can provide a body 1300 that can be rigid and also resistant to environmental effects, such as rust and corrosion. The coating can include one or more antifouling agents, which can reduce or prevent biological growth on the body 100. The coating can reduce or prevent galvanic corrosion between two metal or metal-containing bodies 1300 in contact with one another. The coating can provide desirable electrostatic properties, such as an increase or decrease in conductivity. The coating can provide a surface layer or coating capable of at least partially absorbing or otherwise accommodating dimensional tolerance differences, e.g size variations of one or more elongated members supported via one or more bodies 1300, as discussed and described below. In one or more embodiments, coating the body 1300, and in particular the contact surfaces 1345, 1355, 1365, 1375 can improve the contact or connection between two bodies 1300. For example, the tendency for two bodies 1300 connected or otherwise positioned together to slip or move can be reduced by applying a coating having pliable, slip resistant, and/or adhesive properties. In another example, two bodies 1300 that may be connected or otherwise positioned together could have dimensional variations, such as height, width, and/or thickness, which can be accounted for by one or more coatings. En one or more embodiments, the coating can be or include an adhesive. As such, bodies 1300 having an adhesive coating disposed at least partially thereon can be attached together to provide a plurality of connected bodies 1300. In one or more embodiments, the insert and/or the body 1300 can be rigid and exhibit any one or more of the properties or characteristics that can be provided by one or more coatings.

In one or more embodiments, a conductive member, e.g. a conductive disc, film, plate, insert, or foil, can be disposed on or about any surface of the bodies 1300. In addition to being conductive, the conductive member can be corrosion resistant, resistant to biological growth, account for dimensional changes between two bodies 1300 that may be connected or otherwise positioned together, or the like. For example, a conductive member can be disposed on or about a front side and/or a rear side of the body 1300. In another example, a conductive member can be disposed on or about the first surface 1310, the second surface 1320, the third surface 1330, the fourth surface 1340, the first contact surface 1345, the second contact surface 1355, the third contact surface 1365, and/or the fourth contact surface 1375. In at least one embodiment, any one or more surfaces or sides of the body 1300 can include an electrical connector or connection to ground.

Figure 15:
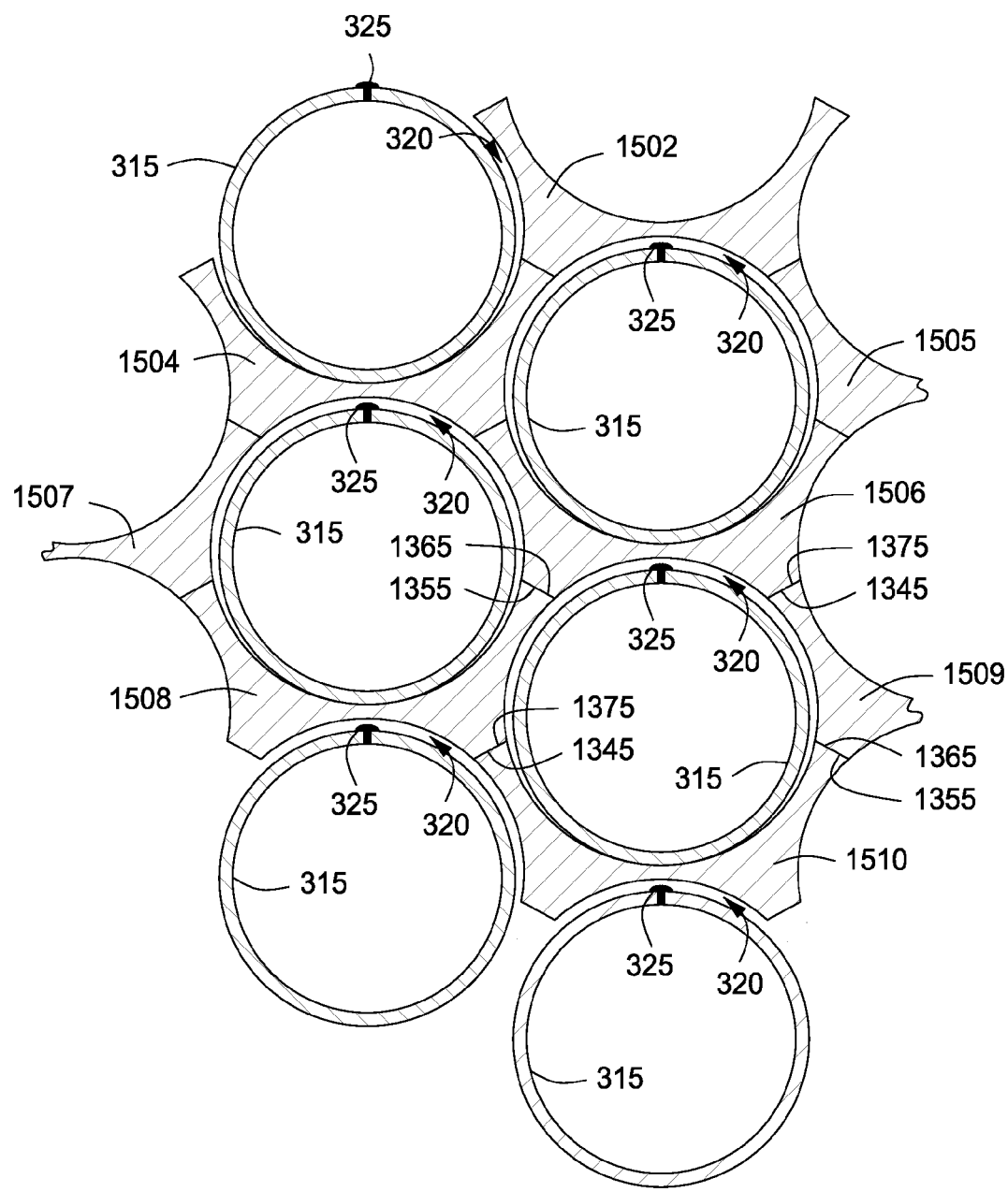
FIG. 15 depicts a partial schematic of a plurality of illustrative support bodies supporting a plurality of elongated members, according to one or more embodiments described.

FIG. 15 depicts a partial schematic of a plurality of illustrative bodies supporting a plurality of elongated members 315, according to one or more embodiments. One or more bodies (eight are shown, 1502, 1504, 1505, 1506, 1507, 1508, 1509, 1510) can be disposed about a plurality of elongated members 315. The bodies 1502, 1504, 1505, 1506, 1507, 1508, 1509, 1510 can be similar to the bodies 1300 discussed and described above with reference to FIGS. 13 and 14. The elongated members 315 can include the one or more dimensional variations discussed above, which can include, but are not limited to OOR, ODV, and/or WH, as discussed and described above with reference to FIG. 3. Also as discussed above, another variance that can be accounted for is FA. Yet another variance that can be accounted for in the bodies can be a radial expansion/contraction of the one or more elongated members 315 supported by one or more bodies. Still another variance that can be accounted for can be the thickness of one or more coatings that may be applied to the bodies 1502, 1504, 1505, 1506, 1507, 1508, 1509, 1510, for example about the first surface 1310, the second surface 1320, the third surface 1330, and/or the fourth surface 1340. Yet another variation that can be accounted for can be dimensional changes, e.g. expansion and/or contraction, of the body 1300 due to temperature and pressure, for example.

The bodies 1502, 1504, 1505, 1506, 1507, 1508, 1509, and 1510 can provide a network of bodies for supporting a plurality of elongated members 315. The bodies 1502, 1504, 1505, 1506, 1507, 1508, 1509, and 1510 can provide support for the plurality of elongated members 315 with the first surface 1310 adapted to contact and support an adjacent elongated member 315 and the second surface 1320, the third surface 1330, and the fourth surface 1340 adapted to either contact an adjacent elongated member 315 or to not contact an adjacent elongated member 315. The second surface 1320 and/or the third contact surface 1365 and/or the fourth contact surface 1375 (see FIGS. 13 and 14) can contact adjacent bodies, thereby forming a gap 320 between the second surface 1320 and the elongated member 315. In one or more embodiments, the gap 320 can extend from a point where the elongated member 315 contacts the first surface 110 all the way around the elongated member 315. As such, the elongated member can contact a body only at a single point or position on the first surface 1310.

An elongated member 315 can contact and be supported by the first surface 1310 about a center position of the first surface 1310 as measured from the edge 1347 to the edge 1357. The elongated member 315 can contact and be supported by the first surface 1310 only about the center position of the first surface 1310. The elongated member 315 can contact and be supported by the first surface 1310 ranging from the center position of the first surface 1310 for any distances or lengths, which can be the same or different, toward the edge 1347 and edge 1357.

The radius of curvature of the first surface 1310 can be larger than the radius of an elongated member 315 disposed therein. Similarly, the second radius of curvature, the third radius of curvature, and/or the fourth radius of curvature can be larger than the radius of an elongated member 315 disposed therein. By providing bodies 1502, 1504, 1505, 1506, 1507, 1508, 1509, 1510 with a larger first radius of curvature, second radius of curvature, third radius of curvature, and fourth radius of curvature than the elongated member 315, the bodies 1502, 1504, 1505, 1506, 1507, 1508, 1509, 1510 when properly disposed about the elongated members 315 can provide a support structure having a larger opening than the elongated member 315. The larger opening provided by the bodies 1300 disposed about one or more elongated members 315 can account for the dimensional variations of the elongated members 315.

The third contact surface 1365 of body 1506 and the second contact surface 1355 of body 1508 can be in contact with one another. The fourth contact surface 1375 of body 1506 and the first contact surface 1345 of body 1509 can be in contact with one another. The fourth contact surface 1375 of body 1508 and the first contact surface 1345 of body 1510 can be in contact with one another. The third contact surface 1365 of body 1509 and the second contact surface 1355 of body 1510 can be in contact with one another. Arranged in this manner, at least a portion of any vertical and/or lateral forces and/or loads exerted on body 1506 can be transferred to body 1508 and body 1509. At least a portion of any vertical and/or lateral forces and/or loads exerted on bodies 1508 and 1509 can be transferred to body 1510. This transfer of vertical and/or lateral forces and/or loads can continue to be transferred to adjacently disposed bodies (not shown) thereby distributing the weight and other forces exerted from the elongated members 315 and/or the environment to the bodies. In one or more embodiments, a spacer or other member can be disposed between any to contact surfaces. For example, a spacer can be disposed between the fourth contact surface 1375 of body 1506 and the first contact surface 1345 of the body 1509, which can accommodate an space, gap, or distance that may be disposed therebetween.

The second surface 1320 can have a larger radius of curvature than the radius of an adjacent elongated member 315 thereby forming a gap 320. The gap 320 can prevent transfer of at least a portion of any vertical and/or lateral forces and/or loads exerted on body 1506 from body 1504, body 1505, and/or elongated member 315 from being directed on or to the elongated member 315 disposed beneath the gap 320 below body 1506. The gap 320 can also provide a space or region for the weld seam 325 that can be disposed about the length of the elongated member 315.

The plurality of bodies 1506, 1508, 1509, 1510 disposed about the elongated member 315 can completely encircle the outer circumference of the elongated member 315. The first surface 1310 of the body 1510 can traverse about 25% to about 60% of the circumference of the elongated member 315. The third surface 1330 of the body 1509 can traverse about 10% to about 25% of the circumference of the elongated member 315. The fourth surface 1340 of the body 1508 can traverse about 10% to about 25% of the circumference of the elongated member 315. The second surface 1320 of the body 1506 can traverse about 10% to about 25% of the circumference of the elongated member 315.

Figure 16:
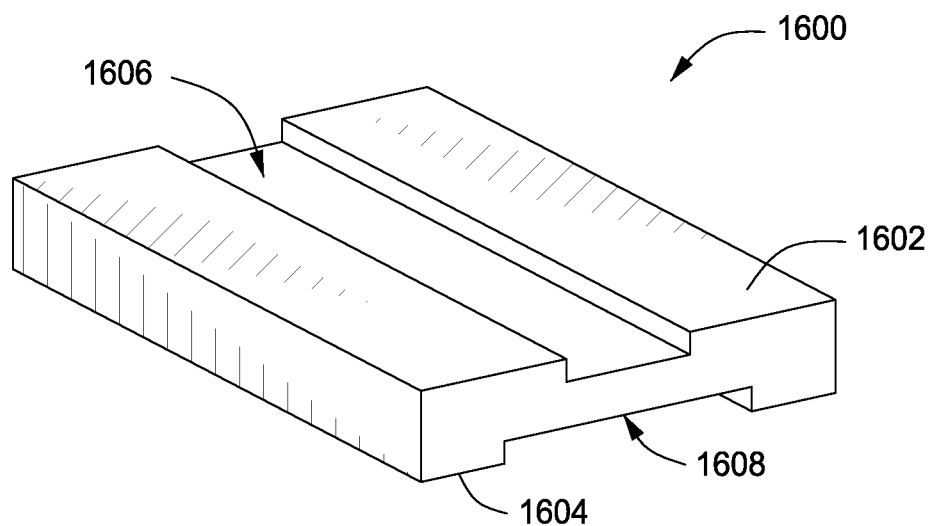
FIG. 16 depicts an isometric view of an illustrative connector, according to one or more embodiments described.

FIG. 16 depicts an isometric view of an illustrative connector 1600, according to one or more embodiments. The connector 1600 can be a rectangular member having a first surface 1602 and a second surface 1604. A first groove 1606 can be disposed within the first surface 1602 and a second groove 1608 can be disposed within the second surface 1604. The first groove 1606 and the second groove 1608 can be disposed about the length of the connector 1600, thereby providing a channel or groove that extends the length of the connector 1600. The first groove 1606 and the second groove 1608 can have the same width or different widths. As shown, the first groove 1606 has a first width and the second groove 1608 has a second width, where the second width is larger than the first width.

The center of the first groove 1606 and the center of the second groove 1608 can be aligned about a longitudinal axis of the connector 1600. As illustrated, the first groove 1606 can have a width corresponding to the thickness of one body 1300 and the second groove 1608 can have a width corresponding to the thickness of two bodies 1300 stacked or grouped together. A connector 1600 can be disposed between two contact surfaces of two or more properly positioned bodies 1300. The first groove 1606 can have a width corresponding to the thickness of a first body 1300 having a first thickness and the second groove 1608 can have a width corresponding to the thickness of a second body 1300 having a second thickness. The first groove 1606 can have a width corresponding to the thickness of a single body 1300 and the second groove 1608 can have a thickness corresponding to a body 1300 having a thickness greater than one body 1300. In one or more embodiments, the first groove 1606, the second groove 1608, or both can have a width that corresponds to the thickness of multiple bodies 1300.

The connector 1600 can be made of any suitable material. The connector 1600 can be made of metal, metal alloy, non-metallic materials, or a combination thereof. The connector 1600 can be fowled using one or more molding processes including, but not limited to, pultrusion, VARTM; vacuum infusion molding, random glass cast and/or compression molding, or any combination thereof.

The connector 1600 can include one or more inserts, metal, non-metal, or a combination thereof, partially or completely disposed in a non-metallic material, such as those discussed herein. The non-metallic material can be coated on the one or more metal inserts to provide the connector 1600 using any suitable method. Suitable methods for applying a coating can include, but are not limited to, dip coating, injection molding, compression molding, transfer molding, insert molding, flow coating, dip-spin coating, curtain coating, air knife coating, spraying, fluidized bed dip coating, and any combinations thereof. Coating a metal insert with a non-metallic material can provide a connector 1600 that can be rigid but pliable, and also resistant to environmental effects, such as rust and corrosion. The coating can include one or more antifouling agents, which can reduce or prevent biological growth on the connector 1600. The coating and/or one or more not metallic materials disposed on the connector 1600 can reduce or prevent galvanic corrosion between two metal or metal-containing bodies 1300. In one or more embodiments, coating the connector 1600, and in particular the contact surfaces can improve the contact or connection between two bodies 1300. For example, the tendency for two bodies 1300 connected or otherwise positioned within the first groove 1606 and the second groove 1608 to slip or otherwise move can be reduced by applying a coating having pliable, slip resistant, and/or adhesive properties. In another example, two bodies 100 that may be connected or otherwise positioned together could have dimensional variations, such as height, width, and/or thickness, which can be accounted for by one or more coatings. In one or more embodiments, the connector 1600 can be rigid and exhibit any one or more of the properties or characteristics that can be provided by one or more coatings.

Although not shown, the first groove 1606 and/or the second groove 1608 can be coated with or include an adhesive. For example, the first groove 1606 can be coated with an adhesive that when activated can improve a bond between the surface of the first groove 1606 and the contact surface of a body 1300 disposed therein. The adhesive can be activated by pressure, temperature, oxidation such as exposure to air, removing a protective film from the adhesive, or any combination thereof.

Figure 17:
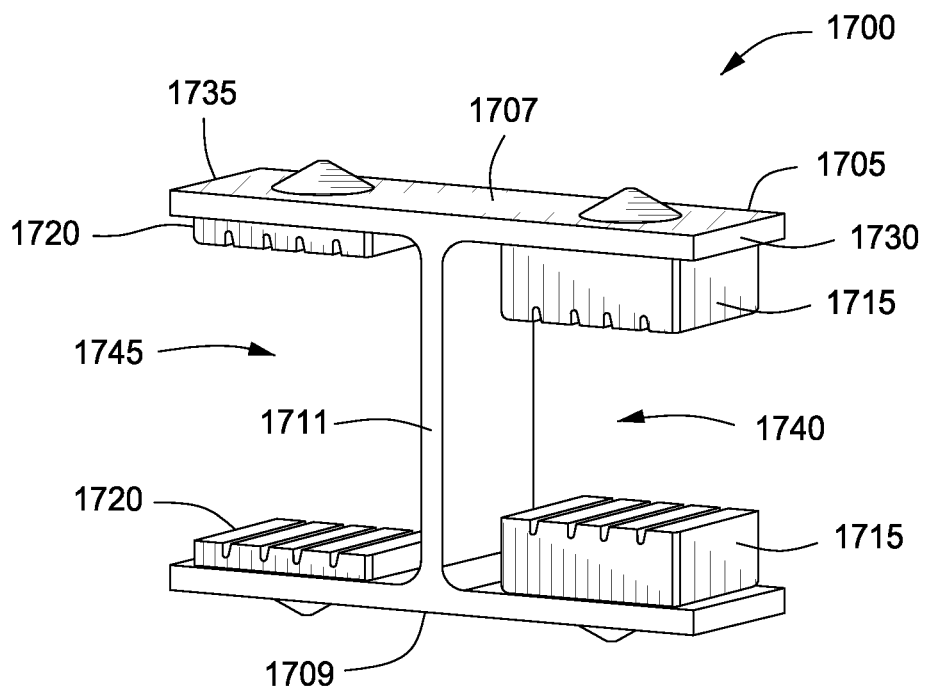
FIG. 17 depicts an isometric view of another illustrative connector, according to one or more embodiments described.

FIG. 17 depicts an isometric view of another illustrative connector 1700, according to one or more embodiments. The connector 1700 can include a rigid frame or connector body 1705. The connector body 1705 can be in the form of or resemble the letter "H," when viewed from the front or back perspective. The connector body 1705 can include a first surface 1707, a second surface 1709, and a connecting member 1711 disposed between the first surface 1707 and the second surface 1709. The first surface 1707 and the second surface 1711 can be substantially parallel. The connecting member 1711 can be perpendicularly disposed between the first surface 1707 and the second surface 1709.

The connector body 1705 can be an integral or monolithic body. The connector body 1705 can also be constructed of two or more pieces to form a single body. The connector body 1705 can be cast into a solid structure or cut from a solid piece of material to provide an integral connector body 1705. The connector body 1705 can also be made by connecting two substantially parallel plates using a substantially perpendicular plate as a connecting member disposed between the substantially parallel plates.

The connector body 1705 can include one or more holes disposed through the first surface 1707 and the second surface 1709. The connector body 1705 can include two holes (not shown) disposed through the first surface 1707 and two holes (not shown) disposed through the second surface 1709 through which an insert 1715 or 1720 can be disposed. The first insert 1715 can be disposed toward a first end 1730 of the connector 1705 and the second inserts 1720 can be disposed toward a second end 1735 of the connector body 1705.

The inserts 1715, 1720 can include a protruding member that can be inserted through the holes disposed through first surface 1707 and the second surface 1709 and a truncated cone disposed at the end of the protruding member can secure the insert within the hole. The first inserts 1715 can provide a first gap or space 1740 and the second inserts 1720 can provide a second gap or space 1745 between the two inserts. The first gap or space 1740 can be configured to provide a gap having a length or width of about one body 1300 and the second gap or space 1745 can be configured to provide a gap having a length or width of about two bodies 1300 stacked together, for example. The inserts 1715, 1720 can be the same size, thereby providing a gap 1740 and gap 1745 having the same length or width, which can correspond to the thickness of one body 1300 or two or more bodies stacked together.

The first gap or space 1740 can be configured to provide a length or width of a body 1300 having a first thickness and a second gap or space 1745 can be configured to provide a length or width of a body 1300 having a second thickness. The first gap or space 1740 can be configured to provide a length or width corresponding to the thickness of a single body 1300 and the second gap or space 1745 can be configured to provide a length or width corresponding to the thickness of a body 1300 having a thickness greater than one body 1300.

The connector body 1705 can be made of a metal, metal alloy, non-metallic materials, or combinations thereof. Suitable metals, metal alloys, and non-metallic materials can be similar to those discussed and described above with reference to body 100. The connector body 1705 can be made using a non-metallic material or combination of non-metallic materials. The connector body 1705 can be formed using one or more molding processes including, but not limited to, pultrusion, VARTM, vacuum infusion molding, random glass cast and/or compression molding, or any combination thereof.

In one or more embodiments, the connector body 1705 can be coated with one or more non-metallic materials. Coating the connector body 1705 with a non-metallic material can provide a connector body 1705 that can be rigid and also resistant to environmental effects, such as rust and corrosion. The coating can include one or more antifouling agents, which can reduce or prevent biological growth on the connector body 1705. The coating can reduce or prevent galvanic corrosion between two metal or metal-containing connector bodies 1705 in contact with one another. The coating can provide desirable electrostatic properties, such as an increase or decrease in conductivity. The coating can provide a surface layer or coating capable of at least partially absorbing or otherwise accommodating dimensional tolerance differences, e.g. size variations of the bodies 100. In one or more embodiments, coating the connector body 1705 can improve the contact or connection between two bodies 100. For example, the tendency for two bodies 100 connected or otherwise positioned together via a connector body 1705 to slip or move can be reduced by applying a coating having pliable, slip resistant, and/or adhesive properties. In another example, dimensional variations, such as depth or width of the gaps 1740, 1745 can be accounted for by one or more coatings. In one or more embodiments, the coating can be or include an adhesive. As such, connector bodies 1705 having an adhesive coating disposed at least partially thereon can be attached or secured to bodies 100. In one or more embodiments, the connector body 1705 can be rigid and exhibit any one or more of the properties or characteristics that can be provided by one or more coatings.

The inserts 1715, 1720 can be made from any suitable material. Illustrative materials suitable for forming the inserts can include, but are not limited to, rubber, urethane, polyurethane, polypropylene, polyethylene, EPDM, reinforced urethane, reinforced polyurethane, epoxies, or other polymeric materials. The inserts 1715, 1720 can provide a friction fit against one or more bodies 1300 disposed therebetween.

Figure 18:
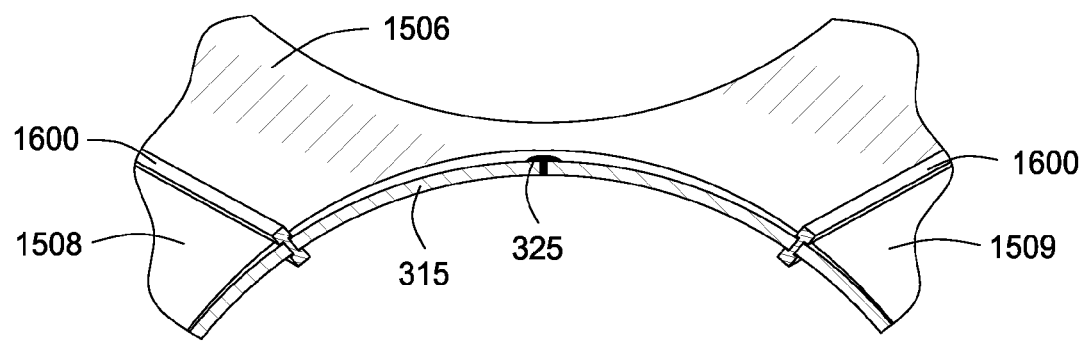
FIG. 18 depicts a partial view of a plurality of illustrative support bodies disposed about an elongated member, according to one or more embodiments described

FIG. 18 depicts a partial view of a plurality of illustrative bodies 1506, 1508, 1509 (also shown in FIG. 15) disposed about an elongated member 315, according to one or more embodiments. The bodies 1506, 1508, and 1509 can include a connector 1600 disposed between the contact surfaces. As illustrated, two connectors 1600 are shown disposed between body 1506 and body 1508 and between body 1506 and body 1509. A first connector 1600 can be disposed between the third contact surface 1365 of body 1506 and the second contact surface 1355 of body 1508 and a second connector 1600 can be disposed between the fourth contact surface 1375 of body 1506 and the first contact surface 1345 of body 1509.

The elongated member 315 can include a weld bead or weld seam 325, as discussed and described above. The weld bead 325 can be positioned within the bodies 1506, 1508, 1509 where the weld seam 325 is disposed toward the second surface 1320 of the body 1506. The gap 320 provided by the second radius of curvature of the second surface 1320 that is larger than the radius of the elongated member 315 provides a space or region within which the weld seam can be disposed.

Although not shown, the second surface 1320 of body 1506 can include a notch, recess, groove, or other indentation about the center of the second surface 1320 as measured from edge 1367 to edge 1377 (see FIGS. 13 and 14). The indentation about the center of the second surface 1320 can extend from the center of the second surface 1320 toward edge 1367 and edge 1377 a sufficient distance to account for variations in the position of the weld seam 325. A second surface 1320 that includes an indentation about a center portion of the second surface 1320 can permit the second surface 1320 to have the same radius of curvature as the elongated member 315 disposed therein, but can also provide a space for the weld bead 325. Any or all of the surfaces, i.e. the first surface 1310, the second surface 1320, the third surface 1330, and/or the fourth surface 1340 can include a notch, recess, groove, or other indentation thereon.

Figure 19:
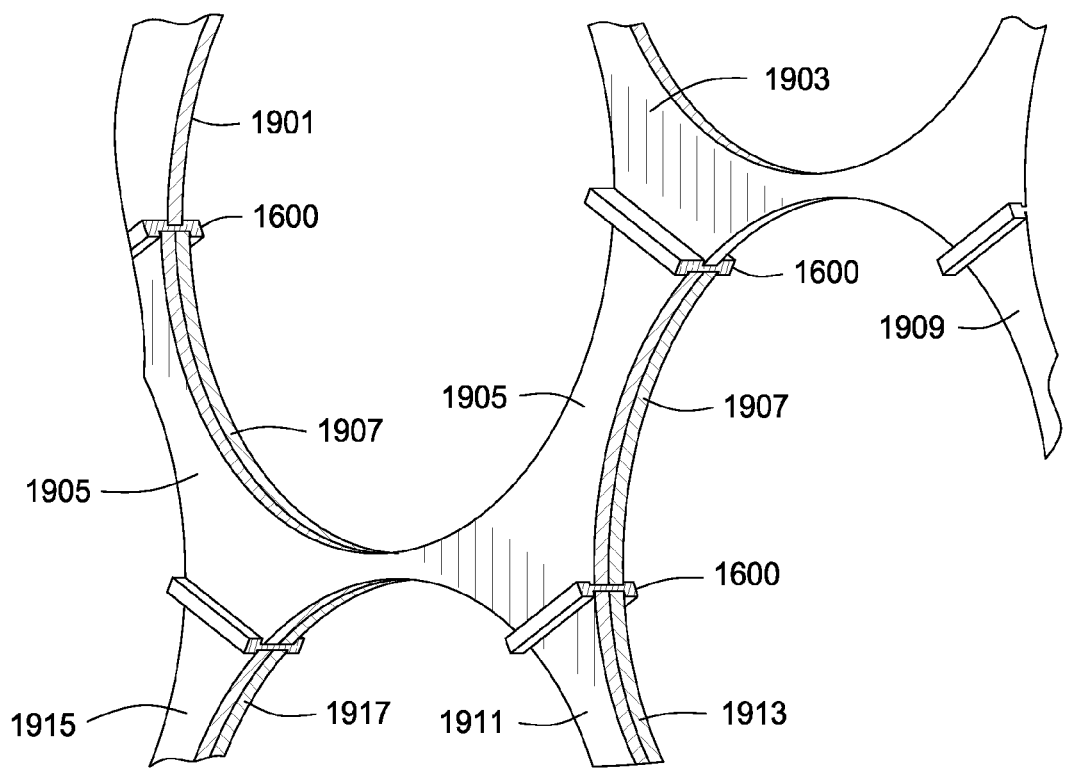
FIG. 19 depicts an isometric partial view of a plurality of illustrative support bodies positioned together using illustrative connectors, according to one or more embodiments described.

FIG. 19 depicts an isometric partial view of a plurality of illustrative bodies positioned together using illustrative connectors 1600, according to one or more embodiments. The bodies (nine are shown, 1901, 1903, 1905, 1907, 1909, 1911, 1913, 1915, and 1917) can be similar as discussed and described above with reference to FIGS. 13-18. The body 1901 can be properly positioned adjacent to two bodies 1905, 1907 stacked together. A first connector 1600 can be disposed between the fourth contact surface of the body 1901 and the first contact surfaces 1345 of the stacked bodies 1905, 1907. The first groove 1606 (see FIG. 16) can be configured to receive the body 1901 and the second groove 1608 can be configured to receive the two bodies 1905, 1907 stacked together.

Additional connectors 1600 can be disposed between the contact surfaces of other properly arranged bodies, for example, between body 1903 and stacked bodies 1905, 1907. A connector 1600 can be disposed between the contact surfaces of the stacked and properly arranged bodies 1905, 1907 and the contact surfaces of the stacked bodies 1915, 1917. For the connector 1600 disposed between the stacked bodies 1905, 1907 and the stacked bodies 1915, 1917, the connector 1600 can include a first groove 1606 and a second groove 1608 (see FIG. 16) that have the same or substantially the same dimensions in order to accommodate two bodies within both grooves 1606, 1608.

Two or more bodies that are stacked or grouped together, for example bodies 1905, 1907, can be secured together using any suitable device or method. For example, two bodies 1300 stacked together can be glued using an adhesive. In another example, two bodies 1300 stacked together can be fastened together using one or more fasteners. Illustrative fasteners can include, but are not limited to, rivets, bolts and nuts, screws, pins, cotter pins, and the like.

Figure 20:
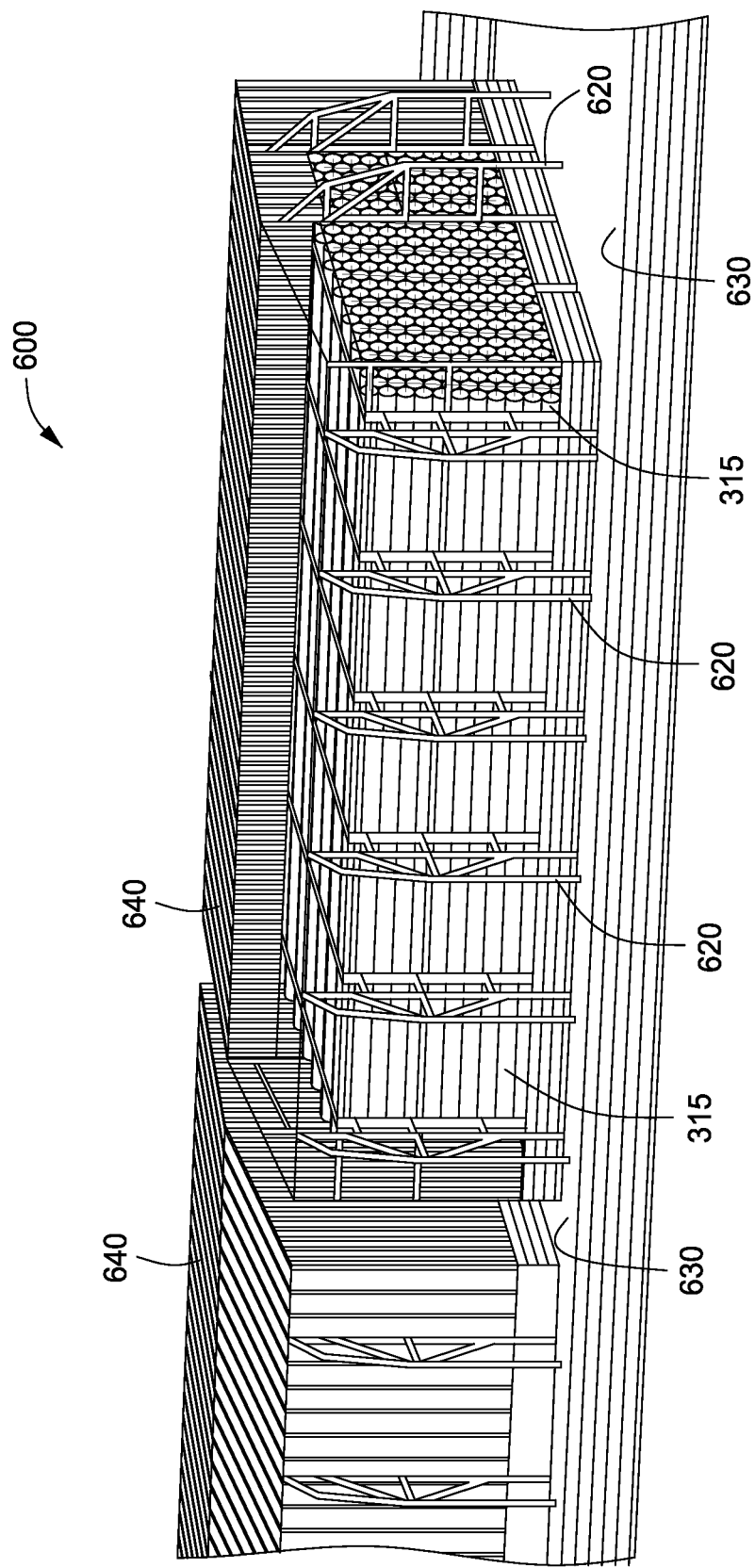
FIG. 20 depicts an isometric view of an illustrative shipboard pipe storage system using one or more support bodies, according to one or more embodiments described.

FIG. 20 depicts an isometric view of an illustrative shipboard pipe storage system 600 using one or more bodies 1300, according to one or more embodiments. The one or more elongated members 315 can be one or more ferrous or non-ferrous pipe sections. The one or more elongated members 315 can be fabricated using one or more materials suitable for use in high pressure service, for example at a pressure of about 3.5 MPa or more, about 7 MPa, or more, about 14 MPa or more, about 20 MPa or more, or about 27 MPa or more. The one or more elongated members 315 can be fabricated using one or more materials suitable for use in low and/or high temperature service, for example at a temperature of about 300° C. or less, about 150° C. or less, about 100° C.

or less, about 50° C. or less, about 0° C. or less, about −50° C. or less, about −75° C. or less, about −100° C. or less, about −130° C. or less, or about −150° C. or less. In one or more specific embodiments, the one or more elongated members 315 can be made from one or more materials suitable for use in cryogenic or near-cryogenic service, at temperatures of less than about −100° C. and at pressures greater than about 3.5 MPa.

The outer diameter of the one or more elongated members 315 can range from a low of about 4 cm, about 10 cm, about 20 cm, about 30 cm, about 40 cm, or about 50 cm to a high of about 120 cm, about 140 cm, about 160 cm, about 180 cm, or more. The length of each elongated member 315 can range from a low of about 0.3 m, about 1 m, about 1.5 m, about 3 m, 6 m, or about 12 m to a high of about 20 m, about 40 m, about 80 m, about 120 m, about 160 m, about 200 m, or more than 200 m.

A plurality of bodies 1300 (see FIGS. 13 and 14) can be disposed about at least a portion of the length of one or more elongated members 315 to provide a support system for the elongated members 315. One or more bodies 1300 can be disposed about the length of the elongated members 315 in periodically spaced intervals, randomly spaced intervals, or a combination thereof. For example, one or more bodies 1300 can be disposed about the length of two or more elongated members every 1 m, every 2 m, every 5 m, every 8 m, every 10 m, or more. One or more bodies 1300 can be disposed about the length of two or more elongated members 315 in an alternating pattern of spacing. For example, one or more bodies 1300 can be disposed about the length of two or more elongated members 315, beginning at a first end of the elongated members 315 with one or more bodies 1300 then disposed every 2 m, every 5 m, every 2 m, every 5 m, every 2 m, and so on until the second end of the two or more elongated members 315 is reached.

Vertical, lateral, and/or other forces and/or loads are transferred through the bodies 1300 to the surrounding structural frame 620. The structural frame 620 can be disposed about the elongated members 315 on two or more sides. The structural frame 620 can include three sides resting on the surface of the deck 630 providing a contained housing about the tubulars members 315 to be supported, as shown. The frame 620 can include four sides that completely surround the elongated members 315. All or a portion of the structural frame 620 can be enclosed or covered with an on-deck housing or siding 640.

The structural frame 620 can be secured to the deck 630 of a transport ship. The structural frame 620 and the bodies 1300 can be arranged to support or otherwise hold the elongated members 315 in a vertical orientation rather than horizontally along the deck 630, as depicted in FIG. 20. The elongated members 315 can be supported within a cargo storage area below a deck 630 of a transport ship.

Two or more shipboard pipe storage systems 600 can be used. For example, two or more shipboard pipe storage systems 600 can be located about the deck 630, within the hull or cargo area of the ship below the deck 630, or a combination thereof.

Figure 21A:
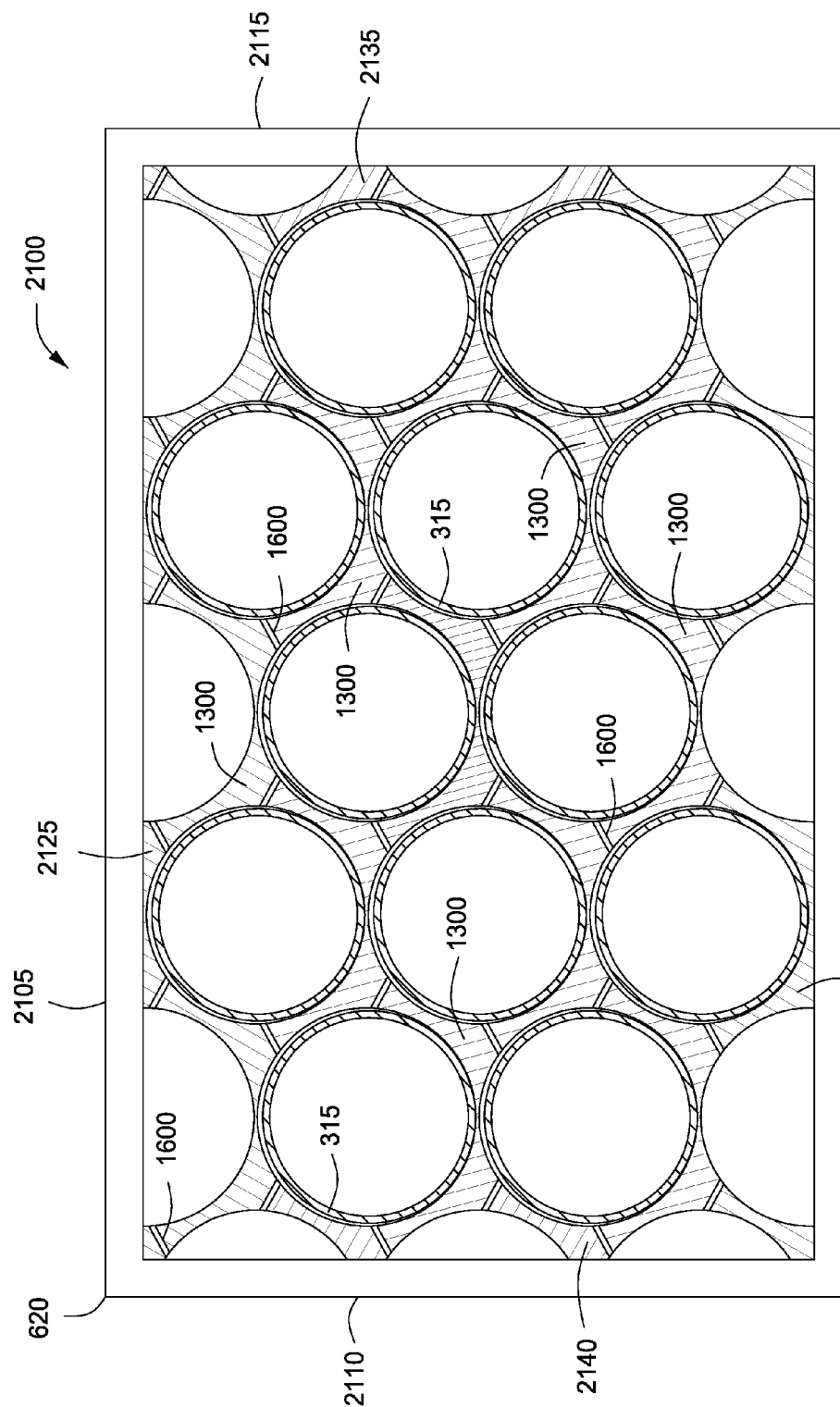
FIG. 21A depicts a cross-section of an illustrative support system for supporting a plurality of elongated members using a plurality of illustrative support bodies, according to one or more embodiments described.

FIG. 21A depicts a cross-section of an illustrative support system 2100 for supporting a plurality of elongated members 315 using a plurality of illustrative bodies 1300, according to one or more embodiments. The bodies 1300 can be similar as discussed and described above with reference to FIGS. 13-20. The elongated members 315 can be disposed within a structural frame 620 surrounding the elongated members 315, as discussed and described above with reference to FIG. 20. The structural frame 620 can include a first surface 2105, a second surface 2110, a third surface 2115, and a fourth surface 2120. The first surface 2105, second surface 2110, third surface 2115, and fourth surface 2120 can be joined together using any suitable fastening means, such as welding, bolts and nuts, rivets, and the like. The fourth surface 2120 can be the deck of a ship, the bed of a transport truck, the ground, a railroad transport car or a plurality of railroad transport cars, or other platform or surface.

The elongated members 315 can be supported by bodies 1300 disposed between adjacent elongated members 315. A partial support or "second side support" 2125, a partial support or "first side support" 2130, a lateral support or "third side support" 2135, and a lateral or "fourth side support" 2140 can be disposed between an elongated member 315 and a side of the structural frame 620. As shown, second surface supports 2125 can be disposed between an elongated member 315 and the first surface 2105 of the frame 620, the first surface supports 2130 can be disposed between elongated members 315 and the fourth surface 2120 of the frame 620, the third surface supports 2135 can be disposed between an elongated member 315 and the third surface 2115 of the frame 620, and the fourth side support 2140 can be disposed between an elongated member 315 and the second surface 2110 of the frame 620.

The first side support 2130 can be a body 1300 cut along a longitudinal axis (see FIGS. 13 and 14). The first side support 2130 can include the first surface 1310, a portion of the third surface 1330, and a portion of the fourth surface 1340, with the second surface 1320 having a flat or substantially flat profile between the third surface 1330 and the fourth surface 1340. The second side support 2125 can include the second surface 1320, a portion of the third surface 1330, and a portion of the fourth surface 1340, with the first surface 1310 having a flat or substantially flat profile between the third surface 1330 and the fourth surface 1340. The partial supports 2125 and/or 2130 can be independently made, i.e. not cut from a body 1300.

The third side support 2135 and/or the fourth side support 2140 can be a body 1300 cut along a latitudinal axis. The third side support 2135 and the fourth side support 2140 can be provided by cutting a body 1300 along the latitudinal center axis. The third side support 2135 and the fourth side support 2140 can be provided by cutting a body 1300 along two latitudinal axes, where the middle portion disposed between the two ends can be discarded. The third side support 2135 and/or the fourth side support 2140 can be independently made, i.e. not cut from a body 1300.

The first side support 2130, second surface support 2135, third side support 2135, and fourth side support 2140 can be made from materials similar to bodies 100 and/or 1300 discussed and described above with reference to FIGS. 1, 2, 13, and 14. The first side support 2130, the second side support 2125, the third side support 2135, and the fourth side support 2140 can have a thickness similar to bodies 100 and/or 1300 discussed and described above with reference to FIGS. 1, 2, 13, and 14.

The first surface support 2150, the second side support 2125, the third side support 2135, and the fourth side support 2140 can include one or more inserts, metal, metal alloy, non-metal, or a combination thereof, partially or completely encapsulated in a non-metallic material such as those discussed herein.

The vertical and lateral forces imposed on each body 1300 can be transmitted via the interfaces between the contact surfaces as discussed and described above with reference to FIGS. 15 and 20. Eventually, the forces transmitted through the bodies 1300 can be transmitted or otherwise transferred to the first side support 2130, the second side support 2125, the third side support 2135, and the fourth side support 2140. The first side support 2130, the second side support 2125, the third side support 2135, and the fourth side support 2140 can transmit or otherwise transfer all or a portion of the forces to the one or more structural frames 620. The gap 320 can extend between the second surface 1320, the third surface 1330, and/or the fourth surface 1340 of the supports 2125, 2130, and 2135 and the elongated member 315. The gap 320 can extend between at least a portion of the first surface 1310 and the elongated member 315. For example, a portion of the first surface 1310 can be in direct contact with the elongated member 315 and the gap 320 can be between a portion of the first surface 1310 and the elongated member 315. In one or more embodiments, elongated members 315 can be in direct contact with the sides of the frame 620.

The gap 320 between the second surface 120 of a body 1300 and an elongated member 315 can extend about a majority of the elongated member 315. To provide this type of arrangement the second surface 1320, third surface 1330, fourth surface 1340 and first surface 1310 of the bodies 1300, and the appropriate side or side portion of the second side support 2125, first side support 2130, third side support 2135, and fourth side support 2140, which can be as discussed and described above with reference to FIGS. 1, 2, 13 and 14, can have a radius of curvature larger than the radius of the elongated member 315. As discussed above, for a body 100 the radius of curvature of the first surface 110, the second surface 120, the third surface 130, and the fourth surface 140 can be greater than the radius of the elongated members 315 to account for and to accommodate any dimensional variations.

Figure 21B:
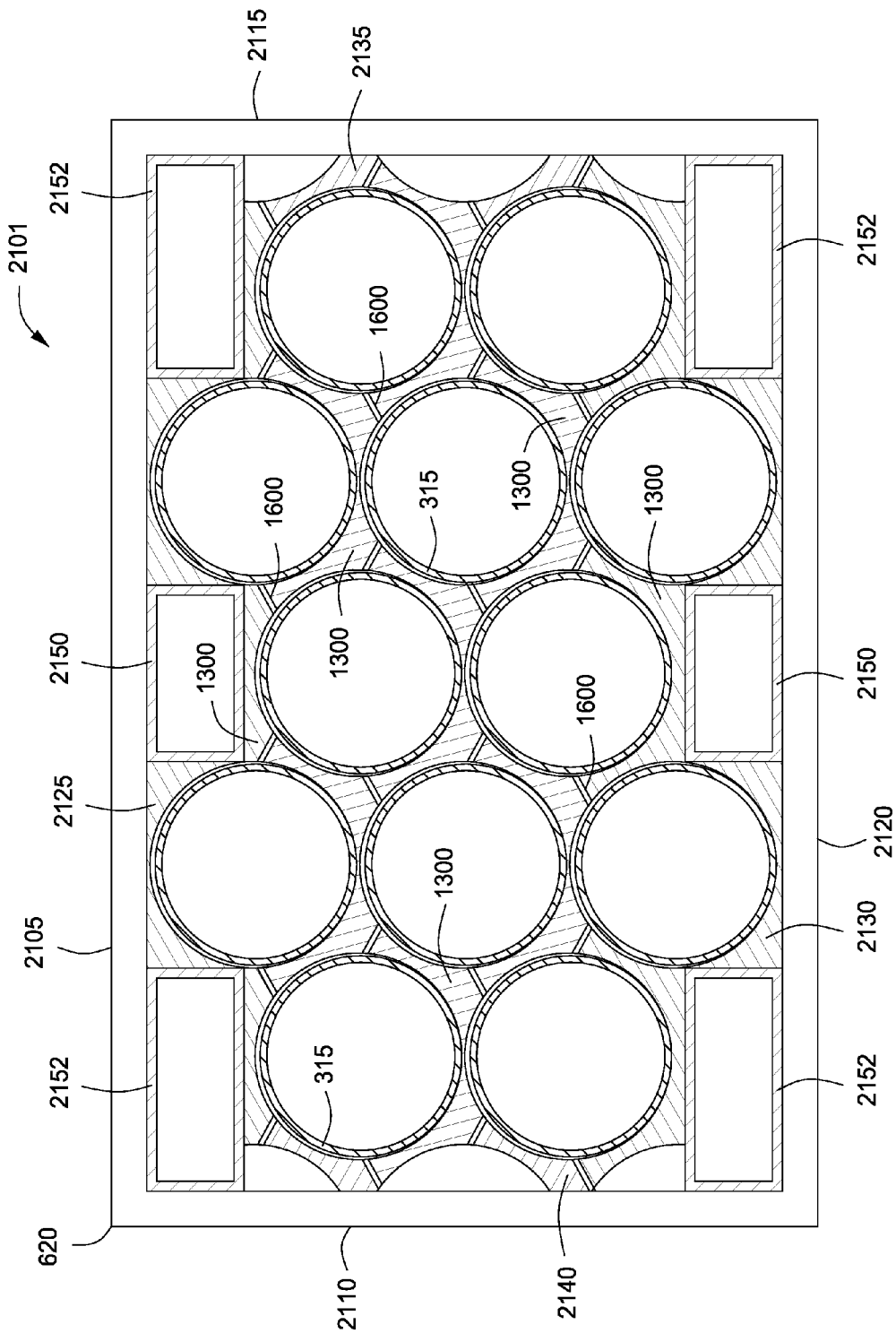
FIG. 21B depicts a cross-section of another illustrative support system for supporting a plurality of elongated members using a plurality of illustrative support bodies, according to one or more embodiments described.

FIG. 21B depicts a cross-section of another illustrative support system 2101 for supporting a plurality of elongated members 315 using a plurality of illustrative bodies 1300, according to one or more embodiments. The support system 2101 can be similar to the support system 2100, depicted in FIG. 21A. The support system 2101 can include structural support members 2150. The structural support members 2150 can be disposed between the first surface 2105 and/or the fourth surface 2120 of the frame 620 and the elongated members 315 that are below or above and staggered relative to the upper and lower most rows of horizontally aligned elongated members 315 (as oriented in FIG. 21B).

The structural support member 2150 can be integral with the first surface 2105 and/or the fourth surface 2120 of the frame 620 or secured thereto. The structural support member 2150 can be welded to the first surface 2105 and/or fourth surface 2120. The structural support member 2150 can be secured with bolts, bolts and nuts, rivets, screws, or any other suitable fastener. The structural support member 2150 can "lower" the first surface 2105 and "raise" the fourth surface 2120 toward the elongated members 315, such that a second side support 2125 or a first side support 2130 or a slightly modified second side support 2125 or a slightly modified first side support 2130 can be disposed between an elongated member 315 and a structural support member 2150.

As depicted in FIGS. 21A and 21B, the bodies 1300 are oriented with their longitudinal axis parallel to the first surface 2105 and the fourth surface 2120 of the frame 620. The elongated members 315 are in straight vertical rows with the elongated members 315 staggered in the horizontal direction (relative to the first surface 2105 and the fourth surface 2120). Although not shown, the bodies 1300 can be oriented with their longitudinal axis parallel to the second surface 2110 and the third surface 2115 of the frame 620. This orientation of the bodies 1300 would provide elongated members 315 in straight horizontal rows that are staggered in the vertical direction (relative to the first surface 2105 and the fourth surface 2125). This orientation of the bodies 1300 can require the radius of curvatures for the first surface 1310, the second surface 1320, the third surface 1330 and/or the fourth surface 1340 to be varied according to one or more embodiments discussed and described above with reference to FIGS. 13 and 14. Either configuration can be employed in supporting the elongated members 315. The support system 2100 can be oriented, such that the elongated members 315 are vertical, horizontal, or at any angle therebetween. The bodies 1300 can be oriented within the frame 620, such that the longitudinal axes are not parallel to any side 2105, 2110, 2115, and 2120 of the support frame 620. For a configuration in which the longitudinal axes of the bodies 1300 are not parallel to any side 2105, 2110, 2115, and 2120 of the frame 620 would require second surface supports 2125, first surface supports 2130, third side support 2135, and fourth side support 2140 to have different configurations.

As illustrated in FIGS. 21A and 21B, there are an odd number of elongated member 315 columns (5 as depicted). Also as illustrated, the first column of elongated members 315 includes an even number of elongated members 315. There can be an even number of elongated member 315 columns and/or an odd number of elongated members 315 in the first and last columns of the elongated members 315 and each alternating column therebetween. An even number of elongated member 315 columns provides another shaped structural support member 2152 that can be disposed in the corner between the fourth surface 2120 and the second surface 2110 and the fourth surface 2120 and the third surface 2115. The structural support members 2152 can also be disposed in the corner between the first surface 2105 and the second surface 2110 and the first surface 2105 and the third surface 2115.

Figure 22:
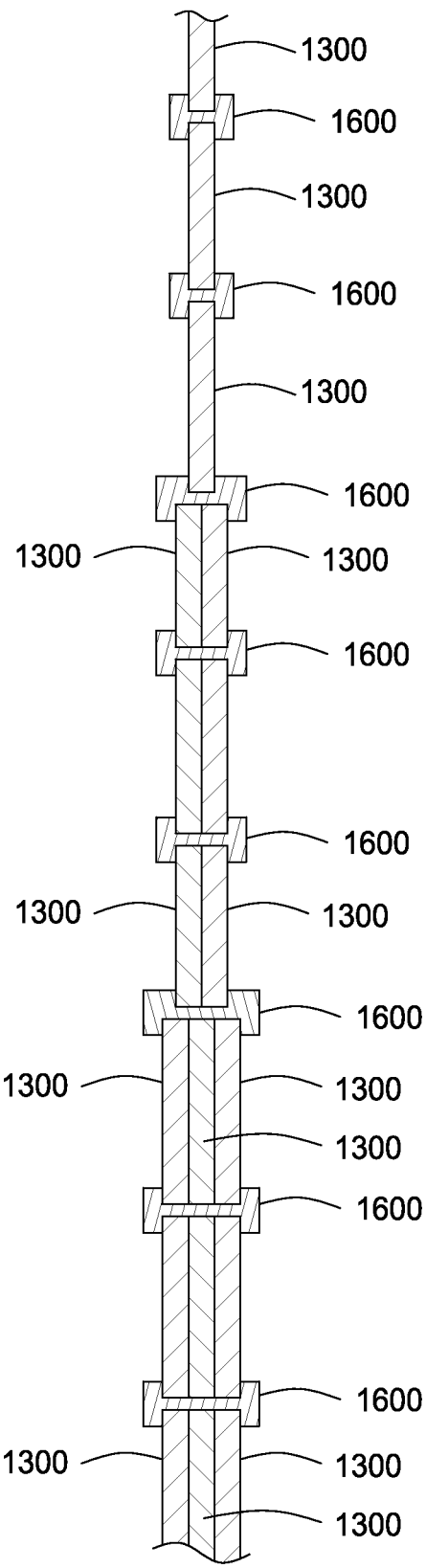
FIG. 22 depicts an elevation view of a plurality of illustrative support bodies positioned together using illustrative connectors, according to one or more embodiments described.

FIG. 22 depicts an elevation view of a plurality of illustrative bodies 1300 positioned together using illustrative connectors 1600, according to one or more embodiments. As discussed and described above with reference to FIG. 19, a single body 1300 can be connected to two or more bodies 1300 stacked together using a connector 1600. Describing FIG. 22, from the top down, three single bodies 1300 are connected using two connectors 1600 disposed between the first body 1300 and the second body 1300. Next are three rows of bodies 1300 that include two bodies 1300 stacked together. The first set of two bodies 1300 stacked together are connected to the third single body 1300 using a connector 1600 that includes a first groove having a width corresponding to the thickness of a single body 1300 and a second groove having a width corresponding to the thickness of the two stacked bodies 1300. The next two connectors 1600 include two grooves having a width corresponding to the thickness of two stacked bodies 1300. Next are three rows of three bodies 1300 stacked together. The first set of three bodies 1300 stacked together are connected to the third stack of the two bodies 1300 using a connector 1600 that includes a first groove having a width corresponding to the thickness of two stacked bodies 1300 and a second groove having a width corresponding to the thickness of three stacked bodies. The next two connectors 1600 include two grooves having a width corresponding to the thickness of the three stacked bodies 1300.

Increasing the number of bodies 1300 stacked together can provide an arrangement of bodies 1300 that are capable of supporting greater forces as additional weight is added to the bodies via additional elongated members 315 (see FIGS. 15, and 19-21B above). Any number of bodies 1300 can be stacked together. Also, as more bodies 1300 are stacked together, the connector 1600 can increase in an appropriate size to accommodate the larger span or gap the first groove 1606 and the second groove 1608 of the connector 1600 need to accommodate (see FIG. 16). The number of bodies 1300 stacked together at any particular level can depend upon the size of the elongated members 315 requiring support, the weight of the pipes requiring support, transportation conditions, such as rocking encountered on a ship or bumps encountered on a road during transport, the type or density of material that can be disposed within the elongated members 315 either permanently or temporarily, and the like. Although not shown, the bodies 1300 can include one or more holes disposed therethrough, which can receive one or more fasteners that can secure or otherwise connect two or more stacked bodies 1300.

Although not shown, the thickness of the bodies 1300 can increase from the top of the column of the bodies 1300 to the bottom of the column of the bodies 1300. Increasing the thickness of the bodies 1300, rather than stacking two or more bodies 1300 together can provide additional support and reduce then number of individual bodies 1300 required to support a plurality of elongated members. For example, the two bodies 1300 stacked together can be replaced by a single body having a thickness of two bodies 1300.

Figure 23:
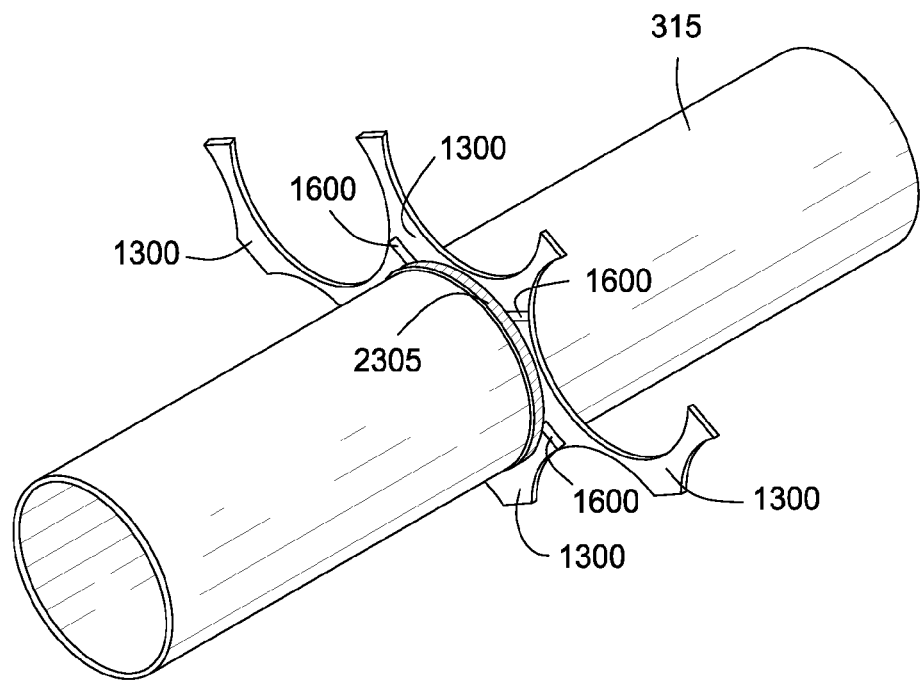
FIG. 23 depicts an isometric view of a plurality of illustrative support bodies disposed about an elongated member, according to one or more embodiments described.

FIG. 23 depicts an isometric view of a plurality of illustrative bodies 1300 disposed about an elongated member 315, according to one or more embodiments. An optional support band 2305 can be disposed about the elongated member 315. The support band 2305 can keep the bodies 1300 aligned around the elongated member 315. The support band 2305 can prevent or reduce the amount a body 1300 can shift about the elongated member 315. The support band 2305 can include a channel or groove within which the first surface 1310, second surface 1320, third surface 1330, and the fourth surface 1340 of a plurality of bodies 1300 can be disposed. Due to the weight of the bodies 1300, the elongated members 315, and the like, the bodies 1300 can press into or otherwise deform the support band 2305 to provide a groove about which the bodies 1300 rest. In one or more embodiments, two support bands 2305 can be disposed about the elongated member 315, such that a gap is provided therebetween. The body 1300 can rest within the gap provided between the two support bands 2305, which can help to reduce and or prevent movement of the bodies 1300 about the longitudinal axis of the elongated members 315.

The support band 2305 can be secured about at least a portion of the outer diameter of the elongated member 315. The support band 2305 can be secured about the entire diameter of the elongated member 315. The support band 2305 can be secured about at least a portion of the outer diameter of the elongated member 315 using a metal banding strap (not shown). The support band 2305 can be made from any suitable material, including one more thermoplastics, elastomers, rubbers, and/or urethanes. In one or more embodiments, two support bands 2305 can be disposed about the elongated member 315, such that a gap is provided therebetween. The body 1300 can rest within the gap provided between the two support bands 2305, which can help to reduce and or prevent movement of the bodies 1300 about the longitudinal axis of the elongated members 315.

Although not shown, the elongated member 315 can include a channel, groove, or other recess in which the bodies 1300 can rest. The channel, groove, or other recess of the elongated member 315 can be sufficient to reduce or prevent the bodies 315 from moving or otherwise becoming unaligned. Although not shown, the elongated member 315 can include a ridge, pin, weld bead, or other protrusion disposed on the pipe about at least a portion of each side of the bodies 1300 to align the bodies 1300 and reduce or prevent the bodies from moving or otherwise becoming unaligned. For example, a metal ridge or stud can be welded to the outside of the elongated member 315 on both sides of where a body 1300 can be disposed, which can act as a stop, thereby preventing the body 1300 from moving along the length of the pipe.

Figure 24A:
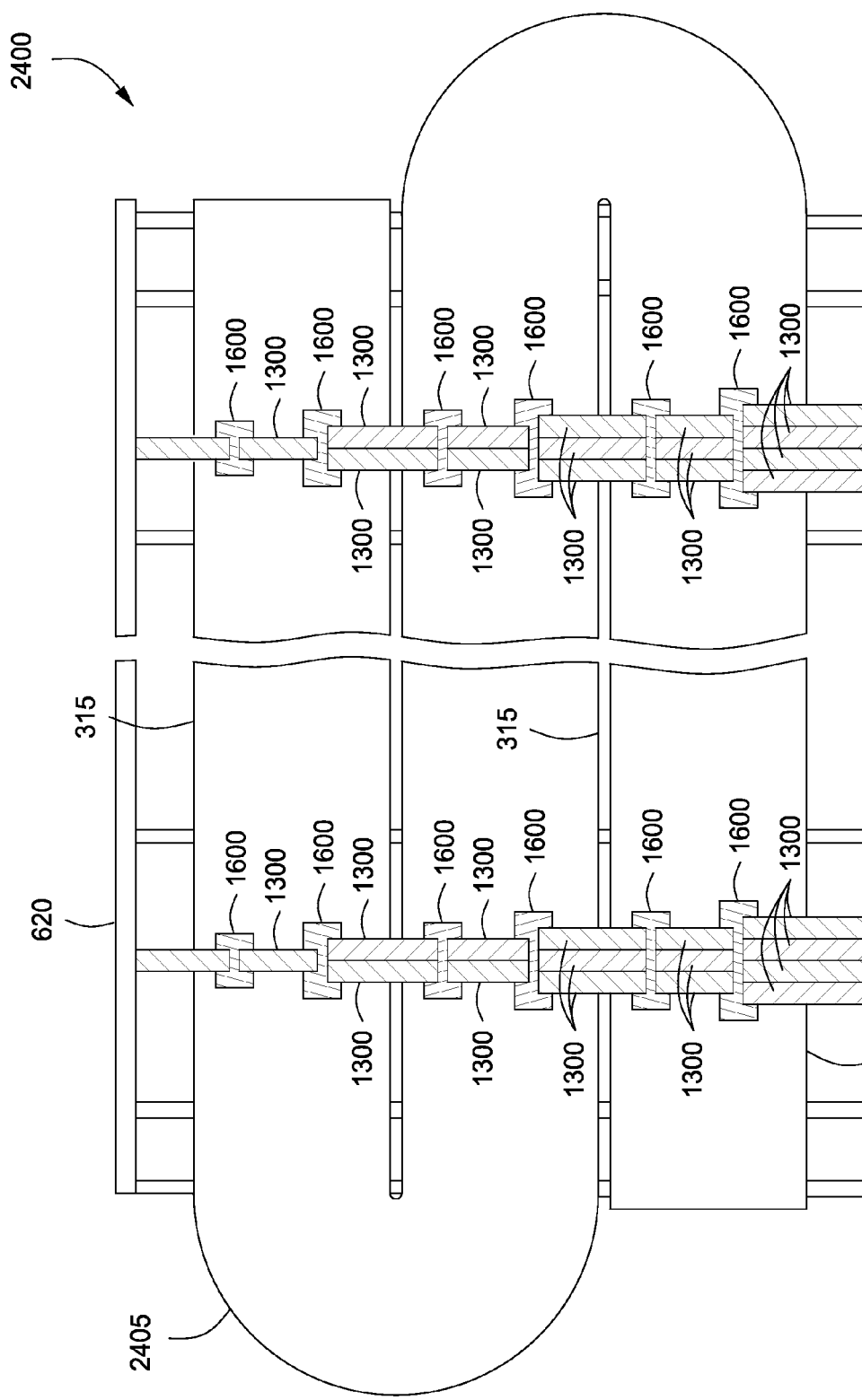
FIG. 24A depicts an elevation view of an illustrative serpentine pipeline support system, according to one or more embodiments described.

FIG. 24A depicts an elevation view of an illustrative serpentine pipeline support system 2400, according to one or more embodiments. The support system 2400 can include a structural support frame 620, which can be as discussed and described above. The support system 2400 can include a plurality of bodies 1300 and connectors 1600.

Two or more elongated members 315 can be sequentially connected to form the serpentine pipeline 2405. The elongated members 315 can be connected using 180° bends, 90° elbows, and the like to form the serpentine pipeline 805 as depicted in FIG. 24. The serpentine pipeline 2405 can include about 10 or more individual elongated members 315, about 20 or more individual elongated members 315, about 50 or more individual elongated members 315, about 100 or more individual elongated members 315, about 200 or more individual elongated members 315, about 300 or more individual elongated members 315, about 400 or more individual elongated members 315, or about 500 or more individual elongated members 315. One or more bodies 1300 can also be disposed between the elongated members 315 forming the serpentine pipeline 2405.

The number of bodies 1300 can increase as more weight, due to the number of elongated members 315, is added to the support system 2400. The serpentine pipeline 2405 formed from a plurality of elongated members 315 can be supported by bodies 1300. As shown, the number of bodies 1300 can increase from a single body 1300 at or toward the top of the support system 2400 to a plurality of stacked bodies 1300 (four are shown) at the bottom of the support system 2400. The lower level of four stacked bodies 1300 can be similar to the fourth surface support 2130, and the upper body 1300 can be similar to the first surface support 2125 as discussed and described above with reference to FIGS. 21A and 21B.

Figure 24B:
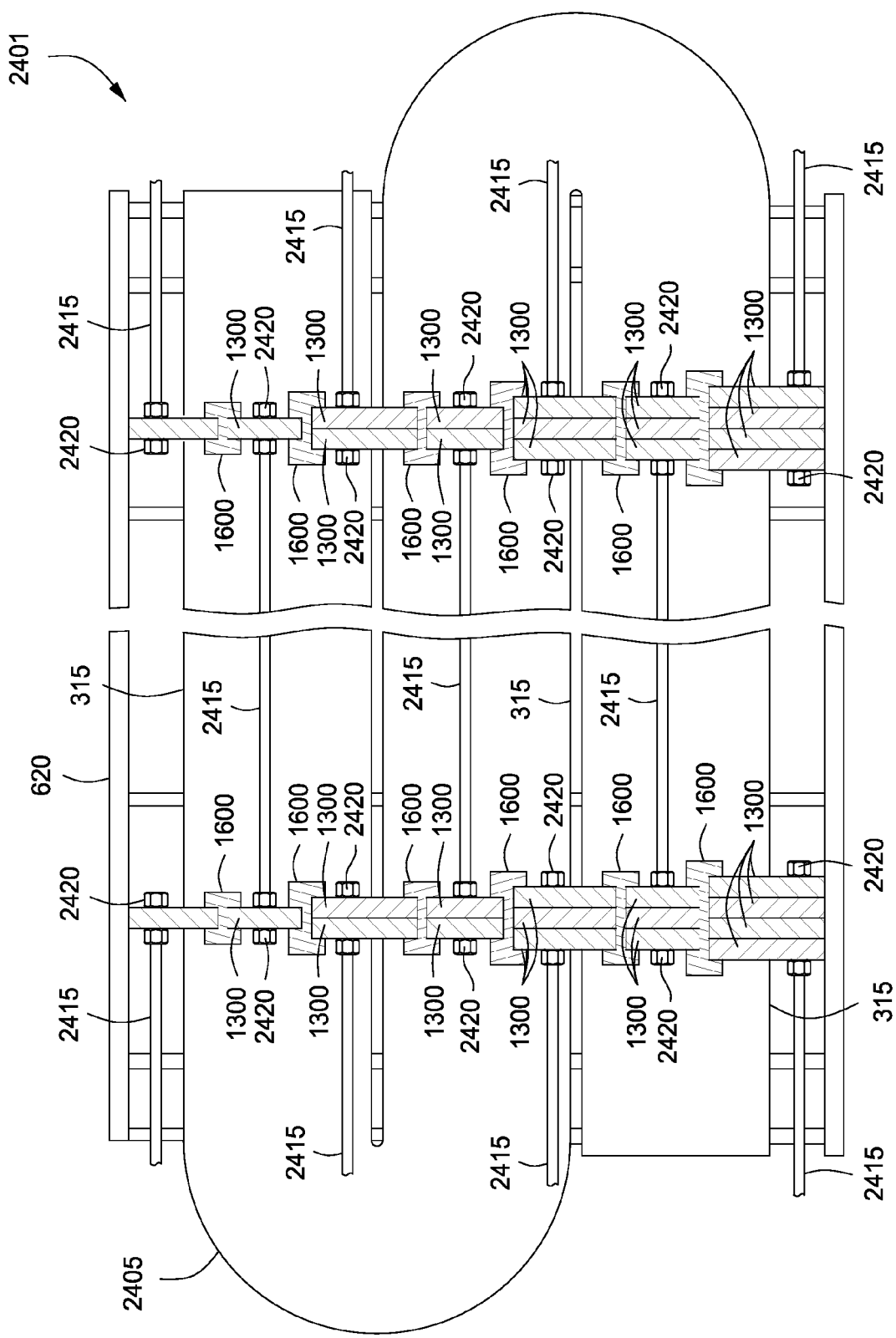
FIG. 24B depicts an elevation view of another illustrative serpentine pipeline support system, according to one or more embodiments described.

FIG. 24B depicts an elevation view of another illustrative serpentine pipeline support system 2401, according to one or more embodiments. The support system 2401 can be similar to the support system 2400 discussed and described above with reference to FIG. 24A. The system 2401 can further include one or more tie-rods 2415 and retaining nuts 2420 to secure the plurality of bodies 1300 between the elongated members 315 of the serpentine pipeline 2405. The one or more tie-rods 2415 can penetrate through the one or more bodies 1300 via one or more holes disposed therethrough. The cross sectional area of the one or more tie-rods 2415 can depend upon the horizontal span or length between the bodies 1300, and the overall length of the elongated members 315. The one or more tie-rods 2415 can have a circular cross section. The one or more tie-rods 2415 can have a polygonal cross section. The one or more tie rods 2415 can have a diameter ranging from a low of about 0.3 cm, about 0.6 cm, about 1 cm, or about 1.25 cm to a high of about 2 cm, about 3 cm, about 4 cm, about 5 cm, or more. The one or more tie-rods 2415 can be made of a low temperature resistant material capable of withstanding cryogenic or near-cryogenic temperatures.

One or more nuts 2420 or any other fastener can be secured about the ends of the tie-rods 2415 proximate the outer side of a body 1300. The one or more nuts 2420 or other fasteners can be secured about the tie-rods 2415 proximate the inner side of a body 1300. The nuts 2420 or other fasteners can maintain the one or more bodies 1300 disposed therebetween in a fixed position.

Although not shown in FIG. 24A or 24B, the support systems 2400, 2401 can include bodies 1300 having differing thicknesses, which can be disposed between adjacent elongated members 315. Bodies 1300 that increase in thickness can eliminate the stacking of two or more bodies 1300.

Figure 25:
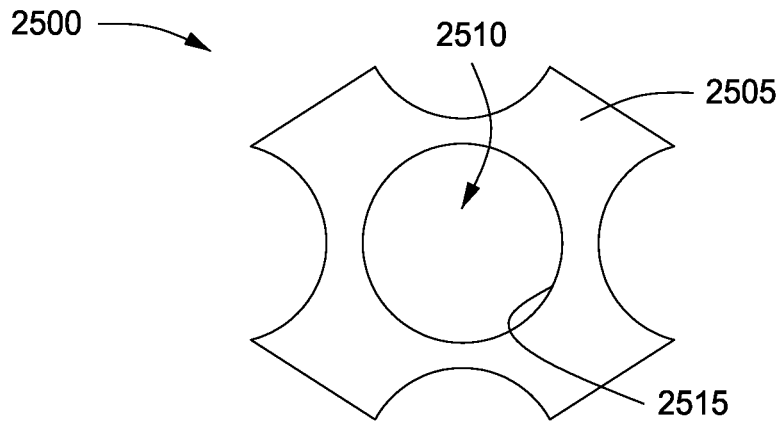
FIG. 25 depicts a side view of another illustrative support body, according to one or more embodiments described.

FIG. 25 depicts a side view of another illustrative body 2505, according to one or more embodiments. The body 2505 can be similar to the body 100 discussed and described above with reference to FIGS. 1 and 2. The body 2505 can include one or more holes (one is shown 2510) disposed through the body 2505. The one or more holes 2510 can be any suitable shape and size. For example, the one or more holes 2510 can be circular, elliptical, oval, and the like.

In one or more embodiments, the length of the perimeter or surface 2515 of the one or more holes 2510 disposed through the body 2505 can be similar to the length of the first surface 110, second surface 120, third surface 130, and the fourth surface 140. The perimeter 2515 of the one or more holes 2510 can be sized to provide an opening similar to the openings provided by a plurality of the bodies 302, 304, 305, 306, 308, 309, 310 discussed above with reference to FIG. 3. The one or more holes 2510 can be sized to accommodate the one or more dimensional variations of an elongated member 315, as discussed and described above with reference to FIG. 3. For example, the out of roundness ("OOR"), outer diameter variance ("ODV"), and/or weld height ("WH") of the elongated members. In another example the FA of the body 2505 of elongated members 315. Another variation that can be accounted for in the body 2505 can be a radial expansion/contraction of the one or more elongated members 315 supported by one or more bodies. Yet another variation that can be accounted for can be dimensional changes, e.g. expansion and/or contraction, of the body 1505 due to temperature and pressure, for example.

In one or more embodiments, a hole 2510 can be arranged through a body 2505 to provide a support member similar to the support members discussed and described above with reference to FIGS. 3-7B and 15, for example bodies 100, 302, 703, and 1300. In one or more embodiments, the body 2505 can be the same thickness throughout or the thickness can vary. For example, a body 2505 vertically positioned can be thinner at the top and thinner at the bottom. The thickness of the vertically positioned body 2505 can increase constantly, or non-constantly, for example in a step-wise fashion. The body 2505 can be thicker at the bottom end, which can provide increased strength to the body 2505, which can support increased weight and/or other forces.

In one or more embodiments, a plurality of bodies 2505 having a holes 2510 disposed therethrough can be aligned to support one or more elongated members. For example, a plurality of bodies 2505 having holes 2510 disposed therethrough can be arranged and aligned such that a plurality of elongated members can be supported by the bodies 2505.

In one or more embodiments, a plurality of aligned bodies 2505 having a hole 2510 disposed therethrough and aligned for receiving one or more elongated members 315 can be moved along the length of the one or more elongated members. In another embodiment, the one or more elongated members 315 can be moved, or otherwise positioned within the aligned holes of the plurality of bodies 2505, while the bodies 2505 are secured in position. In yet another embodiment, both the plurality of bodies 2505 and the one or more elongated members can be moved and positioned in order to place the one or more elongated members 315 within the aligned holes 2505 disposed through the bodies 2505.

Figure 26:
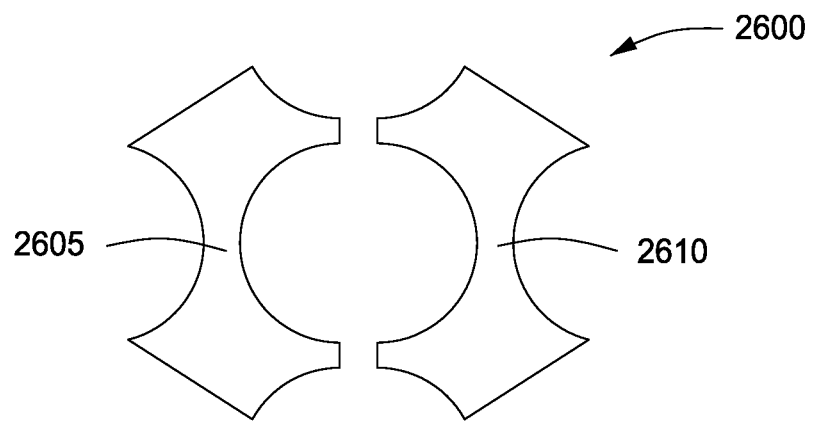
FIG. 26 depicts a side view of an illustrative multi-component support body, according to one or more embodiments described.

FIG. 26 depicts a side view of another illustrative multi-piece or multi-component body 2600, according to one or more embodiments. The multi-component body 2600 can include two or more components (two are shown 2605, 2610). Although not shown, in one or more embodiments, each component 2605, 2610 can be two or more components connected together to provide the two or more components 2605, 2610. As shown, each component 2605, 2610 can be mirror images of one another. In one or more embodiments, each component 2605, 2610 of the multi-component body 2600 can be non-mirror images of one another.

The multi-component body 2600 can be aligned and arranged such that one or more elongated members 315 can be supported by one or more of the multi-component bodies 2600, as discussed and described above. The components 2605, 2610 can be arranged and aligned such that one or more elongated members (not shown) can be supported. In one or more embodiments, the multi-component body 2600, when properly arranged and aligned, can include one or more holes disposed through the multi-component body 2600. One or more of the components 2605, 2610 can include a hole or a portion of a hole, such that arrangement of the components 2605, 2610 provides a multi-component body 2600 having a hole disposed therethrough.

For example, the multi-component body 2600 can include a hole similar to the hole disposed through the body 2505, discussed and described above with reference to FIG. 25. As shown in FIG. 26, each component 2605, 2610 of the multi-component body 2600 can include a portion of the a hole can be formed when the components 2605, 2610 are properly arranged and aligned in respect to one another. In one or more embodiments, the portion of the hole (or a plurality of holes) formed through a multi-component body 2600 can be the same for each component 2605, 2610 or different. For example, as illustrated in FIG. 26, each component 2605, 2610, can include be mirror images of one another and therefore, can include the same amount or portion of a hole that can be formed through the multi-component body 2600 when the components 2605, 2610 are properly arranged.

Figure 27:
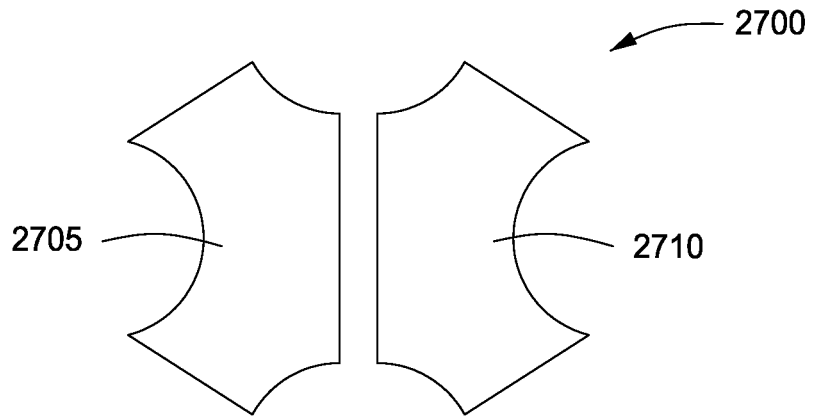
FIG. 27 depicts a side view of another illustrative multi-component support body, according to one or more embodiments described.

FIG. 27 depicts a side view of another illustrative multi-piece or multi-component body 2700, according to one or more embodiments. The multi-component body 2700 can include two or more components (two are shown 2705, 2710). Although not shown, in one or more embodiments, each component 2705, 2710 can be two or more components connected together to provide the two or more components 2705, 2710. As shown, each component 2705, 2710 can be mirror images of one another. In one or more embodiments, each component 2705, 2710 of the multi-component body 2700 can be non-mirror images of one another. The components 2705, 2710 can include two flat or complimentary surfaces that can be mated to connected together to provide the body 2700.

Although not numbered, the bodies 2500, 2600, and 2700 can include a first surface 110, second surface 120, third surface 130, fourth side, 140 and other features, such as the contact surfaces 145, 155, 165, 175 similar to the body 100 discussed and described above with reference to FIGS. 1 and 2. The bodies 2500, 2600, and/or 2700 can be made of any suitable material. The bodies 2500, 2600, and/or 2700 can be made of a metal, metal alloy, non-metallic materials, or combinations thereof. Suitable metals, metal alloys, and non-metallic materials can be similar to those discussed and described above with reference to body 100. The bodies 2500, 2600, and/or 2700 can be made using a non-metallic material or combination of non-metallic materials such as those discussed herein. The bodies 2500, 2600, and/or 2700 can be formed using one or more molding processes including, but not limited to, pultrusion, VARTM, vacuum infusion molding, random glass cast and/or compression molding, or any combination thereof.

A body 2500, 2600, and/or 2700 made from one or more metals or metal alloys can include one or more non-metallic materials disposed on or about the first contact surface 145, the second contact surface 155, the third contact surface 165, the fourth contact surface 175 and/or any other surface. A body 2500, 2600, and/or 2700 made from one or more metals or metal alloys can include one or more non-metallic materials disposed at any location on or about the bodies. One or more non-metallic materials can be disposed on the first surface 110, the second surface 120, the third surface 130, and/or the fourth surface 140. One or more non-metallic materials can be disposed on the first contact surface 145, the second contact surface 155, the third contact surface 165, and/or the fourth contact surface 175.

In one or more embodiments, a conductive member, e.g. a conductive disc, film, plate, insert, or foil, can be disposed on or about any surface of the bodies 2500, 2600, and/or 2700. In addition to being conductive, the conductive member can be corrosion resistant, resistant to biological growth, account for dimensional changes between two bodies 2500, 2600, and/or 2700 that may be connected or otherwise positioned together, or the like. For example, a conductive member can be disposed on or about a front side and/or a rear side of the body 2500, 2600, and/or 2700. In another example, a conductive member can be disposed on or about the first surface 110, the second surface 120, the third surface 130, the fourth surface 140, the first contact surface 145, the second contact surface 155, the third contact surface 165, and/or the fourth contact surface 175. In at least one embodiment, any one or more surfaces or sides of the support 2500, 2600, and/or 2700 can include an electrical connector or connection to ground.

In any of the embodiments described herein, any one or more surfaces or sides can include one or more electrostatic inhibitors or attenuators to reduce or eliminate static charge or build up. Such electrostatic inhibitors or attenuators can be disposed on or in support the bodies 100, 1300. Similarly, any one or more surfaces or sides of the bodies 100, 1300 can include an electrical connector or connection to ground.

Figure 28:
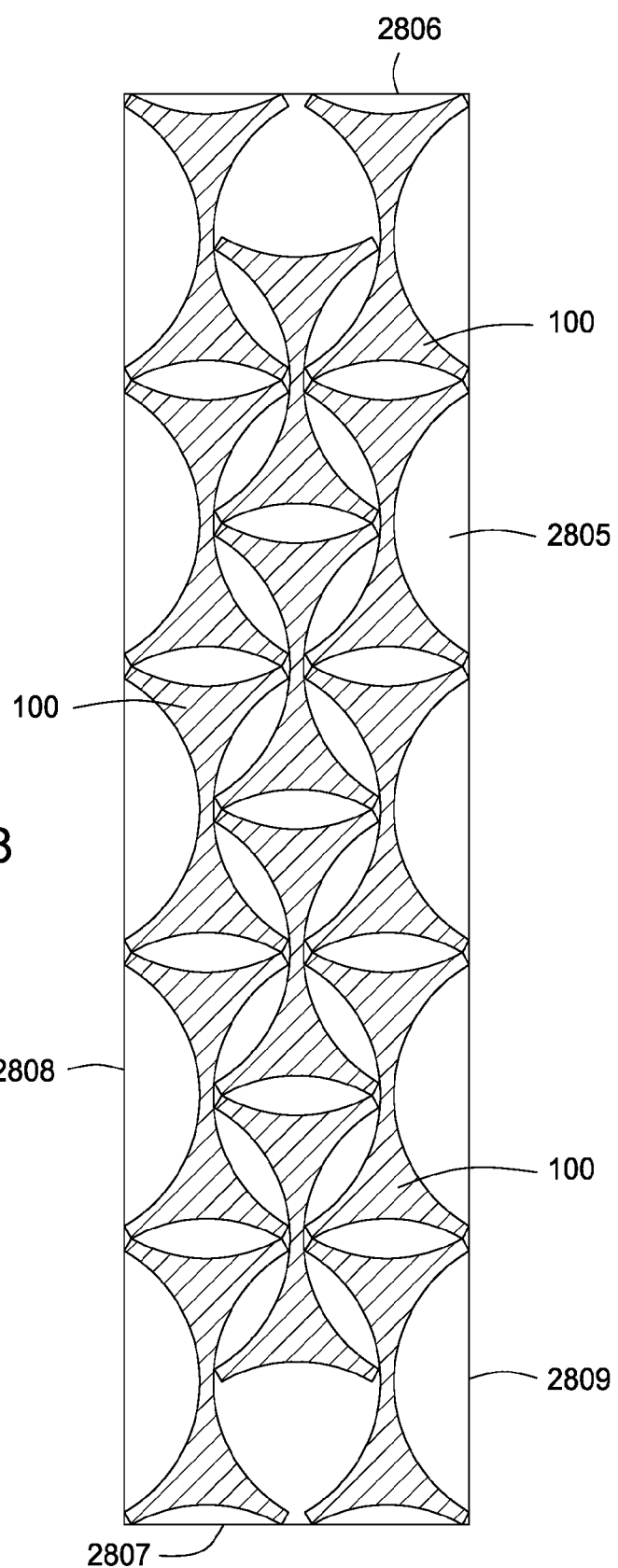
FIG. 28 depicts a top view of an illustrative arrangement of a plurality of the support bodies depicted in FIGS. 1 and 2 that are be removed from a support body production substrate, according to one or more embodiments described.
Figure 29:
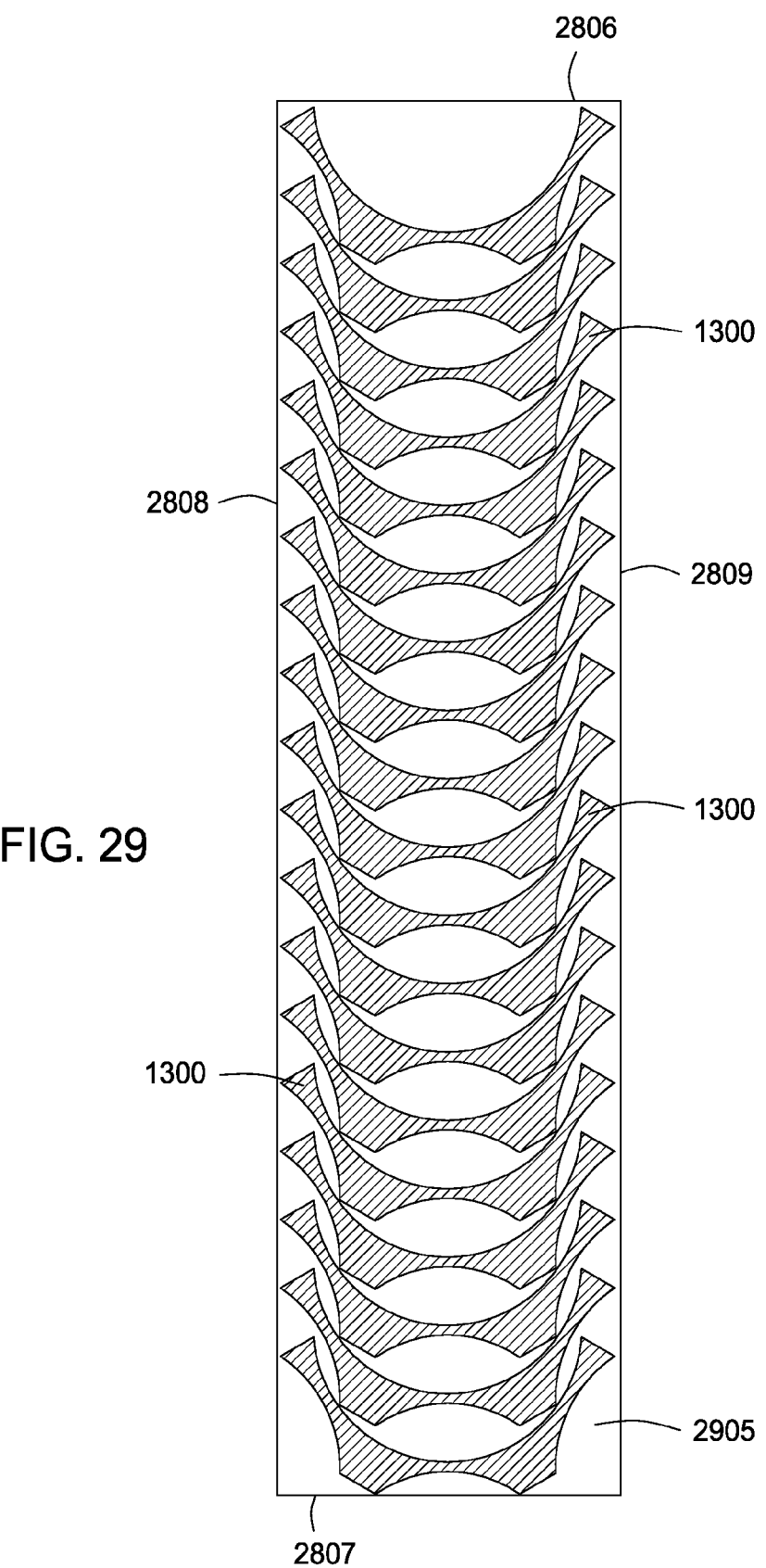
FIG. 29 depicts a top view of an illustrative arrangement of a plurality of the support bodies shown in FIGS. 13 and 14 that are to be removed from a support body production substrate, according to one or more embodiments described.

FIG. 28 depicts a top view of an illustrative body production substrate 2805 from which a plurality of the bodies 100 are to be formed from, according to one or more embodiments. FIG. 29 depicts a top view of an illustrative body production substrate 2905 from which a plurality of the bodies 1300 are to be formed from, according to one or more embodiments. The bodies 100, 1300 can be as discussed and described above with reference to FIGS. 1, 2, 13, and 14, for example. In one or more embodiments, any body or combination of bodies discussed and described herein can be formed from the production substrates 2805, 2905. For example, bodies 2505, 2600, and 2700 can be formed from the production substrates 2805, 2905.

The production substrates 2805, 2905 can be a sheet or block of material from which one or more bodies 100, 1300 can be formed. As specifically shown, the production substrates 2805, 2905 can be a rectangular substrate having any desirable dimensions, e.g. length, width, and height or thickness. In one or more embodiments, the production substrates 2805, 2905 can have a length from a first end 2806 to a second end 2807 ranging from a low of about 0.5 m, about 1.5 m, or about 3 m to a high of about 6 m, about 9 m, about 12 m, about 15 m, or about 20 m. In one or more embodiments, the production substrates 2805, 2905 can have a width from a first side 2808 to a second side 2809 ranging from a low of about 0.25 m, about 0.5 m, or about 1 m to a high of about 1.5 m, about 2 m, about 3 m, or about 6 m. In one or more embodiments, the production substrates 2805, 2905 can have a thickness from a front side to a rear side ranging from a low of about 0.5 cm, about 1 cm, about 2 cm, or about 3 cm to a high of about 10 cm, about 20 cm, about 30 cm, about 40 cm, or about 50 cm. The production substrates 2805, 2905 can taper from a first thickness at the first end 2806 to a second thickness at the second end 2807. The production substrates 2805, 2905 can change thickness from the first end 2806 to the second end 2807 in a linear or non-linear manner, for example the change in thickness can be linear, step-wise, or any combination of linear and non-linear curves.

The production substrates 2805, 2905 can be made from any material suitable for forming the bodies 100, 1300, such as those discussed and described herein. For example, the production substrates 2805, 2905 can be made of metals, metal alloys, non-metallic materials, or any combination thereof. In at least one specific example, the production substrates 2805, 2905 can be made from one or more fiber reinforced thermosetting plastics. The fiber reinforced thermosetting plastic can be, for example, reinforced polyurethane. The production substrates 2805, 2905 can be formed using any suitable process. Illustrative processes can include, but are not limited to, one or more molding processes, for example, pultrusion, VARTM, vacuum infusion molding, random glass cast and/or compression molding, or any combination thereof. In at least one specific embodiment, the production substrates 2805, 2905 can be formed using a pultrusion process to provide the production substrates 2805, 2905 having the desired dimensions.

Preferably the dimensions of the production substrates 2805, 2905 are at least equal to the dimensions of at least one body 100 and/or 1300 that is to be formed therefrom. For example, the production substrates 2805, 2905 can have a width, height, and thickness that are at least equal to the dimensions of the body 100 and/or 1300 to be formed from the production substrate 2805, 2905. For example, a body 100 having a thickness of about 2.5 cm can be formed from a production substrate 2805 having a thickness of about 2.5 cm. In another example, the production substrates 2805, 2905 can have a width, height, and thickness that are at least equal to partial bodies 100 and/or 1300.

Bodies 100, 1300, which may be formed from the production substrates 2805, 2905 can be arranged or organized in a pattern or arrangement that provides the greatest number of bodies 100, 1300 from the production substrate 2805, 2905, respectively. For example, a plurality of bodies 100 can be formed from the production substrate 2805 from a plurality of aligned rows in which every other row is staggered, as shown in FIG. 28. In another example, a plurality of bodies 1300 can be formed from the production substrate 2905 from a plurality of stacked rows in which the bodies 1300 are nested or closely packed/arranged relative to one another. Removing the bodies 100, 1300 from the production substrates 2805, 2905 from a closely stacked or positioned arrangement can provide the greatest number of bodies 100, 1300 from each production substrate 2805, 2905, while minimizing or reducing the amount of the productions substrates 2805, 2905 that is discarded as waste.

One or more bodies 100, 1300 can be formed or removed from the production substrates 2805, 2905 using any suitable system. For example, one or more bodies 100, 1300 can be formed or removed, e.g. cut, from the production substrates 2805, 2905, respectively, by a water jet cutting tool (not shown). Operation of the water jet cutting tool can be done via one or more people and/or one or more automated systems or machines. An automated system or machine can include, for example, a computer and one or more robotic systems.

The water jet cutting tool can cut along the outer perimeter of each body 100, 1300 to be formed from the production substrates 2805, 2905. The outer perimeter of the body 100, for example, may include the first surface 110, the first contact surface 145, the third surface 130, the third contact surface 165, the second surface 120, the fourth contact surface 175, the fourth surface 140, and the second contact surface 155, as discussed and described above with reference to FIGS. 1 and 2. The outer perimeter of the bodies 100, 1300 can be formed to include any of the desired configurations discussed and described herein. If desired, the water jet cutting tool, a drill, or other tool can also form the one or more holes 180 that may be disposed through the bodies 100 and/or 1300 as discussed and described above with reference to FIGS. 12, 13, and 14.

Other suitable body 100, 1300 removal tools or systems can include, but are not limited to saws, lasers, torches, or any combination thereof. In at least other one example, one or more bodies 100, 1300 can be formed from the production substrates 2805, 2905 by stamping. A stamp or stamping die, having the desired shape of a body to be formed 100, 1300, can be pressed together and one or more bodies 100, 1300 can be formed form the production substrates 2805, 2905. For example, a production substrate 2805, 2905 having a plurality of bodies 100, 1300 to be formed therefrom can be stamped, either sequentially or simultaneously, to provide the plurality of individual bodies 100, 130. For simultaneous production of multiple bodies 100, 1300 the stamping die can include multiple body stamps/dies that are arranged in a configuration that the bodies 100, 1300 are to be formed or removed from the substrates 2805, 2905, respectively.

After forming a plurality of bodies 100, 1300 from the production substrates 2805, 2905, should it be desired that two or more bodies 100, 1300 be stacked and secured together, such stacking and securing of the bodies 100, 1300 can be done via one or more people and/or one or more automated systems. For example, a computer system can be used to control one or more robotic systems that can stack and secure two or more bodies 100, 1300 together using any one or more of the fastening devices discussed herein. One particular fastening system can include coating one or both bodies 100 or 1300 that are to be secured together with an adhesive about the sides that are to be secured together.

Embodiments of the present invention further relate to any one or more of the following paragraphs:

1. A support member for supporting one or more elongated members, comprising a body, at least four support arms extending from the body, and at least one curved surface disposed between the support arms, wherein each curved surface is concave relative to a centerline of the body, and at least one curved surface has a length that is at least twice as long as at least one other curved surface.

2. The support member according to paragraph 1, wherein a first set of opposed curved surfaces and a second set of opposed curved surfaces are disposed about the body.

3. The support member according to paragraphs 1 or 2, wherein the first set of curved surfaces comprises one curved surface that is circular and one curved surface that is elliptical, parabolic, circular, or any combination thereof.

4. The support member according to any of paragraphs 1 to 3, wherein the body is monolithic or comprises two or more components.

5. The support member according to any of paragraphs 1 to 4, wherein each component comprises at least two support arms.

6. The support member according to any of paragraphs 1 to 5, wherein at least one of the curved surfaces has a length that is at least three times as long as at least one other curved surface.

7. The support member according to any of paragraphs 1 to 6, wherein at least one of the curved surfaces has a length that is at least three times as long as at least three other curved surface.

8. The support member according to any of paragraphs 1 to 7, wherein the body has a variable thickness.

9. The support member according to any of paragraphs 1 to 8, wherein each support arm comprises a distal end having a contact surface disposed thereon, each contact surface having at least one surface modification selected from the group consisting of protrusions, projections, protuberances, ridges, pins, rods, dimples, depressions, grooves, holes, notches, and recesses.

10. The support member according to any of paragraphs 1 to 9, wherein at least two curved surfaces have substantially the same length.

11. The support member according to any of paragraphs 1 to 10, wherein each curved surface has a curvature that is radial, circular, elliptical, parabolic, or any combination thereof.

12. A support system for supporting one or more elongated members, comprising at least four support members, each support member comprising a body; at least four support arms extending from the body, each support arm comprising a contact surface at a distal end thereof; at least one curved surface disposed between the support arms, wherein each curved surface is concave relative to a centerline of the body, and at least one curved surface has a length that is at least twice as long as at least one other curved surface; wherein the support members are arranged with respect to one another such that an opening is formed between the support members.

13. The support system according to paragraphs 12, further comprising a connector disposed between two adjacent support bodies.

14. The support system according to paragraphs 12 or 13, wherein the contact surfaces comprise at least one surface modification selected from the group consisting of protrusions, projections, protuberances, ridges, pins, rods, dimples, depressions, grooves, holes, notches, and recesses.

15. The support system according to any of paragraphs 12 to 14, further comprising at least one elongated member disposed within the opening and supported by at least one of the support members.

16. The support system according to paragraph 15, wherein the at least one elongated member is supported in a horizontal position, a vertical position, or at any position between horizontal and vertical.

17. The support system according to paragraph 15, wherein the at least one elongated member is supported on one of the curved surfaces having a length that is at least twice as long as at least one other curved surface.

18. The support system according to paragraph 15, wherein the at least one elongated member comprises a tubular member, pipe, pipeline, cable, communication line, electrical line, open channel, duct, pole, cylinder, or rod.

19. The support system according to any of paragraphs 12 to 18, further comprising an elongated member disposed within the opening, wherein a perimeter of the opening is greater than an outer perimeter of the elongated member.

20. The support system according to any of paragraphs 12 to 19, further comprising a frame disposed about at least a portion of the support members.

21. The support system according to paragraph 20, wherein the frame is disposed on a ship.

22. A method for supporting one or more elongated members, comprising: locating at least four support members about one another, each support member comprising: a body; at least four support arms extending from the body, each support arm comprising a distal end having a contact surface disposed thereon; at least one curved surface disposed between the support arms, wherein each curved surface is concave relative to a centerline of the body, and at least one curved surface has a length that is at least twice as long as at least one other curved surface; wherein the support members are arranged with respect to one another such that an opening is formed therebetween; and disposing a first elongated member within the opening.

23. The method according to paragraph 22, further comprising locating a connector between any two adjacent support members.

24. The method according to paragraphs 22 or 23, further comprising locating at least three more support members about the at least four support members such that a second opening is formed between the at least three more support members; and locating a second elongated member within the second opening.

25. The method according to paragraph 24, wherein the elongated members are disposed vertically, the second elongated member is located above the first elongated member, and the weight of the first and second elongated members is transferred to the support members.

26. The method according to paragraph 25, wherein the weight of the second elongated member and the support members disposed above the first elongated member is transferred to the support members beneath the second elongated member and not to the first elongated member.

27. The method according to any of paragraphs 22 to 26, further comprising introducing natural gas to the first elongated member.

28. The method according to paragraph 27, wherein the support members are located on a ship and the method further comprises operating the ship.

29. The method according to any of paragraphs 22 to 28, further comprising disposing a frame about at least a portion of the support members.

30. The method according to any of paragraphs 22 to 29, further comprising securing adjacent support members to one another with a connecting member.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A support member for supporting one or more elongated members, comprising:
a body having a longitudinal centerline and a latitudinal centerline, wherein the body comprises at least four coplanar support arms extending therefrom, wherein a first set of opposing curved side surfaces and a second set of opposing curved side surfaces are disposed about the body, wherein a first curved side surface in the first set extends from a distal end of one of the support arms to the longitudinal centerline of the body or to the latitudinal centerline of the body, wherein the first curved side surface in the first set is an arc that follows a circular curve, wherein a second curved side surface in the first set is an arc that follows an elliptical curve having a major radius and a minor radius that are not equal to one another, and wherein the first curved side surface in the first set has a length that is at least twice as long as a first curved side surface in the second set.

2. The support member of claim 1, wherein each of the curved side surfaces in the second set comprises an arc that follows an elliptical curve, a circular curve, or a combination thereof.

3. The support member of claim 1, wherein the body is monolithic or comprises two or more components.

4. The support member of claim 1, wherein the distal end of each support arm comprises a contact surface disposed thereon, each contact surface having at least one surface modification selected from the group consisting of: protrusions and recesses.

5. The support member of claim 1, wherein at least two curved side surfaces have substantially the same length.

6. The support member of claim 1, wherein the distal end of each support arm is located at a terminal end of each support arm relative to the longitudinal centerline of the body or the latitudinal centerline of the body.

7. The support member of claim 1, wherein each of the curved side surfaces in the second set is an arc that follows a circular curve.

8. The support member of claim 1, wherein a radius of the arc that follows the circular curve is less than the major radius of the arc that follows the elliptical curve.

9. The support member of claim 1, wherein the first curved side surface in the second set is an arc that follows a circular curve or an elliptical curve, and wherein a radius of the arc that follows the circular curve or a major radius of the arc that follows the elliptical curve of the first curved side surface in the second set is less than a radius of the arc that follows the circular curve of the first curved side surface in the first set.

10. The support member of claim 1, wherein the first and second curved side surfaces in the first set are opposed to one another about the longitudinal centerline, and wherein the first curved side surface and a second curved side surface in the second set are opposed to one another about the latitudinal centerline.

11. The support member of claim 1, further comprising a conductive member disposed on the body, wherein the body is made of one or more non-metallic materials.

12. The support member of claim 1, further comprising a coating disposed on the body, wherein the coating comprises one or more antifouling agents.

13. The support member of claim 1, wherein the body is monolithic.

14. The support member of claim 1, wherein:
the body is monolithic, wherein the first curved side surface in the first set and the second curved side surface in the first set are opposed to one another about the longitudinal centerline,
the first curved side surface in the second set and the second curved side surface in the second set are opposed to one another about the latitudinal centerline,
the first curved side surface in the second set and a second curved side surface in the second set are each an arc that follows a circular curve, and
the first curved side surface in the second set and the second curved side surface in the second set have substantially the same length.

15. The support member of claim 14, further comprising a conductive member disposed on the body, wherein the body is made of one or more non-metallic materials.

* * * * *